(12) United States Patent
Shim et al.

(10) Patent No.: US 9,911,002 B2
(45) Date of Patent: Mar. 6, 2018

(54) METHOD OF MODIFYING IMAGE INCLUDING PHOTOGRAPHING RESTRICTED ELEMENT, AND DEVICE AND SYSTEM FOR PERFORMING THE METHOD

(71) Applicant: SAMSUNG ELECTRONICS CO., LTD., Suwon-si (KR)

(72) Inventors: Woo-chul Shim, Yongin-si (KR); Hyun-jee Kim, Seoul (KR); Jae-young Huh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/815,440

(22) Filed: Jul. 31, 2015

(65) Prior Publication Data

US 2016/0034704 A1    Feb. 4, 2016

(30) Foreign Application Priority Data

Jul. 31, 2014  (KR) .................. 10-2014-0098652
Apr. 10, 2015  (KR) .................. 10-2015-0051133

(51) Int. Cl.
*G06F 21/62*  (2013.01)
*G06K 9/00*   (2006.01)
(Continued)

(52) U.S. Cl.
CPC ..... *G06F 21/6227* (2013.01); *G06K 9/00771* (2013.01); *H04N 1/4486* (2013.01);
(Continued)

(58) Field of Classification Search
None
See application file for complete search history.

(56) References Cited

U.S. PATENT DOCUMENTS 6,178,243 B1 *  1/2001  Pomerantz ............ G06F 21/606
                                                        358/296
7,036,019 B1 *  4/2006  Saito ...................... G06F 21/10
                                                        705/57
(Continued)

FOREIGN PATENT DOCUMENTS

GB         2372131 A        8/2002
JP       2014082695 A       5/2014
(Continued)

OTHER PUBLICATIONS

Communication dated Oct. 19, 2015, issued by the International Searching Authority in counterpart International Application No. PCT/KR2015/007502 (PCT/ISA/210).
(Continued)

*Primary Examiner* — Christopher Revak
(74) *Attorney, Agent, or Firm* — Sughrue Mion, PLLC

(57) ABSTRACT

Provided is a user device including: a storage configured to store data; and a controller configured to recognize a person included in an image captured by the user device or received by the user device from an external source, and change a part of the image corresponding to the recognized person to be unrecognizable in response to a degree of closeness between the recognized person and a user of the user device being lower than a predetermined level based on the data stored in the storage.

17 Claims, 66 Drawing Sheets

(51) Int. Cl.
*G06K 9/46* (2006.01)
*H04N 1/44* (2006.01)
*H04N 5/232* (2006.01)

(52) U.S. Cl.
CPC ..... *H04N 5/23229* (2013.01); *G06K 9/00221* (2013.01); *G06K 9/00288* (2013.01)

(56) References Cited

U.S. PATENT DOCUMENTS

| | | | | |
|---|---|---|---|---|
| 8,185,959 | B2* | 5/2012 | Bellwood | G06F 21/10 |
| | | | | 382/100 |
| 8,558,892 | B2* | 10/2013 | Brodsky | G01S 3/7864 |
| | | | | 348/155 |
| 8,682,084 | B2* | 3/2014 | Gotoh | G06F 17/30247 |
| | | | | 382/118 |
| 2004/0202382 | A1* | 10/2004 | Pilu | H04N 1/00167 |
| | | | | 382/276 |
| 2006/0215026 | A1* | 9/2006 | Kamata | G06K 19/07758 |
| | | | | 348/143 |
| 2007/0061267 | A1* | 3/2007 | Saito | G06Q 20/02 |
| | | | | 705/51 |
| 2009/0010570 | A1 | 1/2009 | Yamada et al. | |
| 2009/0028558 | A1* | 1/2009 | Choi | H04B 10/1143 |
| | | | | 398/41 |
| 2009/0216769 | A1* | 8/2009 | Bellwood | G06F 21/10 |
| 2009/0217343 | A1* | 8/2009 | Bellwood | G06F 21/10 |
| | | | | 726/1 |
| 2009/0217344 | A1* | 8/2009 | Bellwood | G06F 21/10 |
| | | | | 726/1 |
| 2010/0231753 | A1 | 9/2010 | Hagiwara | |
| 2011/0289601 | A1* | 11/2011 | Bellwood | G06F 21/10 |
| | | | | 726/30 |
| 2012/0131471 | A1* | 5/2012 | Terlouw | G06F 3/04883 |
| | | | | 715/741 |
| 2012/0209804 | A1 | 8/2012 | Lee et al. | |
| 2012/0250951 | A1 | 10/2012 | Chen | |
| 2012/0293654 | A1* | 11/2012 | Ikegami | H04N 7/185 |
| | | | | 348/143 |
| 2013/0027571 | A1 | 1/2013 | Parulski | |
| 2013/0263276 | A1* | 10/2013 | Maruyama | G06F 21/6245 |
| | | | | 726/26 |
| 2013/0279690 | A1 | 10/2013 | Durham et al. | |
| 2014/0023248 | A1 | 1/2014 | Yoo et al. | |
| 2014/0049593 | A1 | 2/2014 | Pai et al. | |
| 2015/0035981 | A1* | 2/2015 | Otsuki | G08G 1/09623 |
| | | | | 348/148 |
| 2015/0104080 | A1* | 4/2015 | Holman | G06Q 50/184 |
| | | | | 382/115 |
| 2015/0222812 | A1* | 8/2015 | Murray | H04N 5/23216 |
| | | | | 348/222.1 |
| 2015/0278535 | A1* | 10/2015 | Holman | G06F 21/6209 |
| | | | | 726/30 |

FOREIGN PATENT DOCUMENTS

| | | |
|---|---|---|
| KR | 10-2009-0107602 A | 10/2009 |
| KR | 10-2012-0092433 A | 8/2012 |
| KR | 101215650 B1 | 12/2012 |
| KR | 1020130105246 A | 9/2013 |
| KR | 10-2014-0012474 A | 2/2014 |
| KR | 1020140035753 A | 3/2014 |
| WO | 2013/098587 A1 | 7/2013 |

OTHER PUBLICATIONS

Communication dated Jan. 19, 2016 by the European Patent Office in related Application No. 15177260.5.
Patent Examination Report No. 1 issued by the Australian IP Office in counterpart Australian Patent Application No. 2015297230 dated Dec. 4, 2017.

* cited by examiner

BLUR PROCESS

COMPOSE BY BACKGROUND IMAGE

COMPOSE BY PRE-STORED BACKGROUND IMAGE

COMPOSE BY ALTERNATIVE IMAGE

STORE MODIFIED IMAGE IN DEVICE

STORE ORIGINAL IMAGE IN DEVICE

FIG. 64A
FIG. 64B
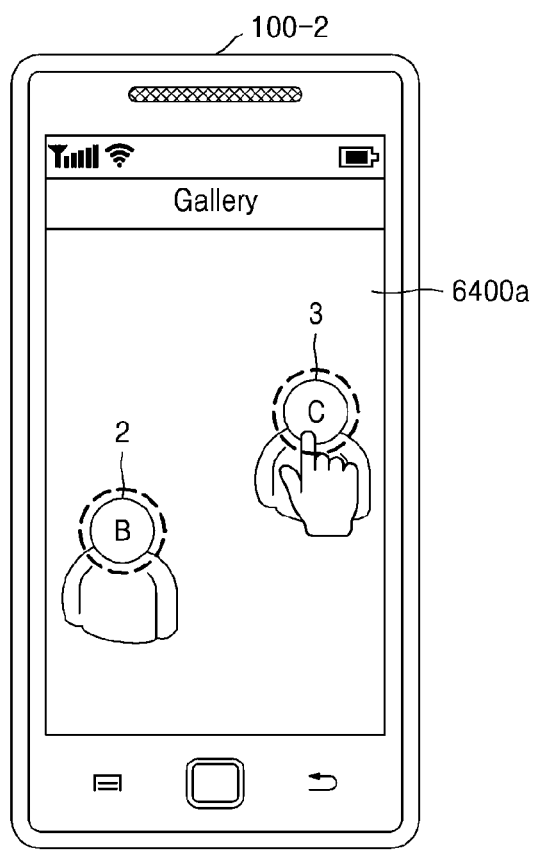
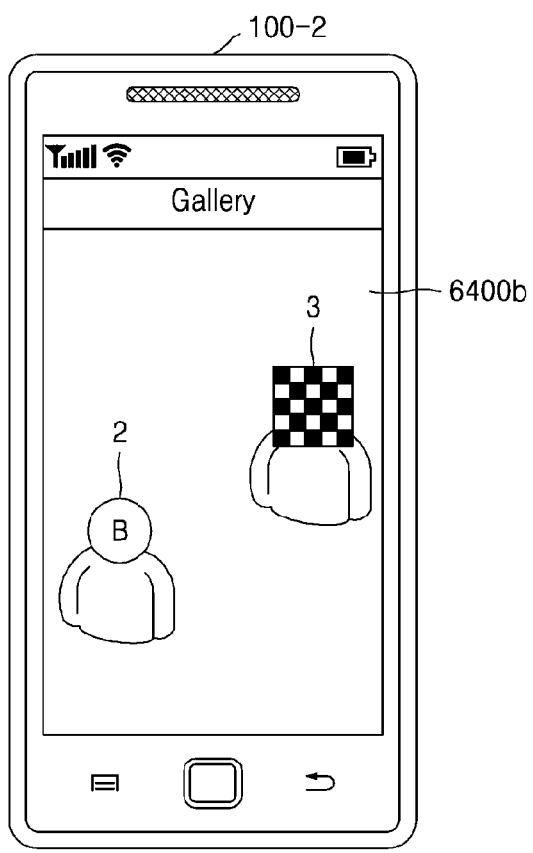

FIG. 66A
FIG. 66B
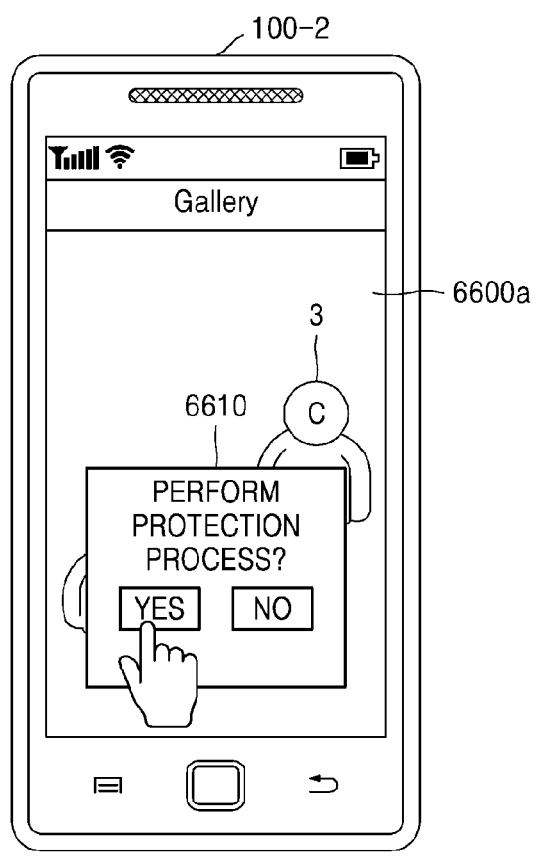
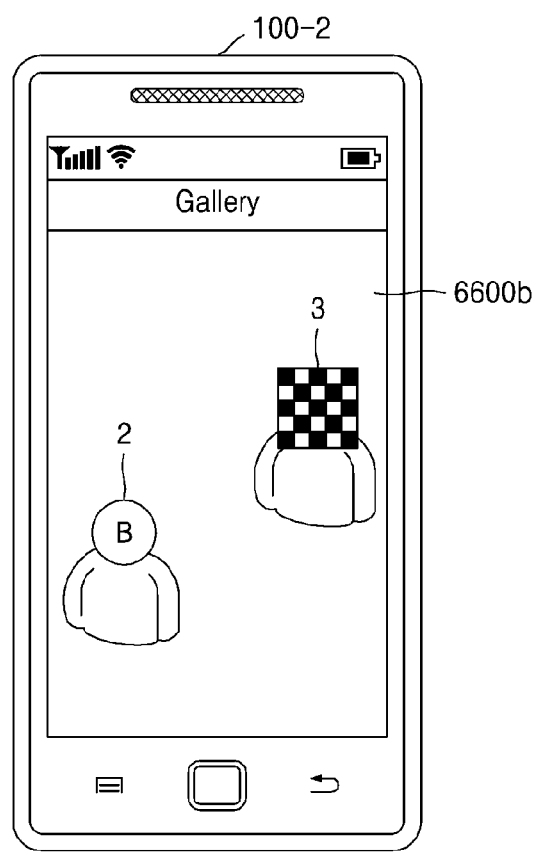

METHOD OF MODIFYING IMAGE INCLUDING PHOTOGRAPHING RESTRICTED ELEMENT, AND DEVICE AND SYSTEM FOR PERFORMING THE METHOD

CROSS-REFERENCE TO RELATED APPLICATION

This application claims priority from Korean Patent Application No. 10-2014-0098652, filed on Jul. 31, 2014, and Korean Patent Application No. 10-2015-0051133, filed on Apr. 10, 2015, in the Korean Intellectual Property Office, the disclosures of which are incorporated herein in their entirety by reference.

BACKGROUND

1. Field

Apparatuses and methods consistent with exemplary embodiments relate to a method of modifying an image, wherein a photo or a moving image captured by a user device is modified if the photo or the moving image includes a photographing restricted element, and a device and a system for performing the method.

2. Description of the Related Art

When a photo or a moving image is captured by using a photographing device, such as a camera or a camcorder, a stranger may be included in the captured photo or the captured moving image. At this time, the stranger may be exposed to the captured photo or the capture moving image against his/her will, and sometimes, privacy of the stranger may be invaded. However, it is difficult for a photographer to watch out for a stranger whenever he/she is photographing.

When a photographing restricted person is classified from among people included in a captured image and an image process is performed such that the photographing restricted person is not distinguishable, a photographer may protect privacy of a photographee while conveniently capturing an image by using a general method.

In detail, recently, since portable devices, such as smart phones or tablet personal computers (PCs), generally support photographing functions, a person may be highly likely to be photographed by a stranger, and thus a preparation is required.

Meanwhile, a photographing restricted element may include not only a person, but also an object or a location. Thus, if an image captured by a personal device includes a photographing restricted object or a photographing restricted location, an image process may be performed such that the photographing restricted object or the photographing restricted location is not distinguishable.

SUMMARY

One or more exemplary embodiments provide a method of modifying an image if the image captured by a personal device includes a photographing restricted element.

According to an aspect of an exemplary embodiment, there is provided a user device including: a storage configured to store data; and a controller configured to recognize a person included in an image captured by the user device or received by the user device from an external source and change a part of the image corresponding to the recognized person to be unrecognizable in response to a degree of closeness between the recognized person and a user of the user device being lower than a predetermined level based on the data stored in the storage.

The user device may further include a camera configured to capture the image.

The controller may be further configured to determine whether a location where the image is captured is a photographing restricted location, and change the part of the image corresponding to the recognized person to be unrecognizable when the location is the photographing restricted location.

The data stored in the storage may be an address book, and the controller may be further configured to determine that the degree of closeness is lower than the predetermined level in response to the recognized person not being included in the address book.

The data stored in the storage may be at least one photograph, and the controller may determine that the degree of closeness between the user and the recognized person is lower than the predetermined level in response to the recognized person not being included in the at least one photograph.

The data stored in the storage may be social networking service (SNS) usage records of the user, and the controller may determine the degree of closeness by analyzing the SNS usage records.

The controller may determine whether a location where the image is captured is a photographing restricted location by accessing a database of an external server, and modify the image when the location is determined as the photographing restricted location.

The controller may be further configured to recognize a photographing restricted object from the image, and may determine that a location where the image is captured is a photographing restricted location in response to the photographing restricted object being recognized from the image.

The controller may perform at least one of a mosaic process, a blur process, a background image composing process, and an alternative image composing process on the part of the image to change the part of the image to be unrecognizable.

According to another aspect of an exemplary embodiment, there is provided a system for modifying an image, there is provided a server configured to perform an image processing; and a user device configured to request the image processing while transmitting an image to a server, wherein the server is further configured to recognize a person included in the image received from the user device and change a part of the image corresponding to the recognized person to be unrecognizable in response to a degree of closeness between the recognized person and a user of the user device being lower than a predetermined level, and transmit the image to the user device.

The server may determine whether a location where the image is captured is a photographing restricted location by using pre-stored data, and change the part of the image corresponding to the recognized person to be unrecognizable in response to the location being as the photographing restricted location.

The server may receive a time and a location where the image is captured from the user device, and determine whether photographing of the recognized person is restricted at the received time and the received location by using pre-stored data.

The user device may encode the image by using an encryption key received from the server and transmits the encoded image to the server, and the server may decode the encoded image and modifies the part of the decoded image corresponding to the recognized person.

According to another aspect of an exemplary embodiment, there is provided a user device including: a camera configured to capture an image; a communication interface configured to transmit a photographing notification to a device of a photographee who is captured in the image, and receive a response to the photographing notification from the device of the photographee; and a controller configured to modify the image based on the response indicating whether the capturing the image is permitted.

According to another aspect of an exemplary embodiment, there is provided a method of modifying an image by a user device including: recognizing a person included in the image; determining whether a degree of closeness between the recognized person and a user of the user device is lower than a predetermined level; and changing a part of the image corresponding to the recognized person to be unrecognizable in response to the degree of closeness being lower than the predetermined level.

The determining may include determining whether a location where the image is captured is a photographing restricted location, and the changing may include modifying the part of the image when the location is the photographing restricted location.

The determining may include determining that the degree of closeness is lower than the predetermined level in response to the recognized person not being included in an address book stored in the user device.

The determining may include determining that the degree of closeness is lower than the predetermined level in response to the recognized person not being included in at least one photograph stored in the user device.

The determining may include determining whether the degree of closeness is lower than the predetermined level by analyzing a social networking service (SNS) usage record of the user based on data stored in the user device.

The changing may include performing at least one of a mosaic process, a blur process, a background image composing process, and an alternative image composing process on the part of the image to change the part of the image to be unrecognizable.

According to another aspect of an exemplary embodiment, there is provided a method of modifying an image by a server including: receiving an image and an image processing request from a user device; recognizing an object included in the image in response to the image processing request; determining whether the object is a photographing restricted element based on at least one of a location where the image is captured, a time when the image is captured, and a degree of closeness between a user and the recognized object; and performing an image processing to modify the object included in the image in response to the object being determined as the photographing restricted element.

The image processing request may indicate a type of the image processing to be performed on the object, and the type of the image processing may correspond to a mosaic process, a blur process, a background image composing process, or an alternative image composing process.

The image processing request may include at least one of the location where the image is captured, the time when the image is captured, and the degree of closeness between the user and the recognized object the location.

The determining whether the object is a photographing restricted element may include analyzing the received image to extract features indicating location information, comparing the extracted features to data stored in the server to find the location; and determining the object as a photographing restricted element in response to the location being designated as a photography prohibited area.

BRIEF DESCRIPTION OF THE DRAWINGS

The above and/or other aspects will be more apparent by describing certain exemplary embodiments, with reference to the accompanying drawings, in which:

FIGS. 63, 64A, 64B, 65A, 65B, 66A, and 66B are diagrams for describing examples of modifying a captured image according to a user's selection, according to exemplary embodiments.

DETAILED DESCRIPTION

Figure 1:
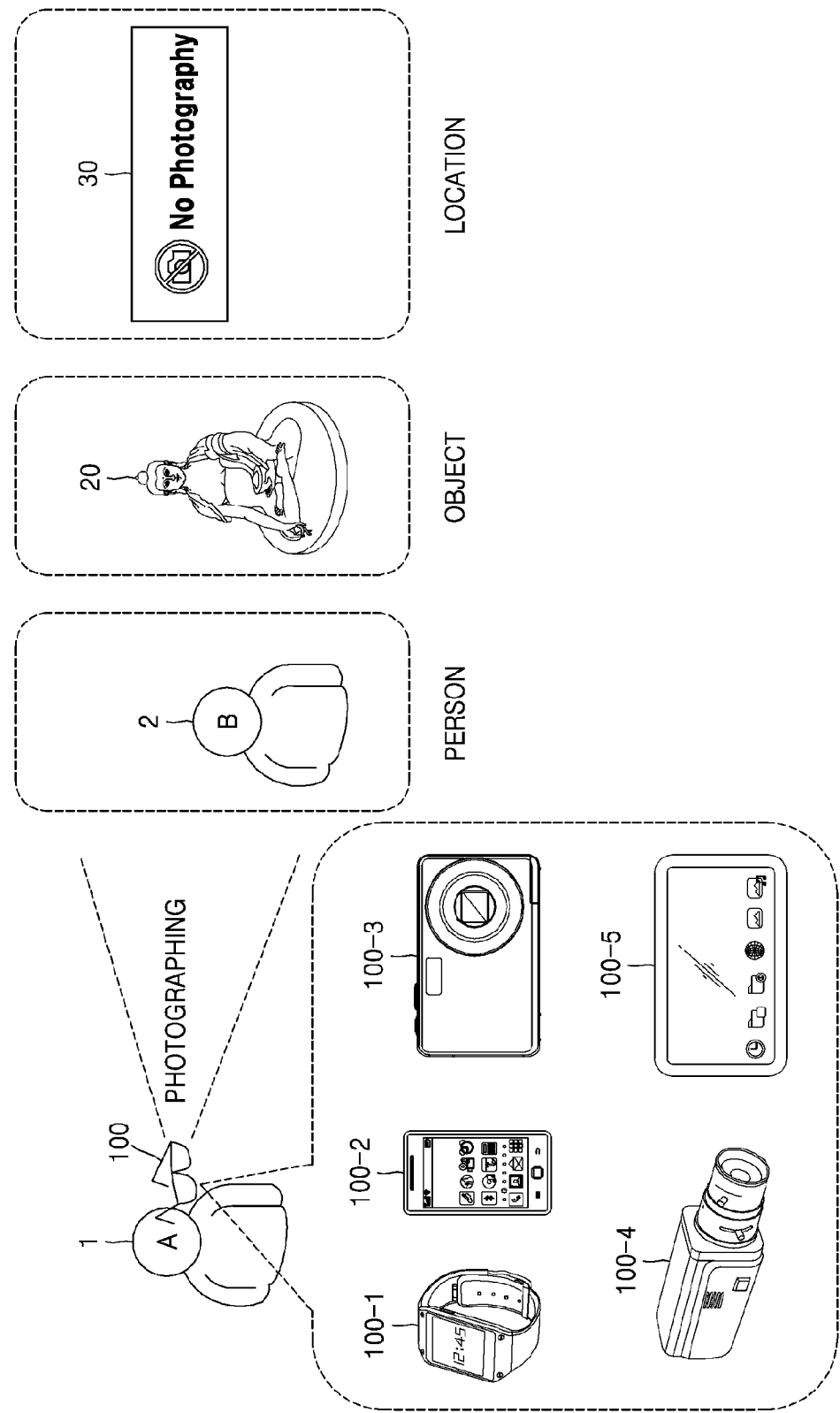
FIG. 1 is a diagram for describing an environment of performing a method of modifying an image including a photographing restricted element, according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list.

FIG. 1 is a diagram for describing an environment of performing a method of modifying an image including a photographing restricted element, according to an exemplary embodiment.

Referring to FIG. 1, User A may capture an image including a person or an object, or an image of a certain location by using smart glasses 100. Here, a captured image may be not only a still image, such as a photograph, but also a moving image.

As shown in FIG. 1, the smart glasses 100 may capture an image including a person, such as User B, an object, such as a sculpture 20, or a no photography sign 30. The smart glasses 100 may recognize at least one of the person included in the image, the object included in the image, and the location where the image is captured, and may determine whether the image includes an element restricted from being photographed, i.e., a photographing restricted element, based on a result of the recognizing.

Here, a photographing restricted element is a person, object, or location that is restricted from being photographed due to privacy, copyright, or security. Such a photographing restricted element may be uniformly applied to all people or differently applied according to photographers. For example, photographing of a military security zone is restricted to all people, but photographing of a certain person may be restricted only to a person who does not know the certain person. If a photographing restricted person or object is included in an image or the image is captured at a photographing restricted location, it is determined that the image includes a photographing restricted element.

Meanwhile, when the smart glasses 100 captures an image and transmits the image to a device or server connected to the smart glasses 100, the device or server may recognize a person, an object, or a location of the image and determine whether the image includes a photographing restricted element.

If it is determined that the image includes a photographing restricted element, the smart glasses 100, or the device or server connected to the smart glasses 100 modifies the image. In detail, the image is modified such that the photographing restricted element is not distinguishable or recognizable. Methods of modifying an image will be described in detail later.

Meanwhile, User A may capture an image by using any one of various devices besides the smart glasses 100. For example, User A may use a wearable device, such as a smart watch 100-1, a mobile device, such as a smart phone 100-2 or a tablet personal computer (PC) 100-5, or a general photographing device, such as a camera 100-3 or a camcorder 100-4. However, it would be obvious to one of ordinary skill in the art that any one of various devices capable of capturing an image or a moving image is usable.

A device that is generally carried by most users is the smart phone 100-2, and it is highly likely that information about a user, which is required to execute one or more exemplary embodiments, may be stored in the smart phone 100-2. Also, since the smart phone 100-2 is capable of modifying an image, it is assumed that a user device described hereinafter is the smart phone 100-2.

Figure 2:
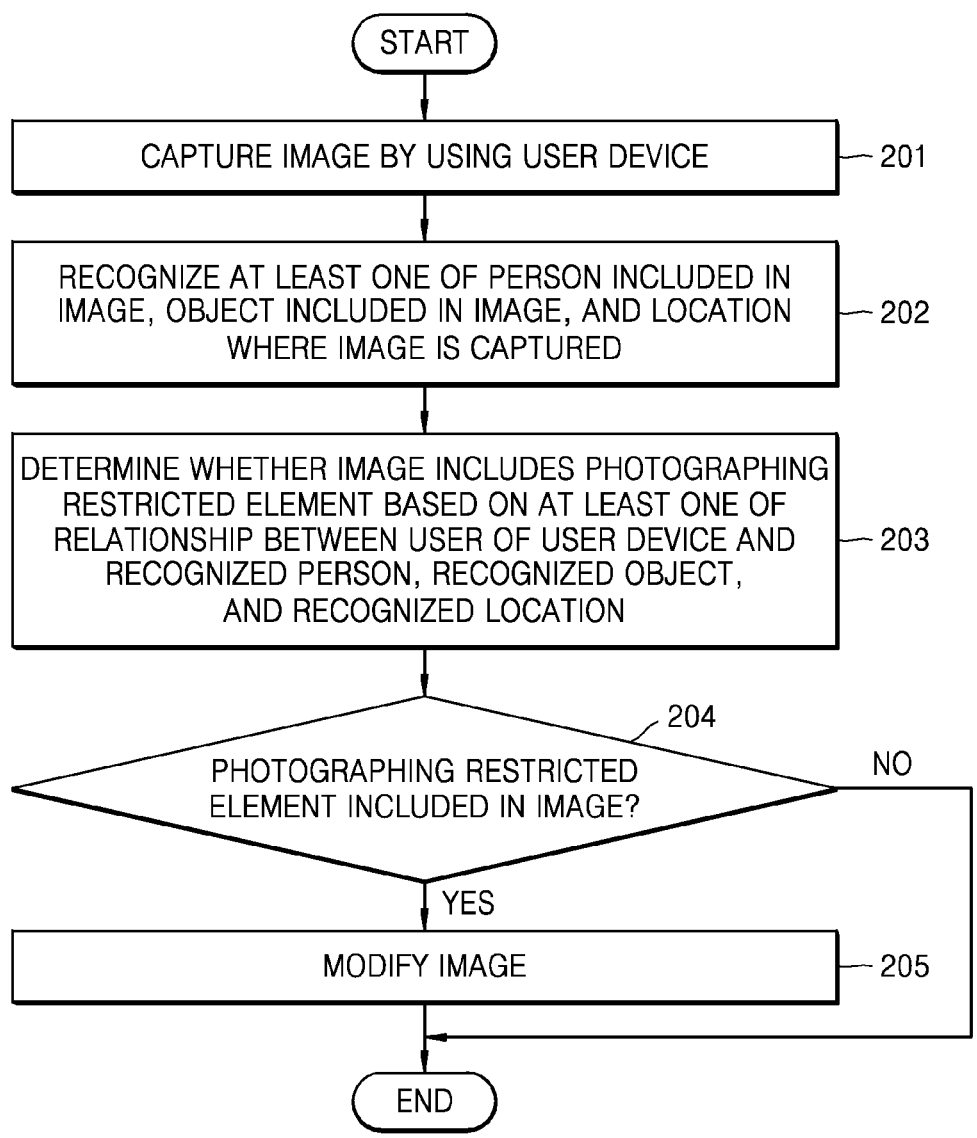
FIG. 2 is a flowchart of a method of modifying an image including a photographing restricted element, according to an exemplary embodiment.

FIG. 2 is a flowchart of a method of modifying an image including a photographing restricted element, according to an exemplary embodiment.

Referring to FIG. 2, an image is captured by using a user device in operation 201. Here, the image may be captured by using any one of a general photographing device, such as a camera or a camcorder, a wearable device, such as smart glasses or a smart watch, and a mobile device, such as a smart phone or a tablet PC, or by using any other various devices capable of photographing.

In operation 202, the user device recognizes at least one of a person included in the image, an object included in the image, and a location where the image is captured. Here, the user device may recognize the person included in the image by using, for example, a face recognition method. However, an exemplary embodiment is not limited thereto, and the user device may recognize the person included in the image by using any one of various methods for distinguishing the person. The face recognition method includes detecting a face from an image and extracting features from the detected face.

Meanwhile, the user device may recognize the object included in the image by detecting the object included in the image and extracting features, such as a shape and a color, of the detected object.

Meanwhile, the user device may recognize the location where the image is captured by using a method of recognizing an absolute location, a method of determining whether the location is a certain place, or a method of determining whether the location is a photographing restricted location.

First, the method of recognizing an absolute location may be performed by recognizing an absolute location, such as a latitude and a longitude, at a point of time when the image is captured via a global positioning system (GPS) or a Wi-Fi-based positioning system (WPS) embedded in the user device.

Second, the method of determining whether the location is a certain place may be performed by determining whether the user device is located in a certain place such as, for example, a museum, a restaurant, or a church, at a point of time when the image is captured. For example, it may be determined that the user device is in the certain place via communication with a server or a wireless access point of the certain place. Alternatively, an absolute location of the user device may be recognized by using the GPS of the user device and the absolute location of the user device may be compared with an absolute location of the certain place, which is pre-stored in a database.

Third, the method of determining whether the location is a photographing restricted location may be performed by determining whether the user device is located in a photographing restricted location at a point of time when the image is captured. For example, the user device may determine whether the location is a no photography zone by analyzing a sign, such as a no photography zone sign, included in the image. Alternatively, an absolute location of the user device may be recognized by using the GPS of the user device and the absolute location of the user device may be compared with an absolute location of the no photography zone, which is pre-stored in a database.

After recognizing at least one of the person, the object, and the location, the user device determines whether the image includes a photographing restricted element based on at least one of a relation between a user of the user device and the recognized person, the recognized object, and the recognized location, in operation 203. In other words, the user device determines whether the image needs to be modified. If the image includes the photographing restricted element, the user device determines that the image needs to be modified, and if the image does not include the photographing restricted element, the user device determines that the image does not need to be modified.

Here, the relation between the user of the user device and the recognized person is a relation between a photographer and a photographee, and it is determined whether the photographer and the photographee know each other, whether the photographee allowed photographer to photograph him/her, or whether the photographee is a celebrity and is not restricted from being photographed by the photographer. If it is determined that photographing of the photographee is restricted based on the relation, it is determined that the image includes the photographing restricted element.

Meanwhile, if the recognized object is a photographing restricted object, the user device determines that the image includes a photographing restricted element. A photographing restricted object may be an object under copyright protection, such as a work of art, or may be any object that is restricted from being photographed by an ordinary person due to various reasons.

It is determined whether the recognized object is a photographing restricted object by using any one of various methods. For example, a memory of the user device may store a database of photographing restricted objects, and the user device may compare the recognized object with the stored database. Alternatively, an external server may store a database of photographing restricted objects, and the user device may communicate with the external server to access the database and compare the recognized object with the stored database. Alternatively, the user device may transmit an image of the recognized object to the external server, and then the external server may compare the transmitted image to images stored in its database and transmit a result of the comparison to the user device. Alternatively, when the user enters a certain place, such as a museum, the user device may receive a database of photographing restricted objects in the certain place from a server managed by the certain place, and compare the recognized object with the database. The determining of whether the recognized object is a photographing restricted object may be performed via any one of other various methods.

Meanwhile, if the recognized location is a photographing restricted location, the user device determines that the image includes a photographing restricted element. A photographing restricted location may be a location that is restricted from being photographed due to security, such as a military security zone, or due to copyright, such as a concert venue. In addition, a location may be restricted from being photographed by an unauthorized person for various reasons.

It is determined whether the recognized location is a photographing restricted location by using any one of various methods. For example, a memory of the user device may store a database of photographing restricted locations, and the user device may compare the recognized location with the stored database. Alternatively, an external server may store a database of photographing restricted locations, and the user device may communicate with the external server to access the database and compare the recognized location with the database. Alternatively, the user device may determine whether the recognized location is a no photography zone by recognizing and analyzing a sign, such as a no photography zone sign, included in the image.

If it is determined that the image includes a photographing restricted element in operation 204, the user device may modify the image in operation 205. In detail, the user device may modify the image such that the photographing restricted element included in the image is not distinguishable or not recognizable. For example, the user device may perform a mosaic process or a blur process on the photographing restricted person or object. Alternatively, the user device may compose the photographing restricted person or object by a screen of an image captured by excluding the photographing restricted person or object, or to a pre-set alternative image. If the image is captured at the photographing restricted location, the user device may perform a mosaic process or a blur process such that the image is not distinguishable or recognizable, or may compose the image by a pre-set alternative image. In addition, the user device may modify the image such that the photographing restricted element included in the image is not distinguishable or recognizable. Methods of modifying an image will be described in detail later.

If it is determined that the image does not include a photographing restricted element in operation 204, the method ends without modifying the image.

It is described that operations 202 through 205 of FIG. 2 are performed by the user device, but alternatively, some or all of operations 202 through 205 may be performed by a device or server connected to the user device, as will be described in detail below.

FIGS. 3 through 6 are diagrams for describing a method of modifying an image including a photographing restricted element, according to exemplary embodiments.

Figure 3:
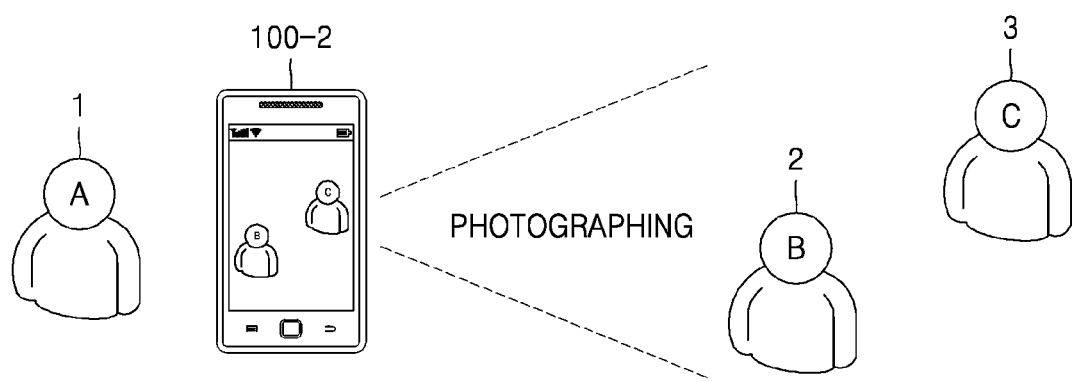
FIGS. 3 through 6 are diagrams for describing a method of modifying an image including a photographing restricted element, according to exemplary embodiments.

Referring to FIG. 3, the smart phone 100-2 of User A captures an image including User B and User C. Then, the smart phone 100-2 determines whether the image includes a photographing restricted person, and modifies the image if the image includes a photographing restricted person.

Figure 4:
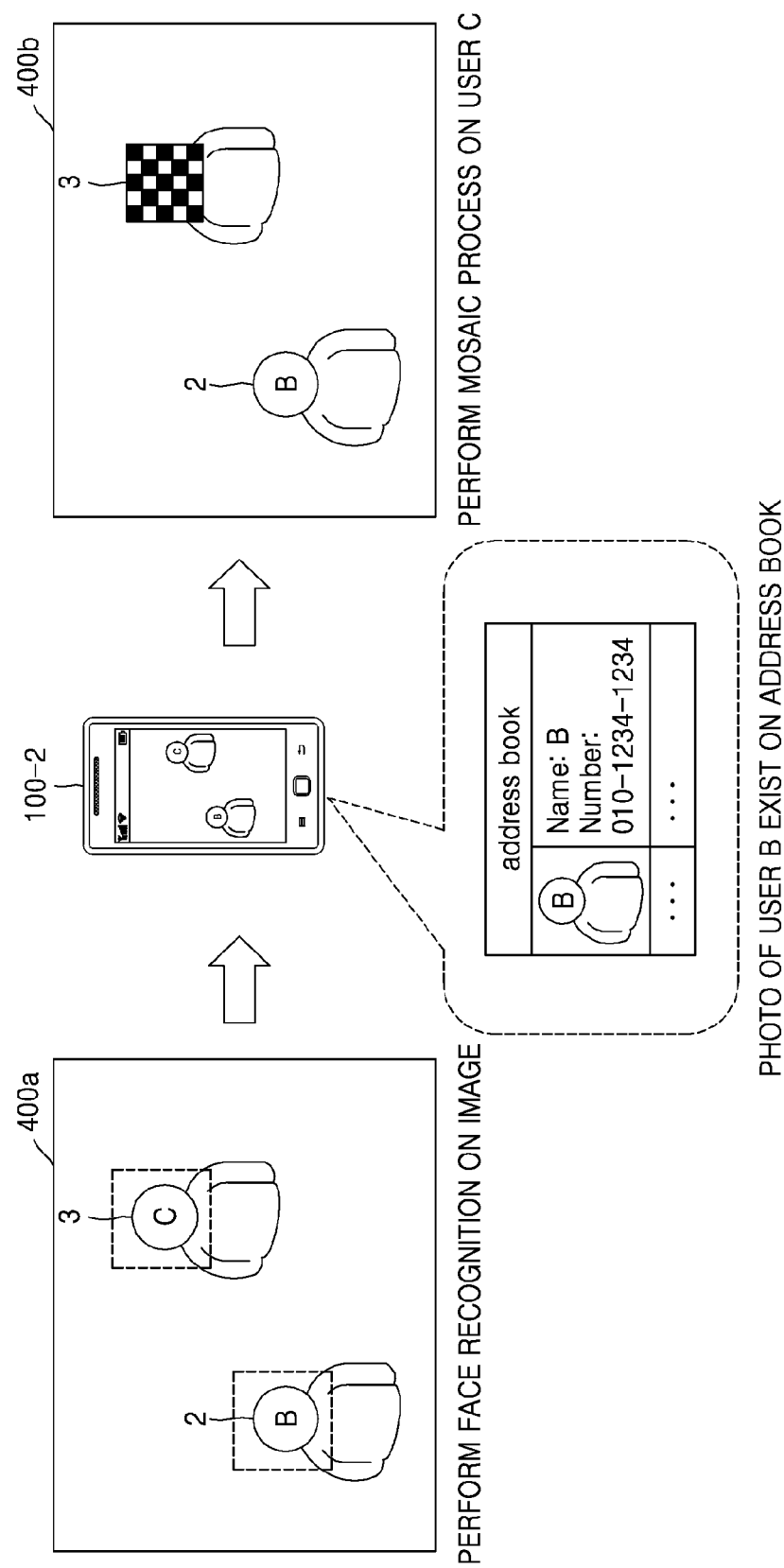
Figure 5:
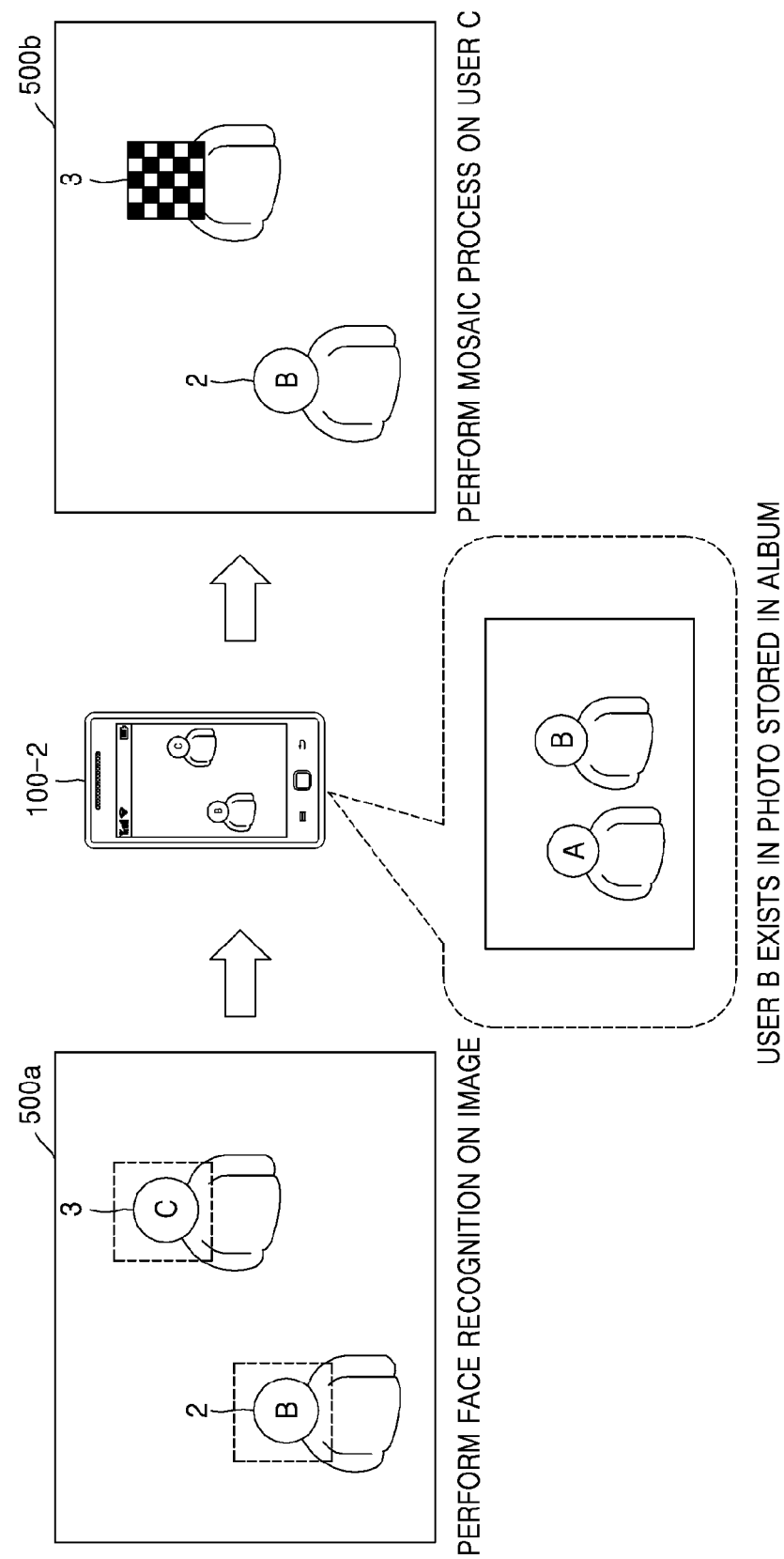
Figure 6:
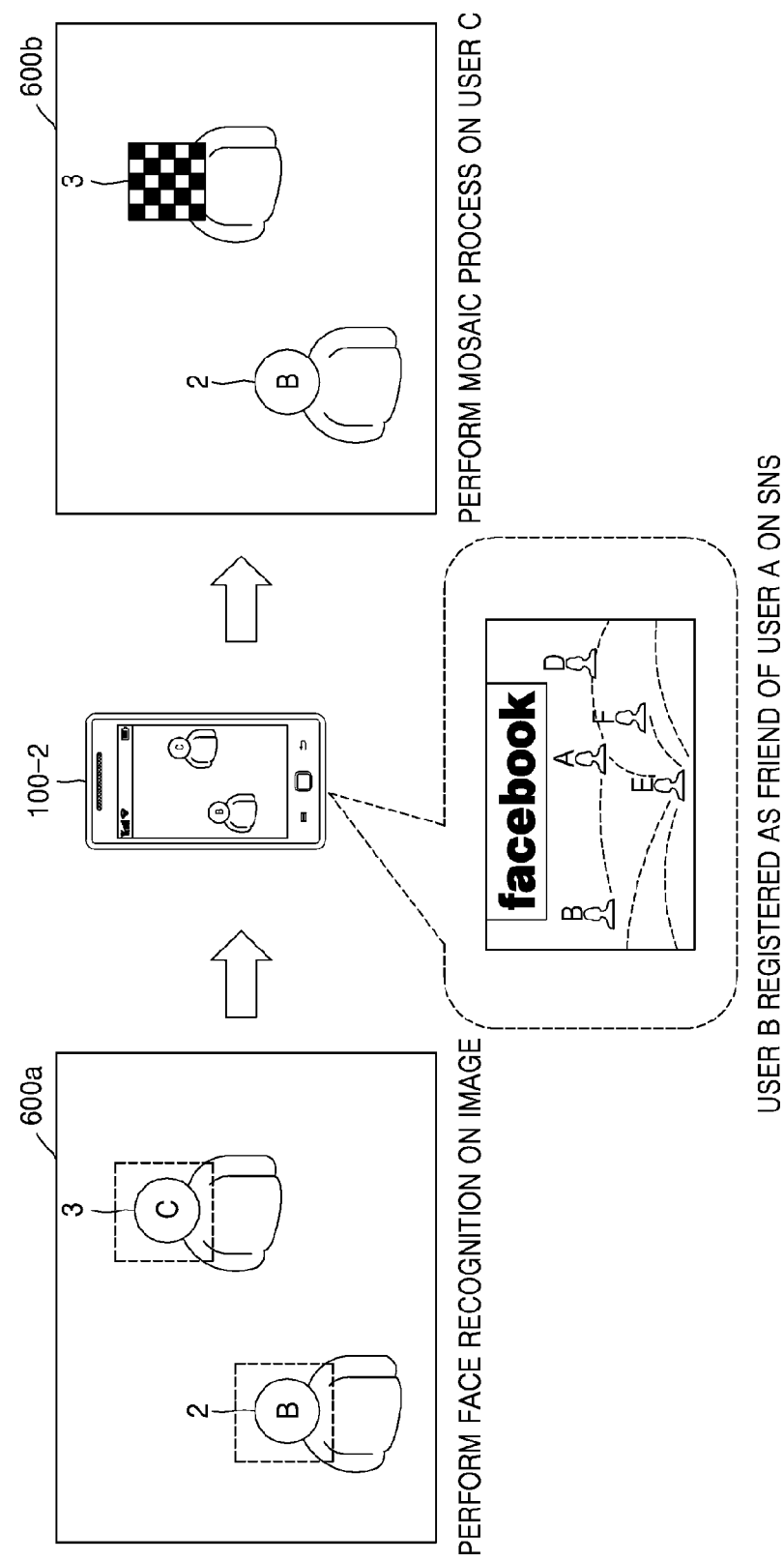

In FIGS. 4 through 6, the smart phone 100-2 determines whether the image includes a photographing restricted person by using different methods, and modifies the image.

Referring to FIG. 4, the smart phone 100-2 recognizes faces of User B and User C by performing face recognition on an original image 400a. The smart phone 100-2 may determine whether a degree of closeness between User A and User B and between User A and User C is lower than a predetermined level. To this end, the smart phone 100-2 compares the recognized faces with photos included in an address book stored in the smart phone 100-2. The address book stored in the smart phone 100-2 may store photos of people together with names and phone numbers of the people.

In FIG. 4, the smart phone 100-2 determines that a photo of User B is in the address book as a result of comparing the recognized faces with the photos included in the address book. The smart phone 100-2 determines that the degree of closeness between User A and User B is equal to or higher than the predetermined level and User B is a photographing allowed person.

Meanwhile, when the smart phone 100-2 is unable to find a photo of User C in the address book, the smart phone 100-2 determines that the degree of closeness between User A and User C is lower than the predetermined level and User C is a photographing restricted person. In other words, the smart phone 100-2 may determine that User A and User C are not related to each other. Accordingly, the smart phone 100-2 determines that the original image 400a includes a photographing restricted element and modifies the original image 400a. For example, the smart phone 100-2 may modify a part of an image corresponding to User C to be unrecognizable or indistinguishable. In detail, as shown in FIG. 4, the smart phone 100-2 performs a mosaic process on a face region of User C who is the photographing restricted person and outputs a modified image 400b.

In an exemplary embodiment the mosaic process involves outputting the face region of User C at a lower resolution. The lower resolution would be at a level so that the face region would be unrecognizable or indistinguishable.

A photographing restricted element is determined by comparing the recognized face with the photos included in the address book because it is highly likely that a person knows User A of the smart phone 100-2 when the person is registered in the address book. In other words, the smart phone 100-2 determines relations between User A and photographees by using the address book, and determines whether a photographing restricted element is included in the original image 400a based on the relations.

Referring to FIG. 5, the smart phone 100-2 recognizes the faces of User B and User C by performing face recognition on an original image 500a. The smart phone 100-2 may determine whether a degree of closeness between User A and User B and between User A and User C is lower than a predetermined level. To this end, the smart phone 100-2 compares the recognized faces with photos stored in an album of the smart phone 100-2.

In FIG. 5, the smart phone 100-2 determines that User B is included in at least one of the photos by comparing the recognized faces with the photos. The smart phone 100-2 determines that the degree of closeness between User A and User B is equal to or higher than the predetermined level and User B is a photographing allowed person.

Meanwhile, when the smart phone 100-2 is unable to find a photo of User C in the album, the smart phone 100-2 determines that a degree of closeness between User A and User C is lower than the predetermined level, and User C is a photographing restricted person. In other words, the smart phone 100-2 may determine that User A and User C are not related to each other. Accordingly, the smart phone 100-2 determines that the original image 500a includes a photographing restricted element and modifies the original image 500a. For example, the smart phone 100-2 may modify a part of an image corresponding to User C such that User C is not distinguishable or recognizable. In detail, as shown in FIG. 5, the smart phone 100-2 performs a mosaic process on a face region of User C who is the photographing restricted person and outputs a modified image 500b.

A photographing restricted element is determined by comparing the recognized face with the photos included in the album because it is highly likely that a person knows User A of the smart phone 100-2 when the person is included in a photo of the album. In other words, the smart phone 100-2 determines relations between User A and photographees by using the photos of the album, and determines whether a photographing restricted element is included in the original image 500a based on the relations.

Referring to FIG. 6, the smart phone 100-2 recognizes the faces of User B and User C by performing face recognition on an original image 600a. The smart phone 100-2 may determine whether a degree of closeness between User A and User B and between User A and User C is lower than a predetermined level. To this end, the smart phone 100-2 determines relations between User A and Users B and C by analyzing social networking service (SNS) usage records of User A. An SNS in an exemplary embodiment may be an online SNS that is web-based or internet-based that may be a platform to build social networks or social relations.

In FIG. 6, if it is determined that the degree of closeness between User A and User B is equal to a higher than the predetermined level by analyzing the SNS usage records, the smart phone 100-2 determines that User B is a photographing allowed person. For example, the degree of closeness may be determined from the following factors: whether Users A and B are friends on SNS, whether one of Users A and B wrote a comment regarding a posting of the other, etc. Each of the factors may have the same weight or different weights based on a user setting or by default. For example, a weight "3" may be given to the fact that Users A and B are friend on SNS, and a weight "0.2" may be given to each comment made by either User A or User B on the other's postings. When the predetermined level is set to "10", the degree of closeness (i.e., "23") is determined as being higher than the predetermined level (i.e., "10") if Users A and B are registered as friends (i.e., weight "3") and they made 100 comments on the other's postings (i.e., weight "20").

Meanwhile, if the smart phone 100-2 determines that the degree of closeness between User A and User C is lower than the predetermined level by analyzing the SNS usage records, the smart phone 100-2 determines that User C is a photographing restricted person. In other words, the smart phone 100-2 may determine that User A and User C are not related to each other. Accordingly, the smart phone 100-2 determines that the original image 600a includes a photographing restricted element and modifies the original image 600a. For example, the smart phone 100-2 may modify a part of an image corresponding to User C such that User C is not distinguishable or recognizable. In detail, as shown in FIG. 6, the smart phone 100-2 performs a mosaic process on a face region of User C who is the photographing restricted person and outputs a modified image 600b.

In determining the degree of closeness between User A and User B, and between User A and User C, the smart phone 100-2 may analyze the address book, the album, and the SNS usage all together. For example, the smart phone 100-2 may consider the following factors in determining the degree of closeness between User A and User B: whether User B is registered in User A's address book, a number of User B's pictures stored in User A's album, whether Users A and B are friends on SNS, and whether one of Users A and B wrote a comment regarding a posting of the other. The present exemplary embodiment is not limited thereto, and other factors may be considered in determining a degree of closeness between a photographer and a photographee.

FIGS. 7 through 12 are diagrams for describing methods of modifying an image including a photographing restricted person, according to exemplary embodiments.

Figure 7:
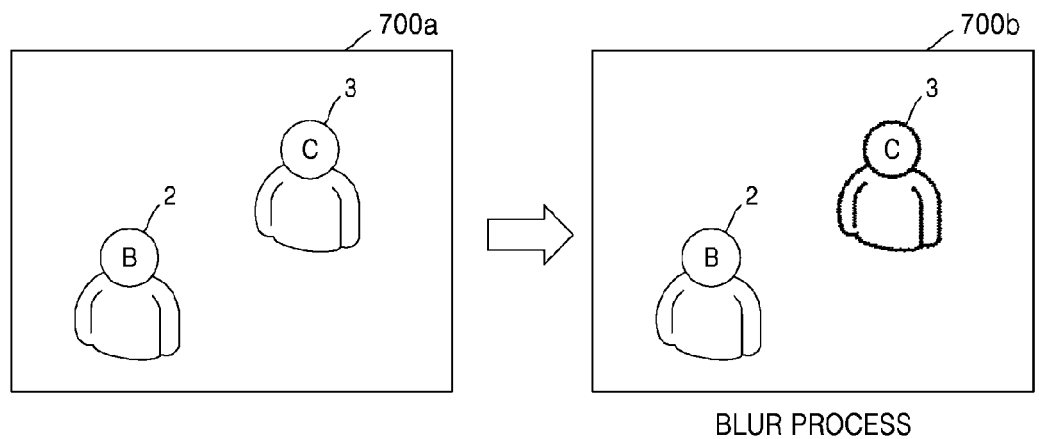
FIGS. 7 through 12 are diagrams for describing methods of modifying an image including a photographing restricted person, according to exemplary embodiments.

In FIG. 7 a blur process is performed on a photographing restricted element. Referring to FIG. 7, an original image 700a includes Users B and C. Here, it is assumed that User C is a photographing restricted element. Thus, a region of the original image 700a where User C is displayed is blurred. In a modified image 700b, User C is blurred. Meanwhile, since a method of performing a blur process on a certain region of an image is widely known, details thereof are not provided here.

Figure 8:
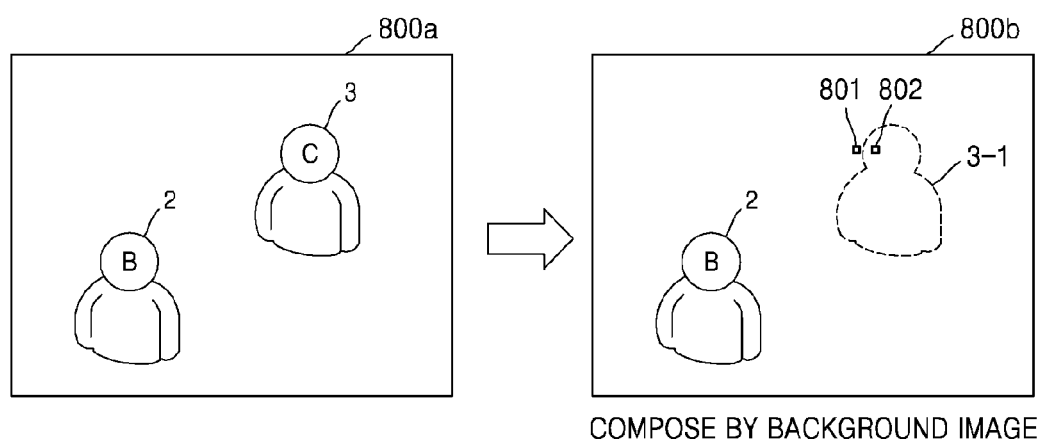

In FIG. 8, a replacement image of a photographing restricted element is composed by a background image. Referring to FIG. 8, an original image 800a includes Users B and C. Here, it is assumed that User C is a photographing restricted element. Thus, User C is composed by a background image.

User C is composed by the background image by deleting User C from the original image 800a, and replacing a region of the deleted User C by an image similar to a background image around User C.

Referring to a modified image 800b of FIG. 8, a region inside an edge 3-1 of User C is filled by pixel values that are same or similar to pixels outside the edge 3-1. For example, pixels 802 that are inside and adjacent to the edge 3-1 are set to have the same or similar color, saturation, and brightness as pixels 801 that are outside and adjacent to the edge 3-1. Also, pixels that adjacent to the pixels 802, from among pixels inside the edge 3-1 are set to have the similar color, saturation, and brightness as the pixels 802. Meanwhile, since any one of various technologies generally used in the related art may be applied to a method of composing a certain area of an image by a background image, details thereof are not provided here.

Figure 9:
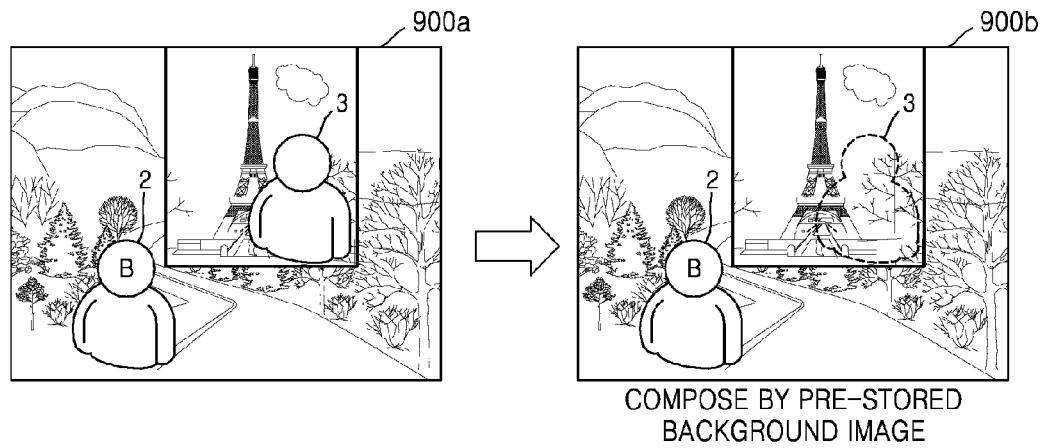

In FIG. 9, a replacement image of a photographing restricted element is composed by a pre-stored background image. Referring to FIG. 9, an original image 900a includes User B, User C, and a structure 901. Here, it is assumed that User C is a photographing restricted element. In the original image 900a, User C and the structure 902 partially overlap each other. Thus, User C is deleted from the original image 900a and a region of the deleted User C is filled with a pre-stored image of the structure 902. Referring to a modified image 900b, a region of User C, which overlaps the structure 902, is replaced by the pre-stored image of the structure 902. Here, an entire image of the structure 902 may be pre-stored in a user device or server that modifies the original image 900a.

Figure 10:
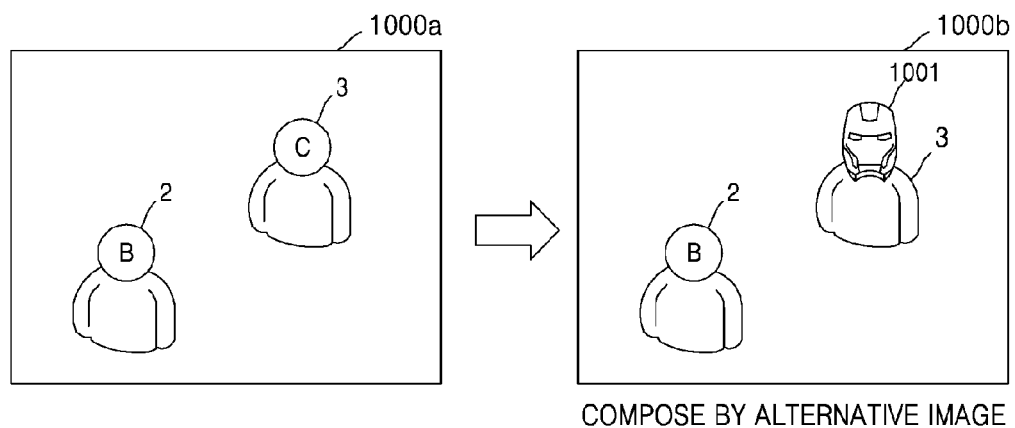

In FIG. 10, a replacement image of a photographing restricted element is composed by a pre-stored alternative image 1001. Referring to FIG. 10, an original image 1000a includes Users 2 and 3. Here, it is assumed that User 3 is a photographing restricted element. A modified image 1000b is generated by replacing User 3 with the pre-stored alternative image 1001. In FIG. 10, the pre-stored alternative image 1001 is selected to replace a face of User C. However, alternatively, the pre-stored alternative image 1001 may be an image for replacing User C.

When a replacement image of a face of a person (i.e., a replacement image of a photographing restricted element) is generated by an alternative image, the alternative image may be edited or modified based on a direction and angle of the face in an original image so as to obtain a natural image, as will be described in detail below with reference to FIGS. 11 and 12.

Figure 11:
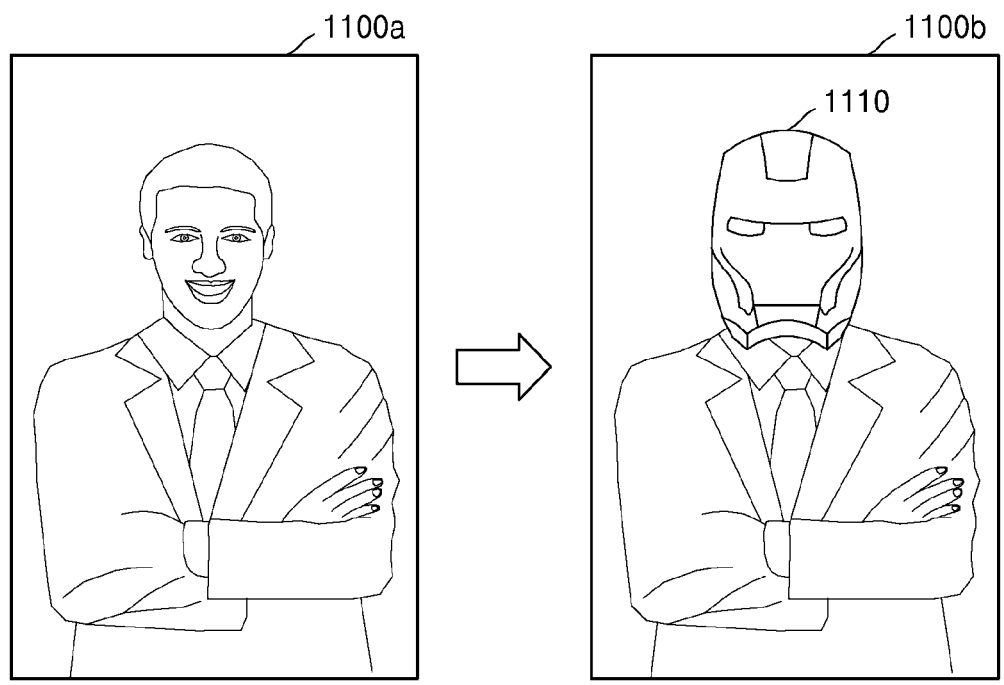

Referring to FIG. 11, a face of a person in an original image 1100a is facing forward. Thus, as shown in a modified image 1100b, the face of the person is composed by an alternative image 1110 facing forward according to the direction and angle of the face of the person in the original image 1100a.

Figure 12:
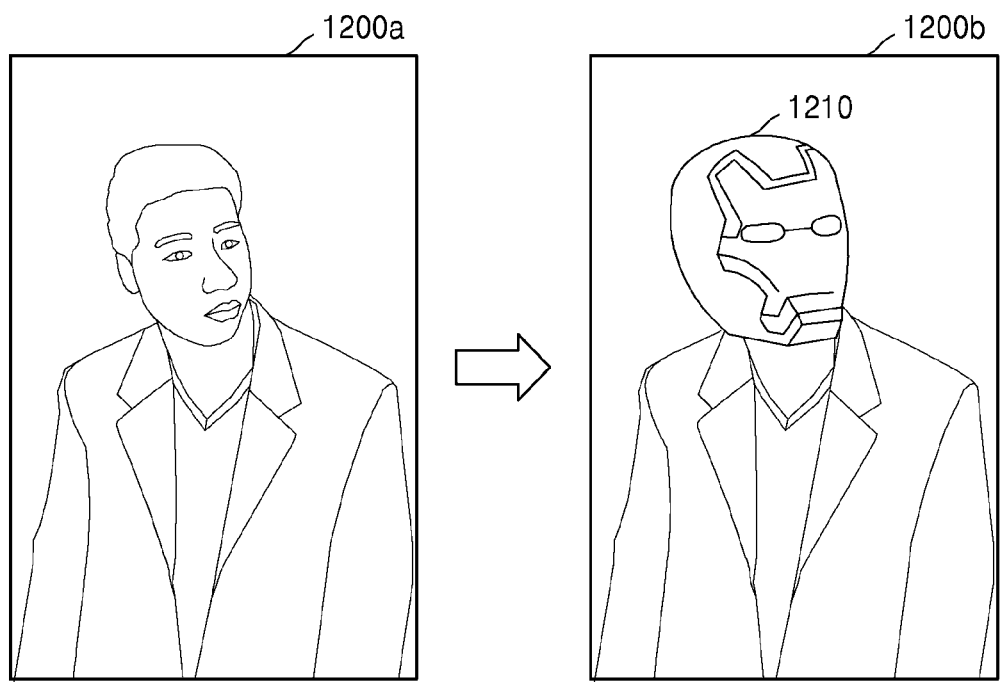

Referring to FIG. 12, a face of a person in an original image 1200a is facing sideways. Thus, as shown in a modified image 1200b, the face of the person is composed by an alternative image 1210 facing sideways according to a direction and angle of the face of the person in the original image 1200a.

As such, a face of a person may be composed by an alternative image according to a direction and angle of the face of the person, and thus a natural image may be obtained.

FIGS. 13 through 16 are flowcharts of methods of modifying an image including a photographing restricted person, according to exemplary embodiments.

Figure 13:
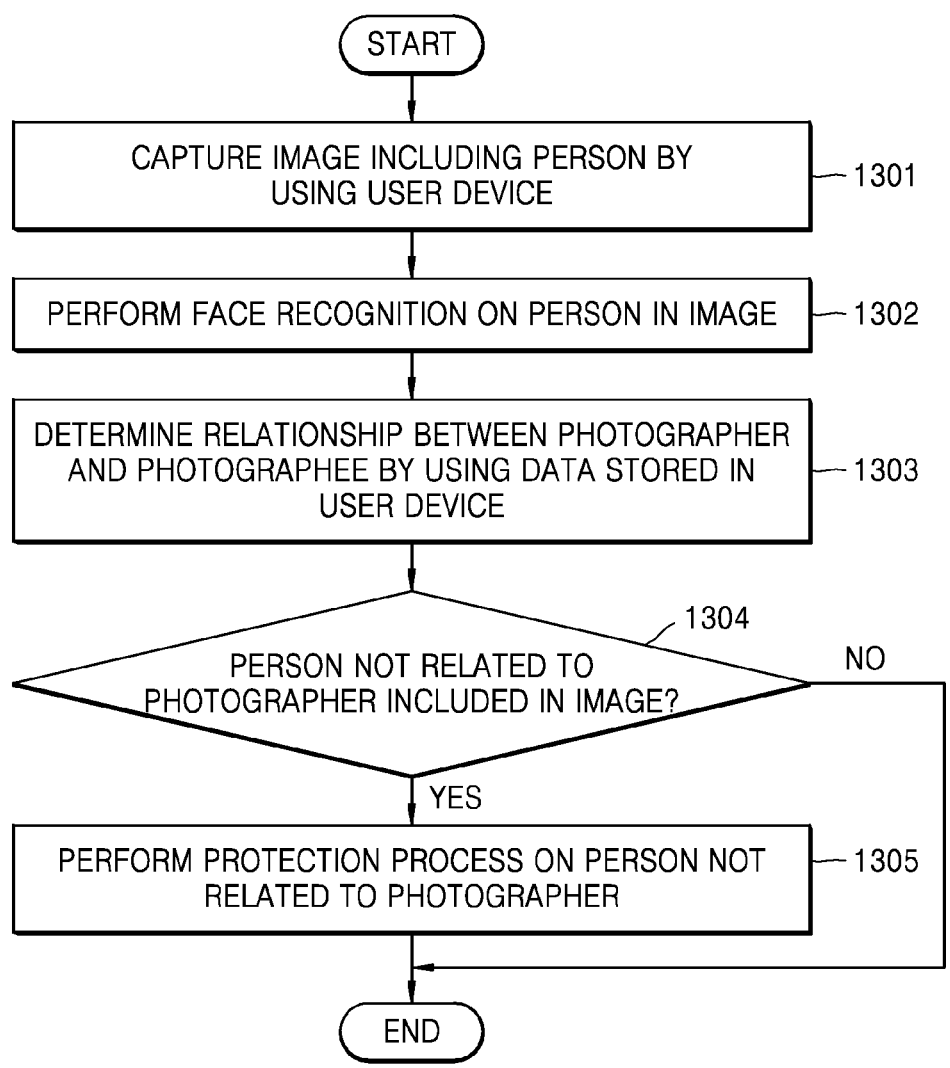
FIGS. 13 through 16 are flowcharts of methods of modifying an image including a photographing restricted person, according to exemplary embodiments.

Referring to FIG. 13, a user device captures an image including a person, in operation 1301. Here, the user device may be any one of a general photographing device, such as a camera or a camcorder, a wearable device, such as smart glasses or a smart watch, and a mobile device, such as a smart phone or a tablet PC, or may be any other various devices capable of photographing.

In operation 1302, the user device performs face recognition on the person in the image. In detail, face recognition may be performed by detecting a face region from the image and extracting features from the detected face region.

In operation 1303, the user device determines a relation between a photographer, i.e., a user of the user device, and a photographee, i.e., the person in the image, by using data stored in the user device. In other words, the user device determines whether the photographer and the photographee know each other.

In operation 1304, the user device determines whether the image includes a person who is not related to the photographer. At this time, a method of determining a relation between a photographer and a photographee and determining whether a person not related to the photographer is included in an image may vary, and some exemplary embodiments will be described below with reference to FIGS. 14 through 16.

If it is determined that the person not related to the photographer is included in the image in operation 1304, the user device performs a protection process on the person not related to the photographer in operation 1305. In other words, the user device modifies the image such that the person not related to the photographer is not distinguishable. A method of modifying an image has been described above with reference to FIGS. 7 through 12.

Figure 14:
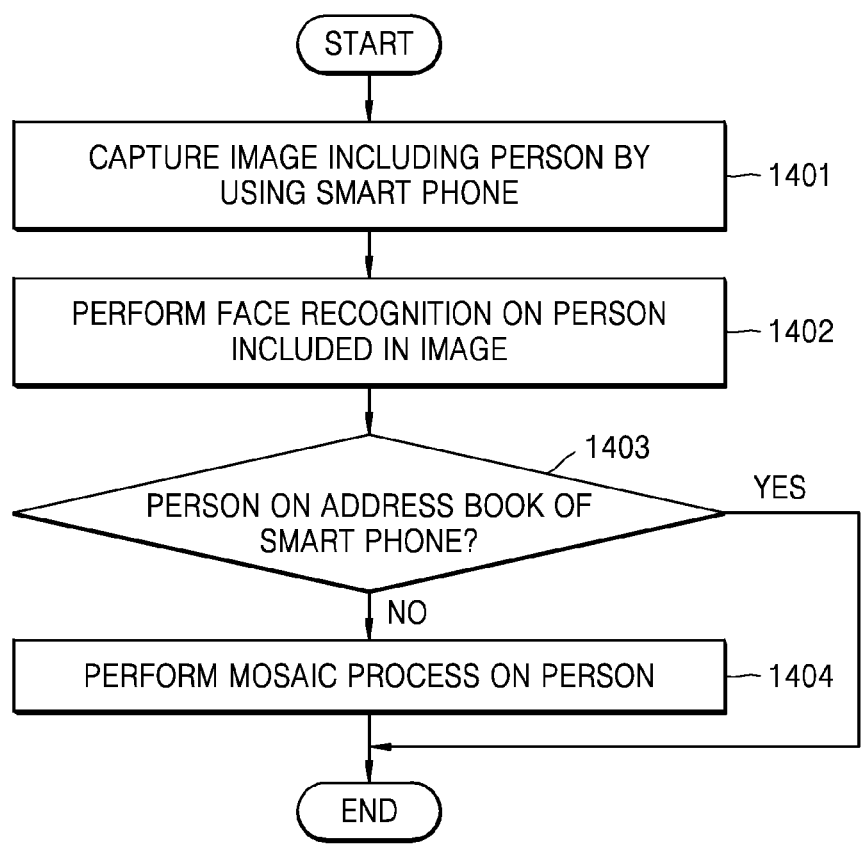

Referring to FIG. 14, in operation 1401, a smart phone captures an image including a person.

In operation 1402, the smart phone performs face recognition on the person included in the image. In detail, the face recognition may be performed by detecting a face region from the image and extracting features from the detected face region.

In operation 1403, the smart phone determines whether the person is in an address book of the smart phone. In detail, the smart phone determines whether the person matches at least one of photos included in the address book. If it is determined that the person is not in the address book, operation 1404 is performed.

In operation 1404, the smart phone performs a mosaic process on the person. Alternatively, the smart phone may perform a blur process or a background image composing process on the person.

Figure 15:
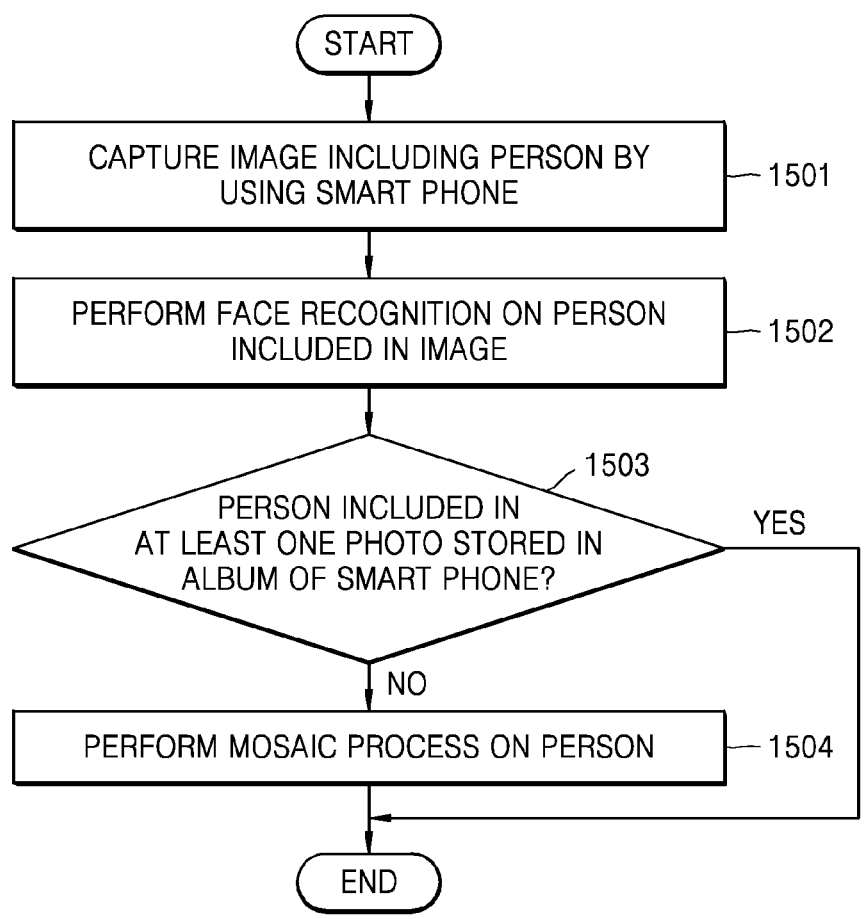

Referring to FIG. 15, in operation 1501, a smart phone captures an image including a person.

In operation 1502, the smart phone performs face recognition on the person included in the image. In detail, the face recognition may be performed by detecting a face region from the image and extracting features from the detected face region.

In operation 1503, the smart phone determines whether the person is included in photos stored in an album of the smart phone. In detail, the smart phone determines whether the person is included in at least one of the photos included in the album. If it is determined that the person is not included in the at least one photos, operation 1504 is performed.

In operation 1504, the smart phone performs a mosaic process on the person. Alternatively, the smart phone may perform a blur process or a background image composing process on the person.

Figure 16:
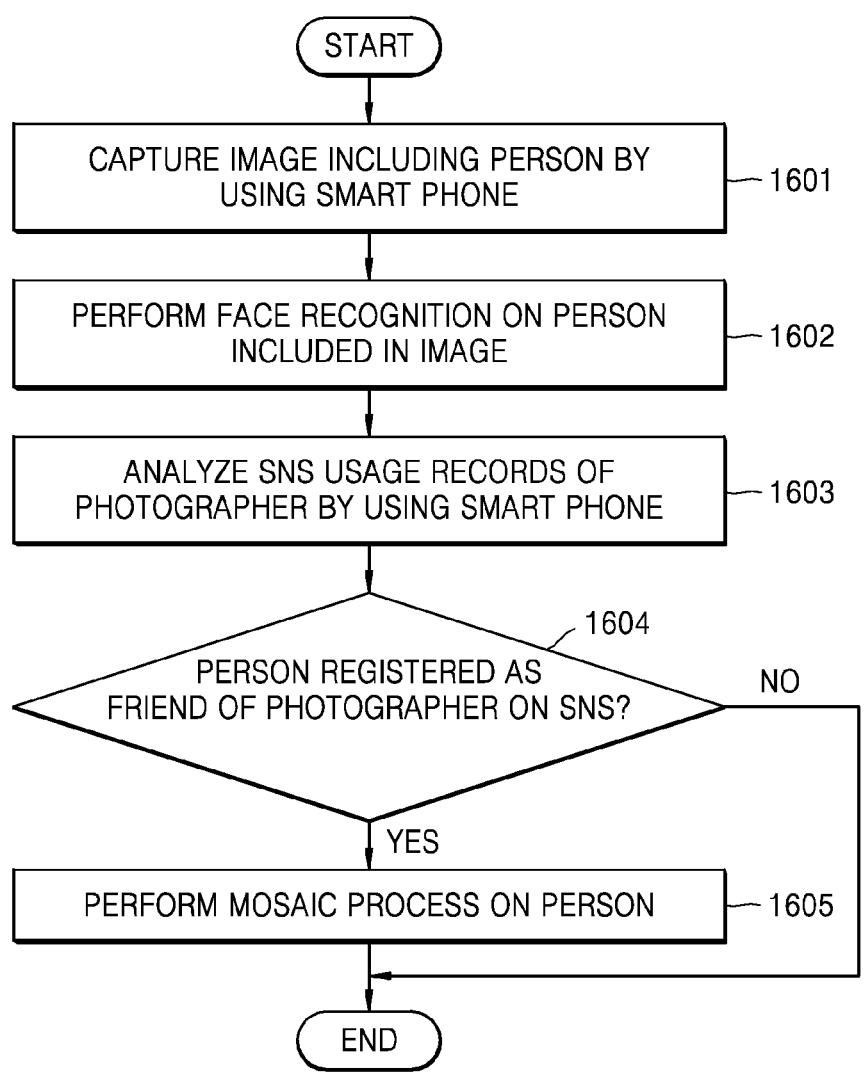

Referring to FIG. 16, in operation 1601, a smart phone captures an image including a person.

In operation 1602, the smart phone performs face recognition on the person included in the image. In detail, the face recognition may be performed by detecting a face region from the image and extracting features from the detected face region.

In operation 1603, the smart phone analyzes SNS usage records of a photographer, i.e., a user of the smart phone. The smart phone may store various records of the user using the smart phone, and may analyze the SNS usage records.

In operation 1604, the smart phone determines whether the person is registered as a friend of the photographer on SNS. If it is determined that the person is not registered as a friend of the photographer on SNS, operation 1605 is performed.

In operation 1605, the smart phone performs a mosaic process on the person. Alternatively, the smart phone may perform a blur process or a background image composing process on the person.

Meanwhile, the smart phone is used as a user device in the methods of FIGS. 14 through 16, but alternatively any one of various devices that is capable of capturing an image and storing an address book, such as a tablet PC, may be used.

Figure 17:
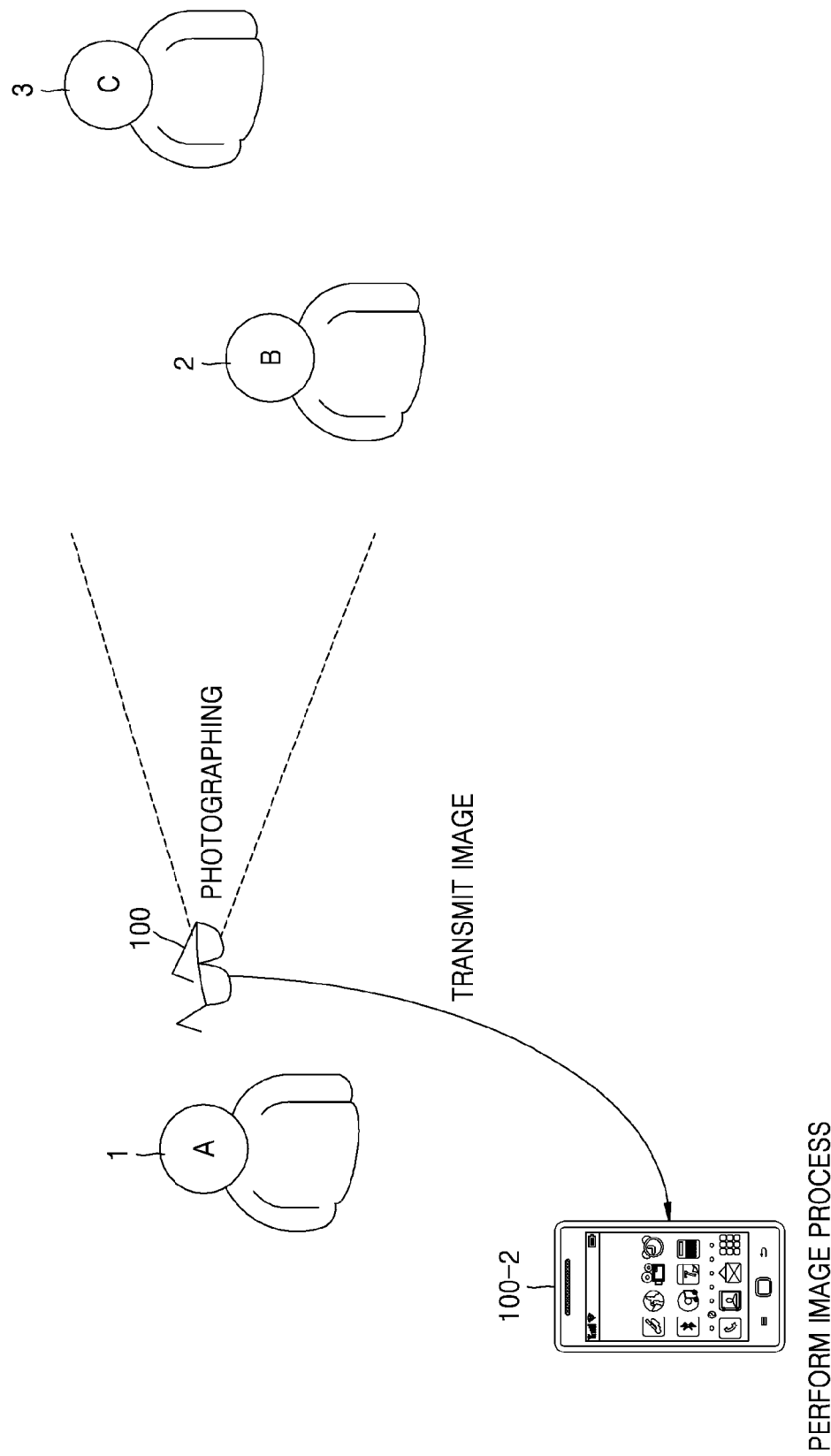
FIGS. 17 and 18 are diagrams for describing methods of modifying an image including a photographing restricted element by using at least two user devices, according to exemplary embodiments.
Figure 18:
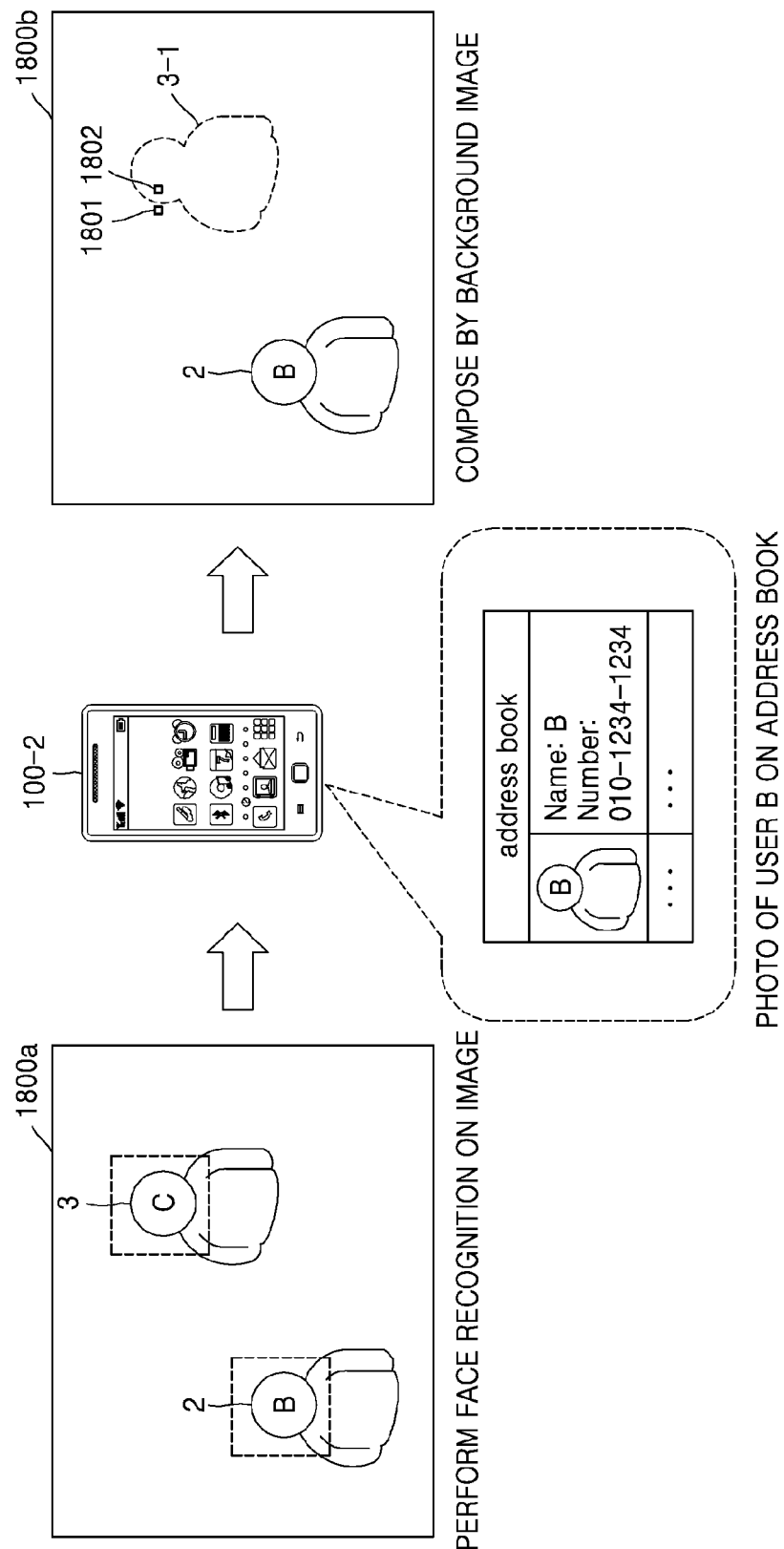

FIGS. 17 and 18 are diagrams for describing methods of modifying an image including a photographing restricted element by using at least two user devices, according to exemplary embodiments. In detail, in the methods of FIGS. 17 and 18, photographing and an image process are performed by different user devices.

Referring to FIG. 17, User A may capture an image including a person by using the smart glasses 100 that is a wearable device. Here, the image includes Users B and C. The smart glasses 100 transmits the image to the smart phone 100-2 that is also a device of User A. Upon receiving the image, the smart phone 100-2 determines whether the image includes a photographing restricted element, and if it is determined that the photographing restricted element is included in the image, the smart phone 100-2 modifies the image.

Referring to FIG. 18, the smart phone 100-2 performs face recognition on people included in an original image 1800*a* received from the smart glasses 100. After recognizing the faces of Users B and C included in the original image 1800*a*, the smart phone 100-2 compares the recognized faces with photos in an address book stored in the smart phone 100-2. The address book stored in the smart phone 100-2 may store photos of people as well as names and phone numbers of the people.

In FIG. 18, if it is determined that a photo of User B is in the address book by comparing the recognized faces with the photos in the address book, the smart phone 100-2 determines that User B is a photographing allowed person. Meanwhile, when a photo of User C is not found in the address book, the smart phone 100-2 determines that User C is a photographing restricted person. Accordingly, the smart phone 100-2 determines that the image includes a photographing restricted element, and modifies the image. For example, the smart phone 100-2 may output a modified image 1800*b* by composing User C who is the photographing restricted person by a background image. A method of composing User C by a background image has been described in detail above with reference to FIG. 8.

Alternatively, the smart phone 100-2 may determine a photographing restricted person by comparing the faces recognized from the original image 1800a with photos stored in an album of the smart phone 100-2 or by analyzing SNS usage records of User A. Methods thereof have been described above with reference to FIGS. 5 and 6.

Also, in FIG. 18, the smart phone 100-2 composes User C by the background image, but alternatively, the original image 1800a may be modified by performing a mosaic process or a blur process on the C user 3 or by composing User C by an alternative image, as described above with reference to FIGS. 7 through 12.

Figure 19:
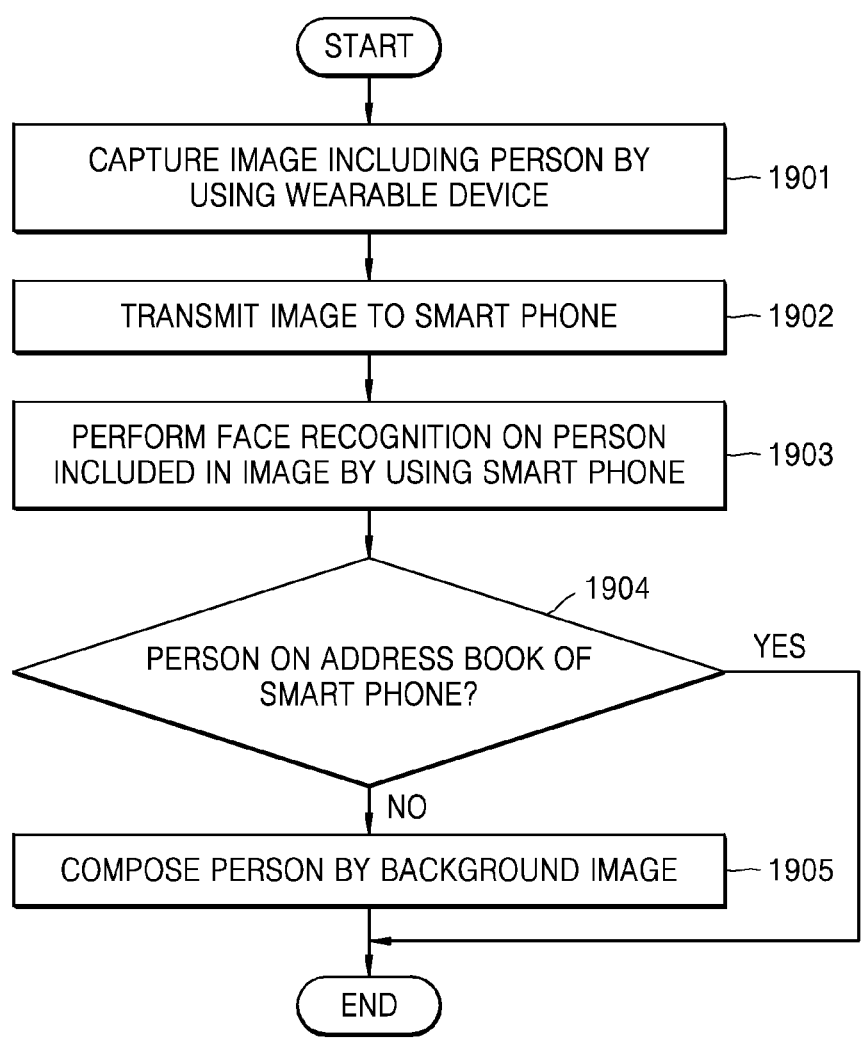
FIG. 19 is a flowchart of a method of modifying an image including a photographing restricted element by using at least two user devices, according to an exemplary embodiment.

FIG. 19 is a flowchart of a method of modifying an image including a photographing restricted element by using at least two user devices, according to an exemplary embodiment.

Referring to FIG. 19, a wearable device captures an image including a person in operation 1901. Here, the wearable device may have a photographing function, such as smart glasses or a smart watch.

In operation 1902, the wearable device transmits the image to a smart phone. Here, the image is transmitted to a smart phone owned by a user of the wearable device, and a device, such as a tablet PC, may be used instead of the smart phone.

In operation 1903, the smart phone performs face recognition on the person included in the image. In detail, the face recognition is performed by detecting a face region from the image and extracting features from the detected face region.

In operation 1904, the smart phone determines whether the person is in an address book of the smart phone. In other words, the smart phone compares the person with photos stored in the address book to determine whether the person is included in at least one of the photos.

If it is determined that the person is not in the address book, a replacement image of the person is composed by a background image in operation 1905.

Figure 20:
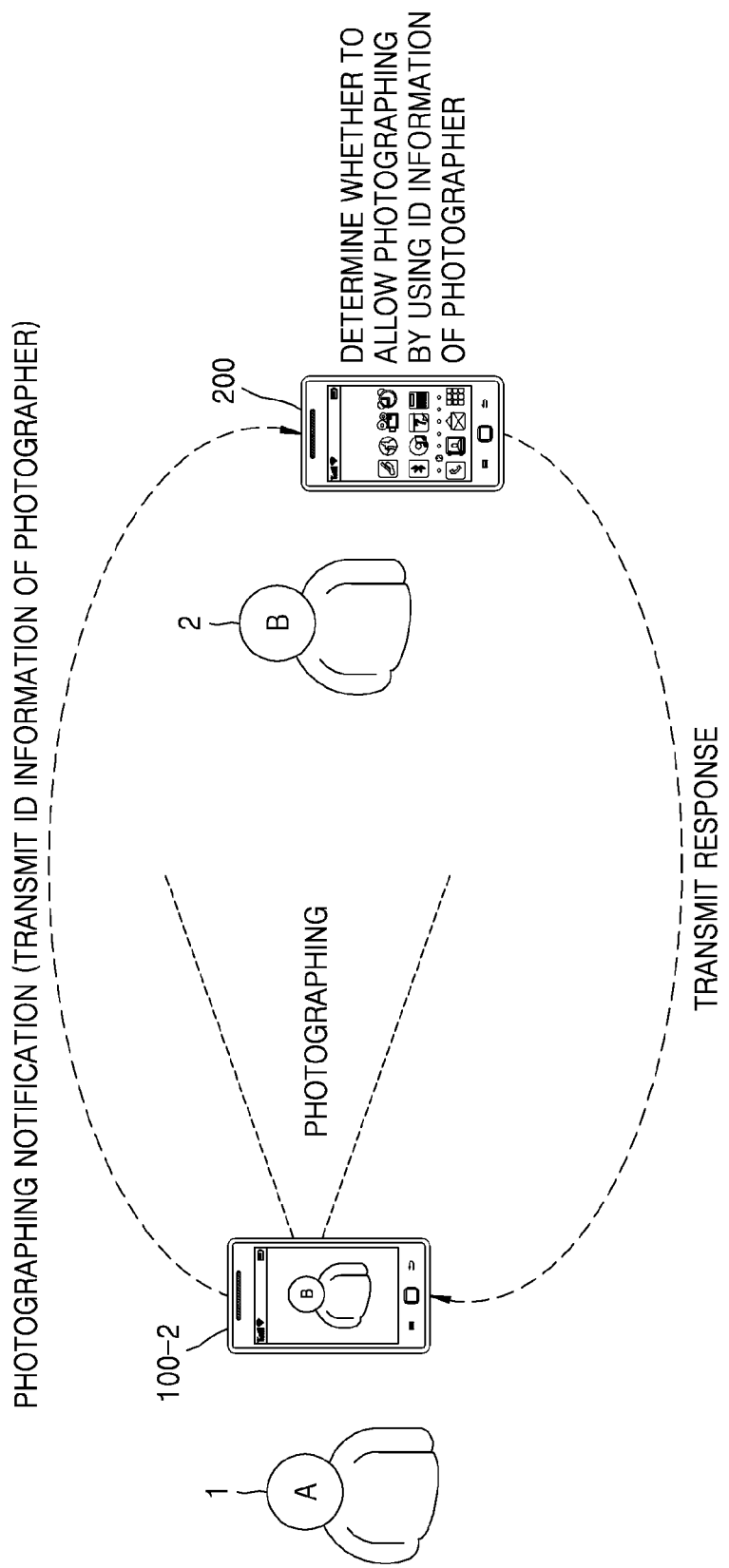
FIGS. 20 through 22 are diagrams for describing methods of modifying an image including a photographing restricted element via communication with a device of a photographee, according to exemplary embodiments.
Figure 21:
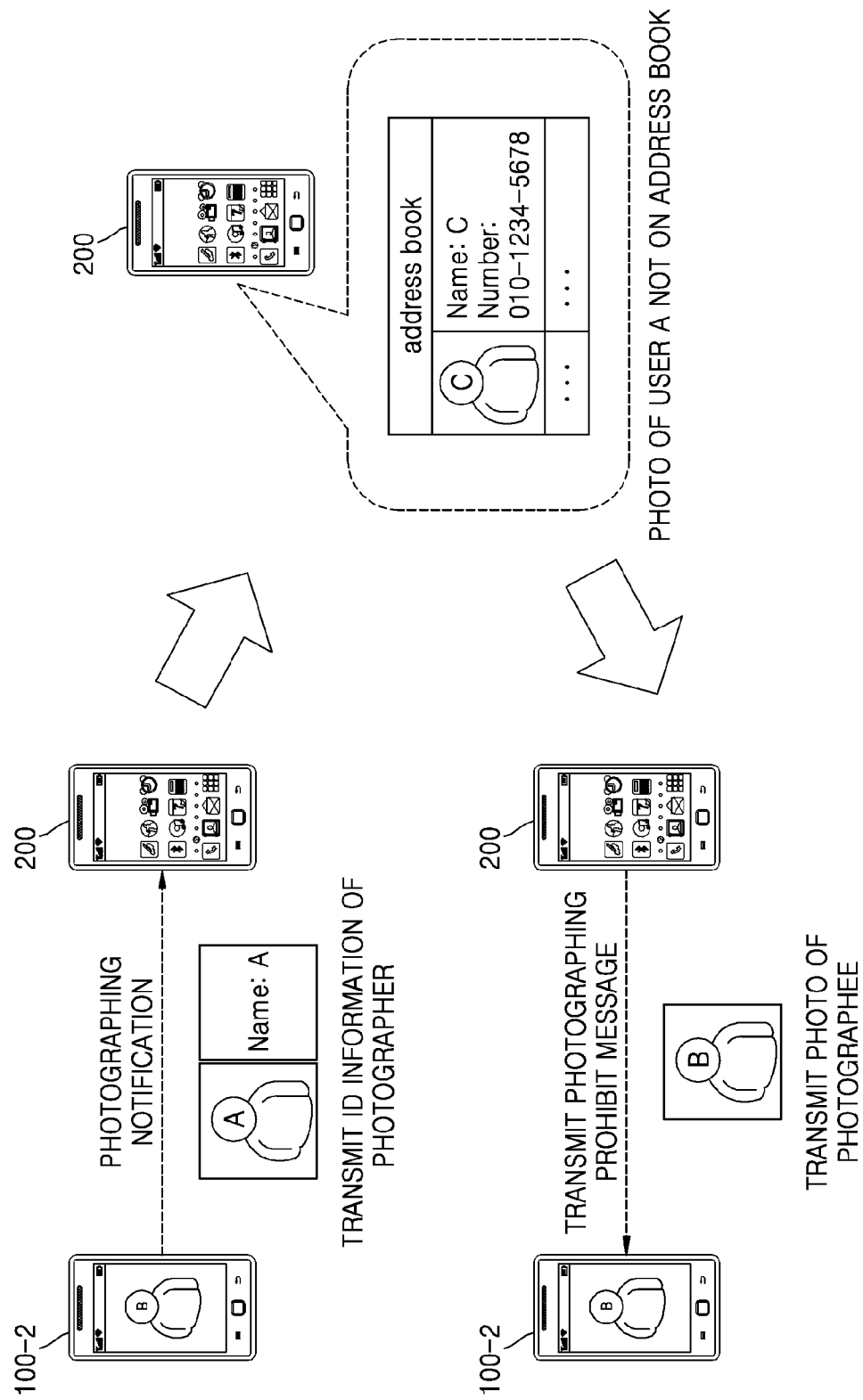
Figure 22:
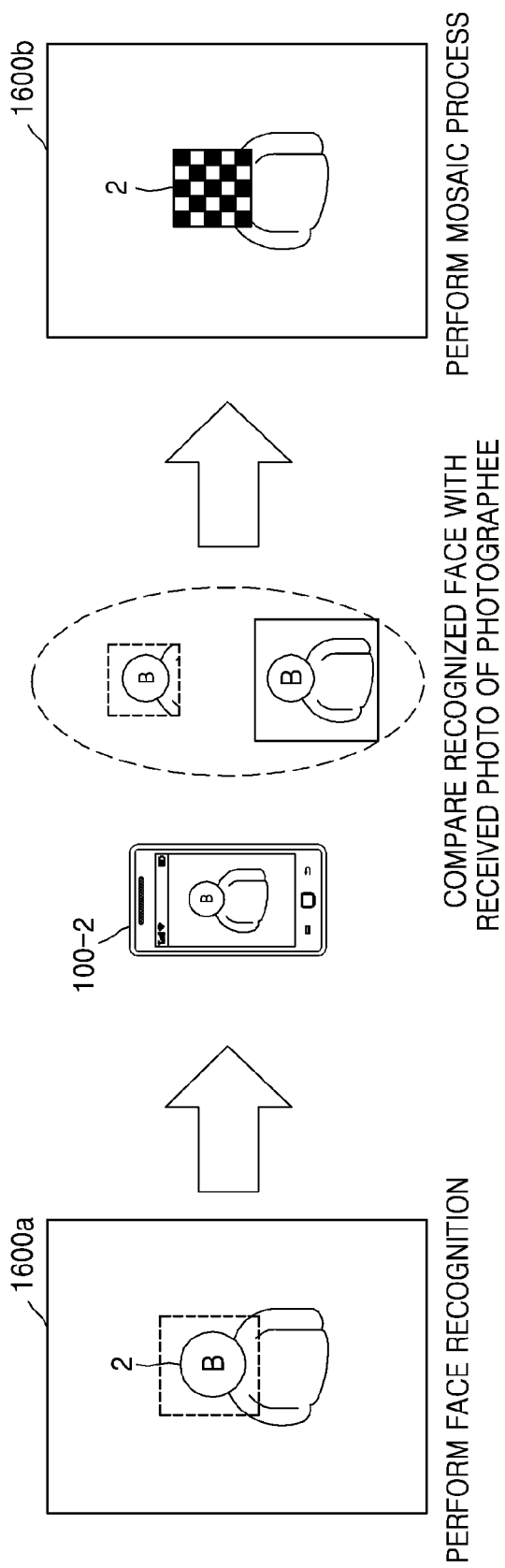

FIGS. 20 through 22 are diagrams for describing methods of modifying an image including a photographing restricted element via communication with a device of a photographee, according to exemplary embodiments. In detail, according to the methods of FIGS. 20 through 22, the device of the photographee transmits a response to whether photographing is allowed to a device of a photographer.

Referring to FIG. 20, the smart phone 100-2 of User A captures an image including User B. While capturing the image, the smart phone 100-2 transmits a photographing notification to a smart phone 200 of User B who is the photographee. Here, the photographing notification may include identification (ID) information that identifies User A.

Upon receiving the photographing notification, the smart phone 200 determines that the photographer is User A by using the ID information included in the photographing notification, and determines whether to allow the photographer (User A) to capture an image of User B. A method of distinguishing a photographer by using ID information included in a photographing notification and determining whether to allow photographing will be described in detail below with reference to FIG. 21.

After determining whether to allow the photography, the smart phone 200 transmits a response to the smart phone 100-2. The smart phone 100-2 modifies the image or stores the image without modification based on the response.

In FIG. 21, the smart phone 100-2 of User A transmits a photographing notification to the smart phone 200 of User B, and the smart phone 200 determines whether to allow photographing and transmits a response to the smart phone 100-2.

Referring to FIG. 21, the smart phone 100-2 transmits the photographing notification including the ID information of User A to the smart phone 200 while photographing User B. Here, the ID information included in the photographing notification may include a name and photo of User A.

The smart phone 200 determines whether to allow User A to photograph based on the ID information of User A included in the photographing notification received from the smart phone 100-2. In detail, the smart phone 200 compares the photo of User A included in the ID information with photos stored in an address book or compares the name of User A included in the ID information with names stored in the address book. If it is determined that the photo or name of User A is not in the address book, the smart phone 200 does not allow the photography. On the other hand, if the photo or name of User A is in the address book, the smart phone 200 allows the photography.

Alternatively, the smart phone 200 may determine whether to allow the photography by comparing the photo of User A included in the ID information with photos stored in an album of the smart phone 200, or by analyzing SNS usage records of User B.

In FIG. 21, if the photo of User A is not in the address book of the smart phone 200, the smart phone 200 determines not to allow the photography and transmits a photography-prohibited message to the smart phone 100-2. At this time, the smart phone 200 transmits a photo of User B together with the photography-prohibited message to the smart phone 100-2.

Then, referring to FIG. 22, the smart phone 100-2 performs face recognition on an original image 1600a. After performing the face recognition, the smart phone 100-2 compares the photo of User B received from the smart phone 200 together with the photography-prohibited message, with a face recognized in the original image 1600a. If the recognized face matches the photo of User B, the smart phone 100-2 performs a mosaic process on a face region of User B in the original image 1600a and outputs a modified image 1600b. Alternatively, the smart phone 100-2 may modify the original image 1600a performing by a blur process on User B, by composing a replacement image of User B with a background image, or by composing the replacement image of User B with an alternative image.

Figure 23:
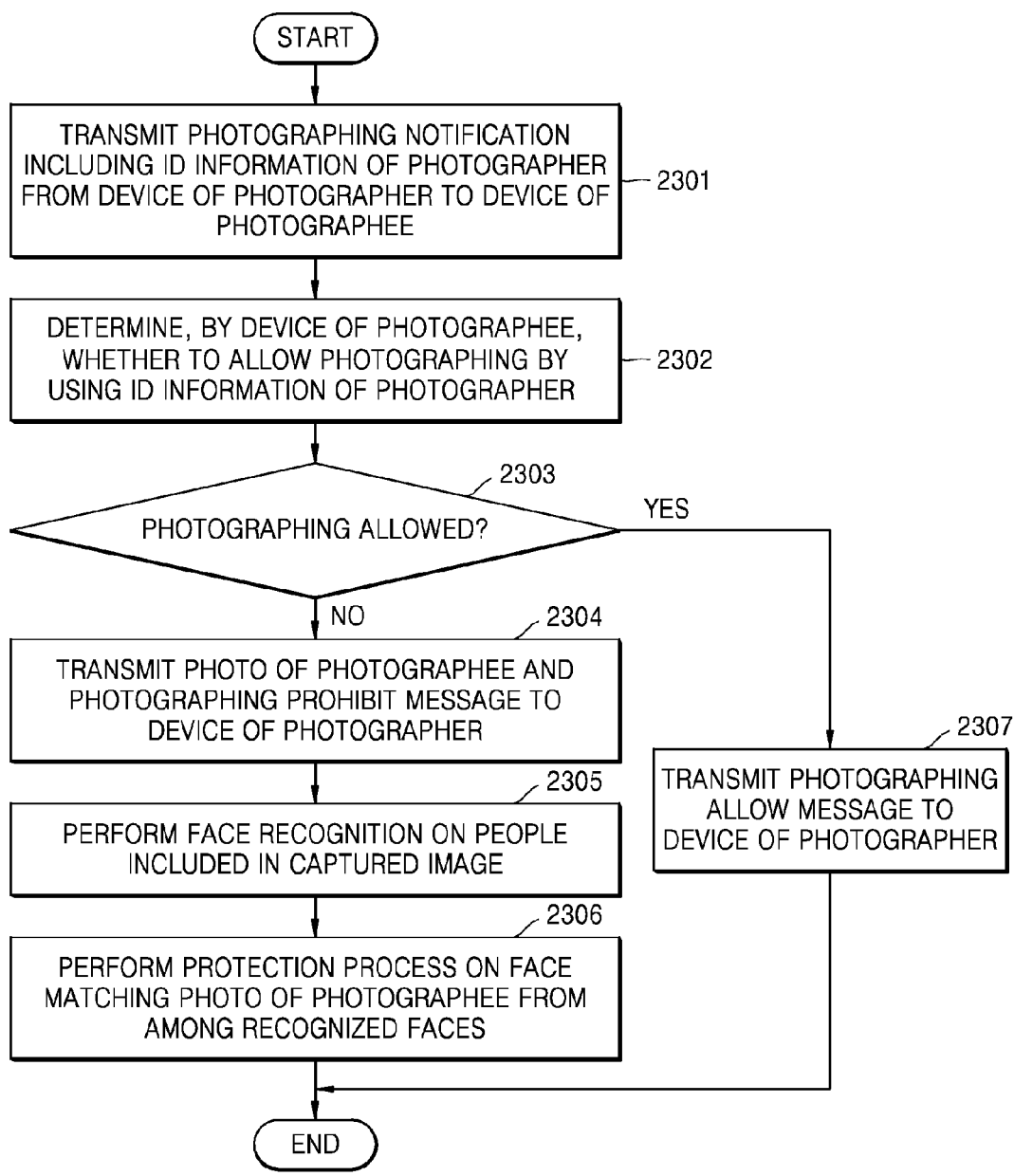
FIGS. 23 and 24 are flowcharts of methods of modifying an image including a photographing restricted element via communication with a device of a photographee, according to exemplary embodiments.
Figure 24:
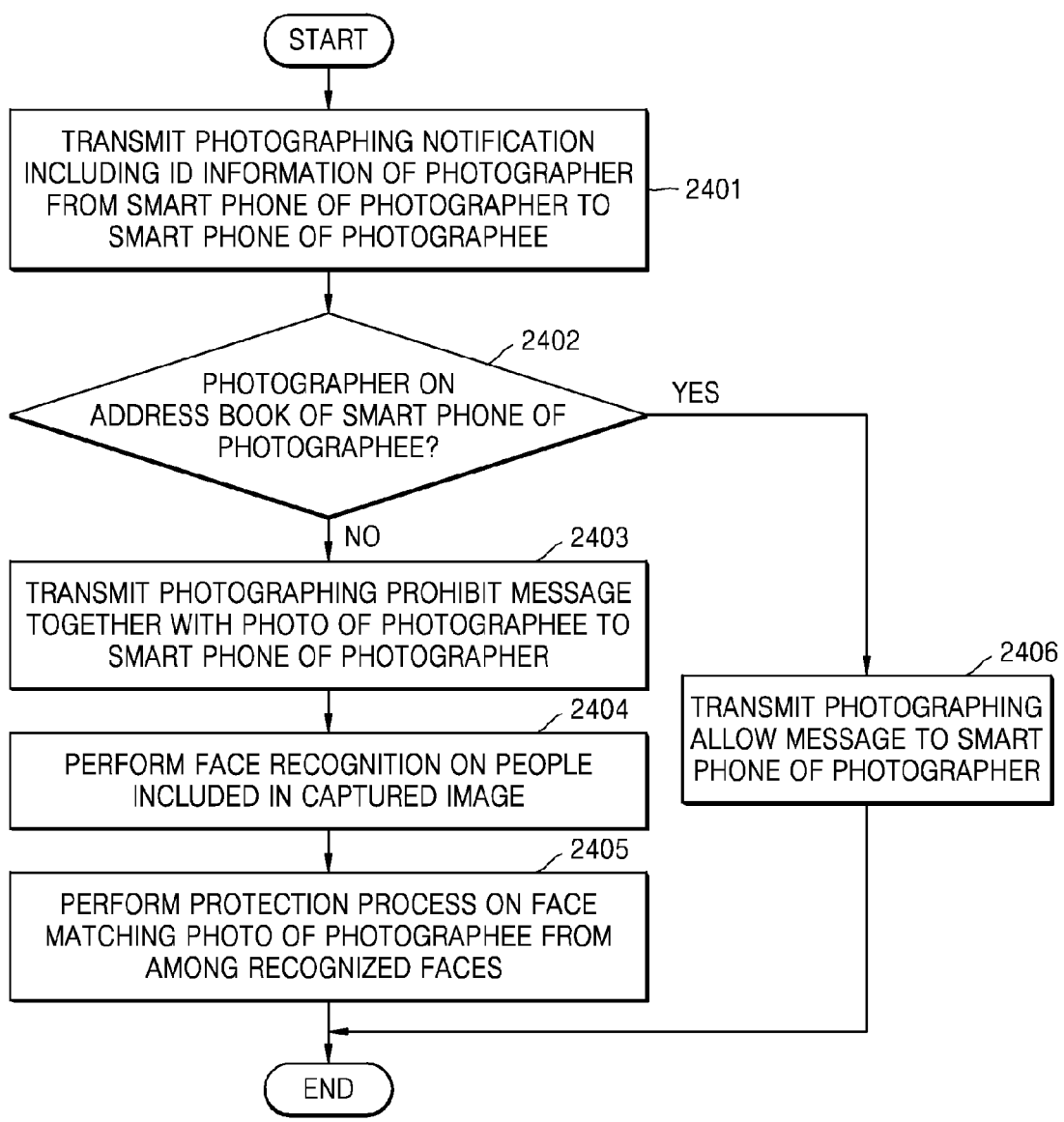

FIGS. 23 and 24 are flowcharts of methods of modifying an image including a photographing restricted element via communication with a device of a photographee, according to exemplary embodiments.

Referring to FIG. 23, a device of a photographer transmits a photographing notification including ID information of the photographer to a device of a photographee, in operation 2301. For example, the device of the photographer may search for a device located within a certain range during photographing, and transmit the photographing notification to the searched device. The device may be searched for and the photographing notification may be transmitted by using near field communication, such as Wi-Fi direct or Bluetooth, and an approval of the device of the photographee for transmitting the photographing notification may be required.

In operation 2302, the device of the photographee determines whether to allow the photography based on the ID information of the photographer included in the photographing notification.

If it is determined that the photography is allowed in operation 2303, operation 2307 is performed. In operation 2307, the device of the photographee transmits a photography-allowed message to the device of the photographer. Then, the device of the photographer determines that a captured image does not include a photographing restricted element and stores the captured image without modification.

If it is determined that the photographing is not allowed in operation 2303, operation 2304 is performed. In operation 2304, the device of the photographee transmits a photography-prohibited message together with a photo of the photographee to the device of the photographer.

In operation 2305, the device of the photographer performs face recognition on people included in the captured image.

In operation 2306, the device of the photographer compares faces recognized from the captured image with the photo of the photographee, and performs a protection process on a face matching the photo of the photographee. In other words, a mosaic process, a blur process, a composing process by a background image, or a composing process by an alternative image is performed on the face matching the photo of the photographee.

FIG. 24 is a flowchart of a method of determining whether to allow photographing by using an address book of a device of a photographee.

Referring to FIG. 24, a smart phone of a photographer transmits a photographing notification including ID information of the photographer to a smart phone of a photographee, in operation 2401.

In operation 2402, the smart phone of the photographee determines whether the photographer is in the address book by using the ID information of the photographer. In detail, a name or photo of the photographer included in the ID information is compared with names or photos stored in the address book. Alternatively, the smart phone of the photographee may determine whether to allow photographing by comparing the ID information of the photographer with an album stored in the smart phone of the photographee or by analyzing SNS usage records of the photographee.

If it is determined that the photographer is in the address book in operation 2402, it is determined that the photographing is allowed and the smart phone of the photographee transmits a photography-allowed message to the smart phone of the photographer in operation 2406.

If it is determined that the photographer is not in the address book in operation 2402, it is determined that the photographing is not allowed and operation 2403 is performed.

In operation 2403, the smart phone of the photographee transmits a photography-prohibited message together with a photo of the photographee to the smart phone of the photographer.

In operation 2404, the smart phone of the photographer performs face recognition on people included in a captured image.

In operation 2405, the smart phone of the photographer compares the recognized faces with the photo of the photographee, and performs a protection process on a face matching the photo of the photographee. In other words, a mosaic process, a blur process, a composing process by a background image, or a composing process with an alternative image is performed on the face matching the photo of the photographee.

Figure 25:
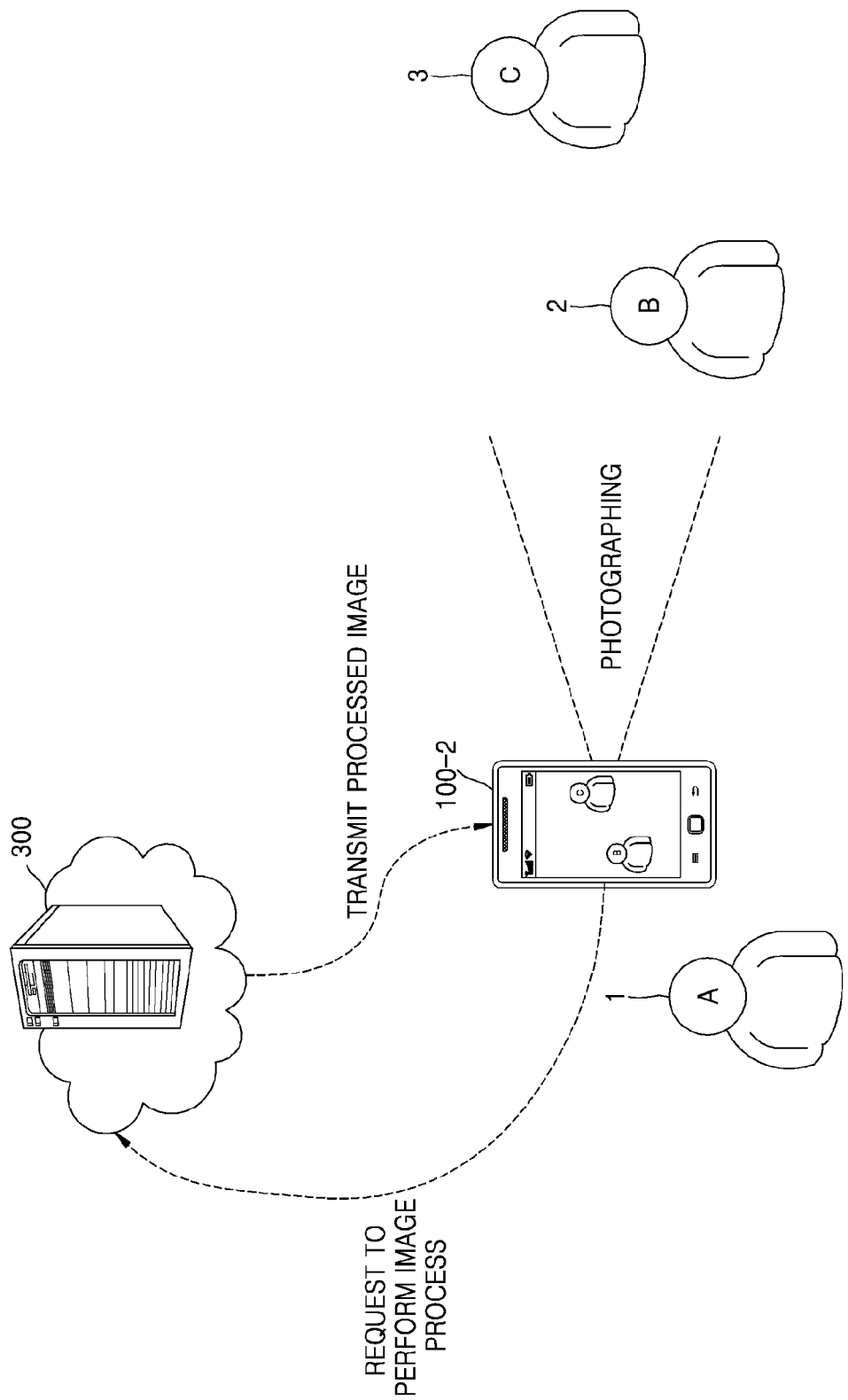
FIGS. 25 and 26 are diagrams for describing methods of modifying an image including a photographing restricted element by using a server, according to exemplary embodiments.
Figure 26:
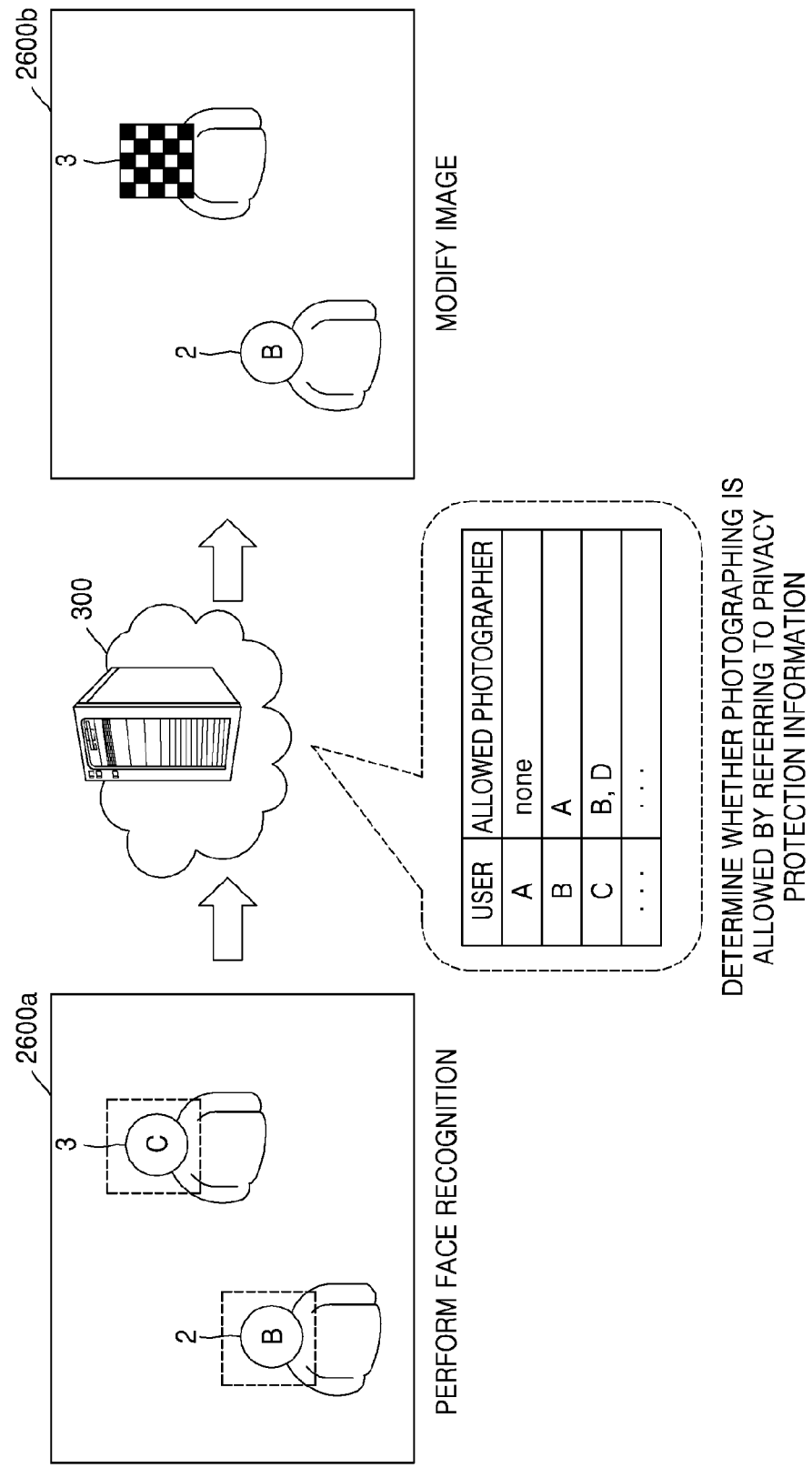

FIGS. 25 and 26 are diagrams for describing methods of modifying an image including a photographing restricted element by using a server, according to exemplary embodiments.

Referring to FIG. 25, the smart phone 100-2 of User A captures an original image including Users B and C, and transmits the original image to a server 300 for an image processing. The server 300 determines whether a photographing restricted element is included in the original image, and if it is determined that the photographing restricted element is included, modifies the original image and transmits the modified image to the smart phone 100-2 of User A. A method of determining, by the server 300, whether a photographing restricted element is included in an image will now be described in detail with reference to FIG. 26.

Referring to FIG. 26, the server 300 performs face recognition on an original image 2600a received from the smart phone 100-2 of User A to recognize faces of Users B and C. The server 300 determines whether Users B and C have allowed User A to take a picture of themselves by referring to privacy protection information 2610 pre-stored in the server 300.

Here, the privacy protection information 2610 defines another user who is allowed to photograph with respect to at least one user. Referring to FIG. 26, another user who is allowed to photograph is mapped according to users in the privacy protection information 2610. For example, User A does not allow anyone to photograph himself/herself. Also, User B only allows User A to photograph himself/herself, and User C allows User B and User D to photograph himself/herself.

The server 300 compares the faces of Users B and C recognized from the original image 2600a with the privacy protection information 2610 to determine whether photography is allowed. According to the privacy protection information 2610, since User B allows User A to take a picture of himself/herself and User C does not, the server 300 determines that User C is a photographing restricted element.

Meanwhile, in order to determine whether photography is allowed, the server 300 needs to check that a photographer of the original image 2600a is User A. Accordingly, the smart phone 100-2 of User A may transmit ID information of User A together with the original image 2600a to the server 300.

After determining that User C is a photographing restricted element, the server 300 generates a modified image 2600b by performing a mosaic process on User C in the original image 2600a, and transmits the modified image 2600b to the smart phone 100-2 of User A. Alternatively, the server 300 may modify the original image 2600a by performing a blur process, a composing process by a background image, or a composing process by an alternative image.

Figure 27:
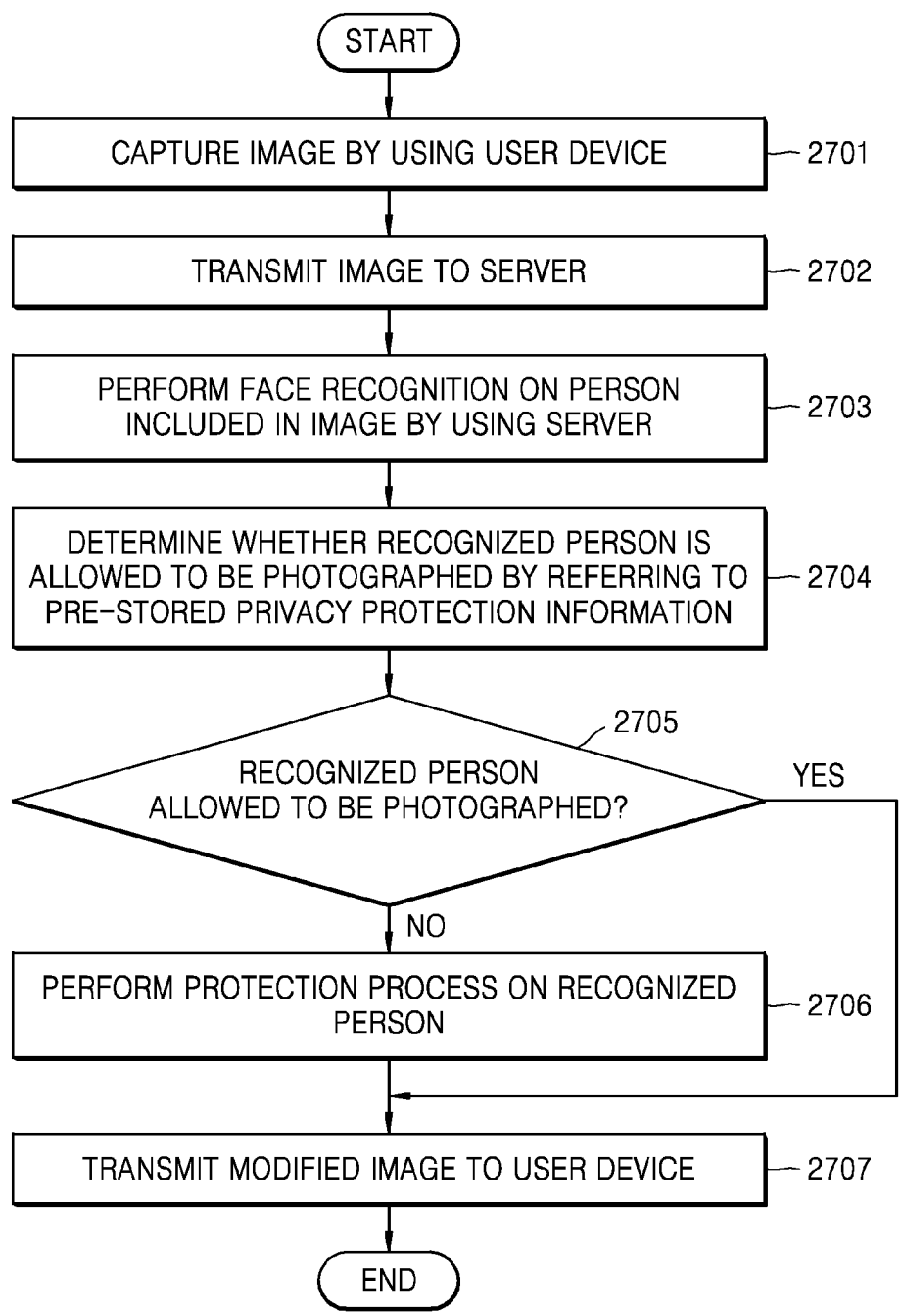
FIG. 27 is a flowchart of a method of modifying an image including a photographing restricted element by using a server, according to an exemplary embodiment.

FIG. 27 is a flowchart of a method of modifying an image including a photographing restricted element by using a server, according to an exemplary embodiment.

Referring to FIG. 27, a user device captures an image in operation 2701.

In operation 2702, the user device transmits the image to a server and requests the server to perform an image process.

In operation 2703, the server performs face recognition on a person included in the image received from the user device.

In operation 2704, the server determines whether the recognized person is allowed to be photographed by referring to pre-stored privacy protection information. In other words, the server determines whether the recognized person is allowed to be photographed by a photographer of the image. A method of determining whether photographing is allowed by using privacy protection information has been described above with reference to FIG. 26.

If it is determined that the recognized person is not allowed to be photographed in operation 2705, the server performs a protection process on the recognized person in operation 2706. In operation 2707, the server transmits a modified image to the user device.

If it is determined that the recognized person is allowed to be photographed in operation 2705, the server transmits the image to the user device without modification in operation 2707.

FIGS. 28 through 31 are diagrams for describing a method of modifying an image including a photographing restricted element by using a server, according to other exemplary embodiments. In detail, according to the methods of FIGS. 28 through 31, a user device that performs photographing encodes an original image by using an encryption key managed by a server before transmitting the original image to the server, and thus a photographer is unable to access the original image that is not processed by the server.

Figure 28:
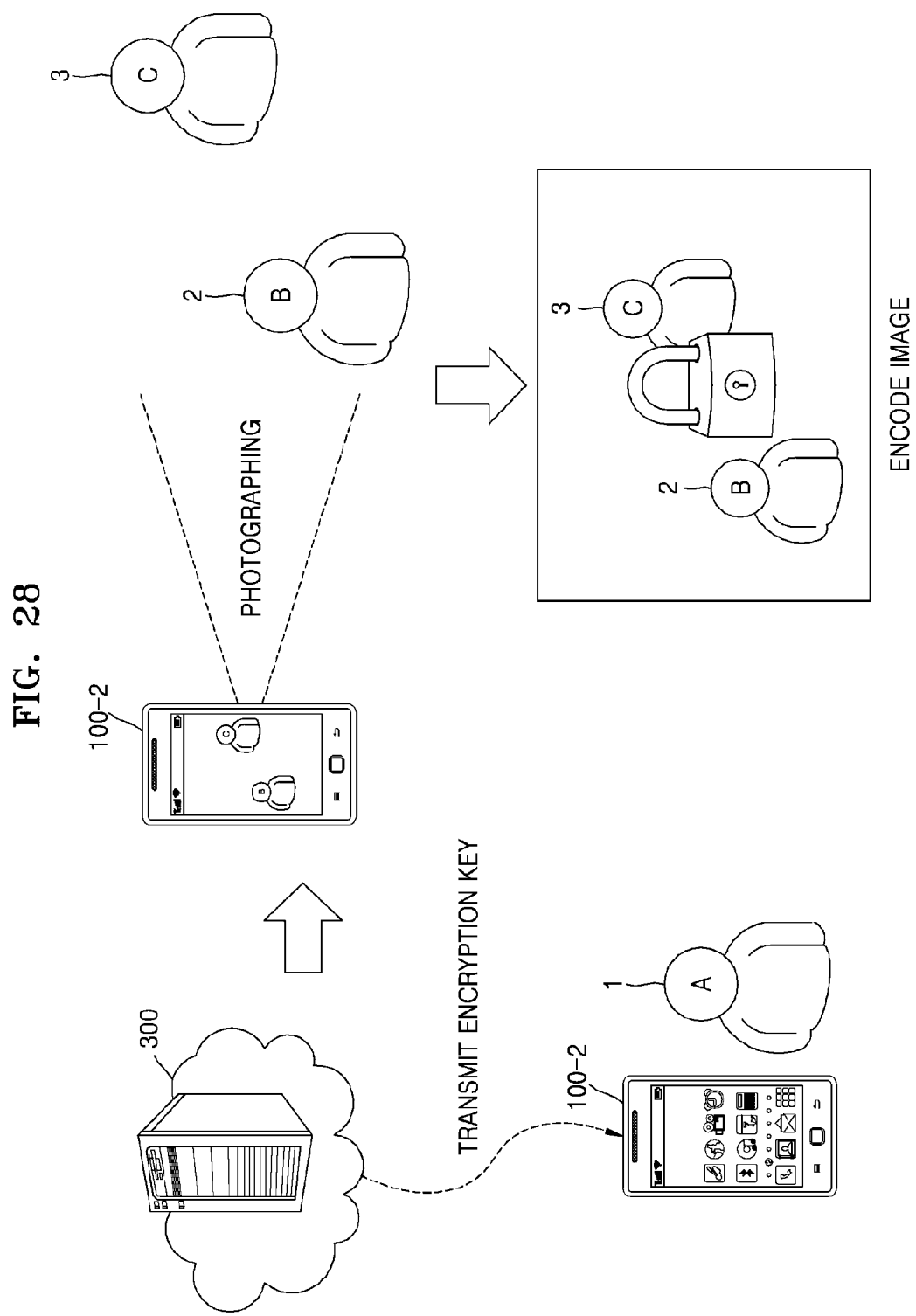
FIGS. 28 through 31 are diagrams for describing a method of modifying an image including a photographing restricted element by using a server, according to other exemplary embodiments.

Referring to FIG. 28, the smart phone 100-2 of User A receives an encryption key from the server 300. Here, the encryption key is managed by the server 300. The smart phone 100-2 of User A captures an image including Users B and C, and encodes the image by using the encryption key received from the server 300. Here, since the smart phone 100-2 of User A encodes the image immediately after the image is captured, User A is unable to access the image.

Figure 29:
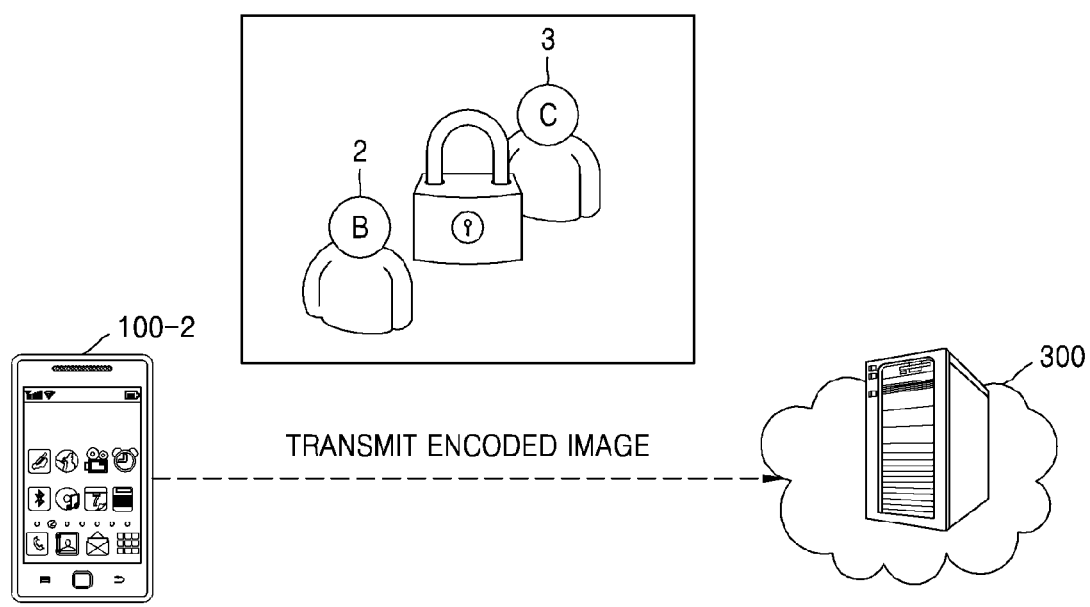

As shown in FIG. 29, the smart phone 100-2 of User A transmits the encoded image to the server 300.

Figure 30:
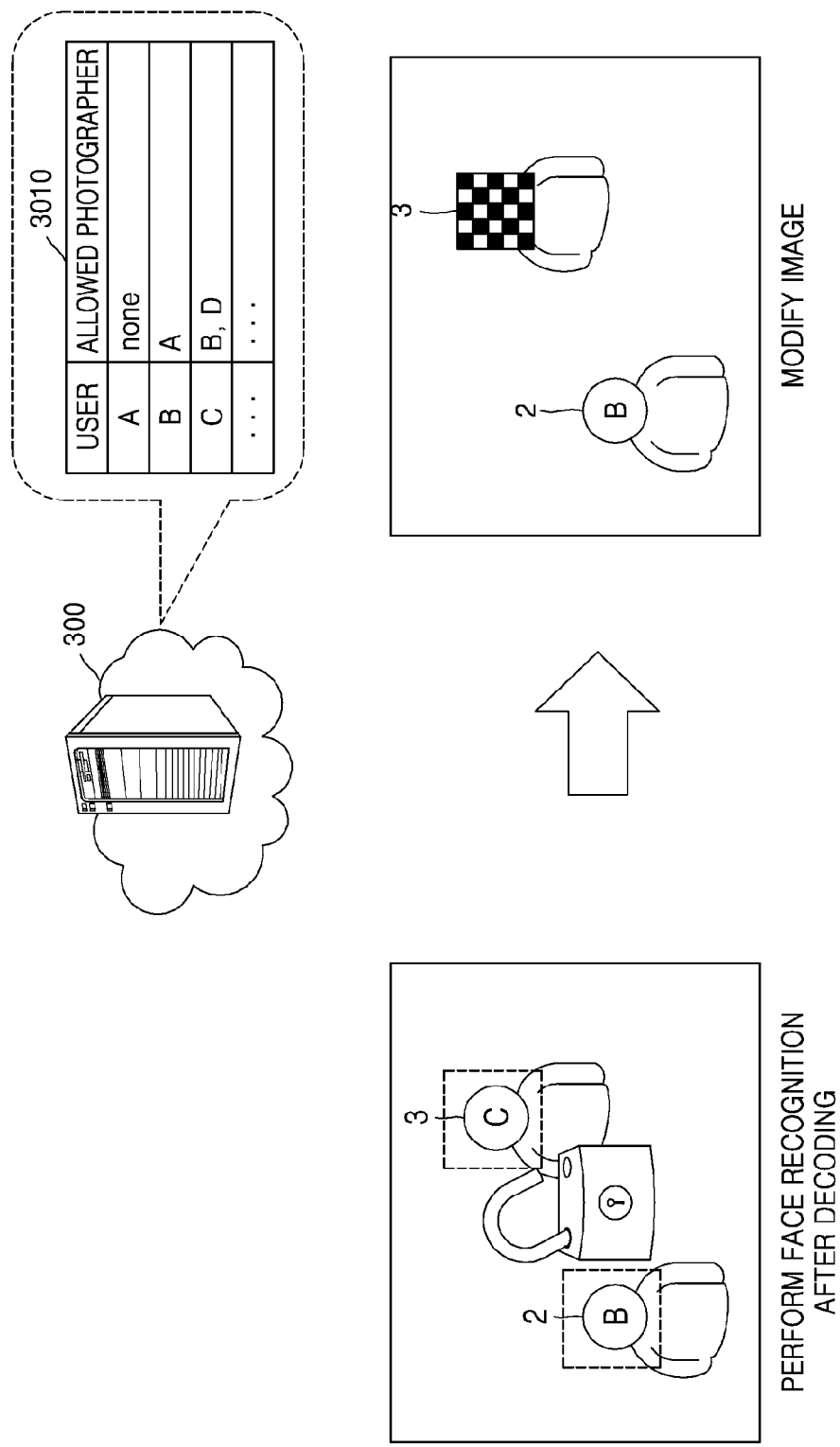

Referring to FIG. 30, the server 300 decodes the encoded image. Since the encryption key used to encode the encoded image is managed by the server 300, the server 300 may use the encryption key to decode the encoded image. The server 300 recognizes faces of Users B and C by performing face recognition on the decoded image. After performing the face recognition, the server 300 determines whether Users B and C are allowed to be photographed by using privacy protection information 3010 pre-stored in the server 300. A method of determining whether photographing is allowed by using privacy protection information has been described above with reference to FIG. 26.

If it is determined that photographing User C is not allowed based on the privacy protection information 3010, the server 300 may modify the decoded image by performing a mosaic process on User C.

Figure 31:
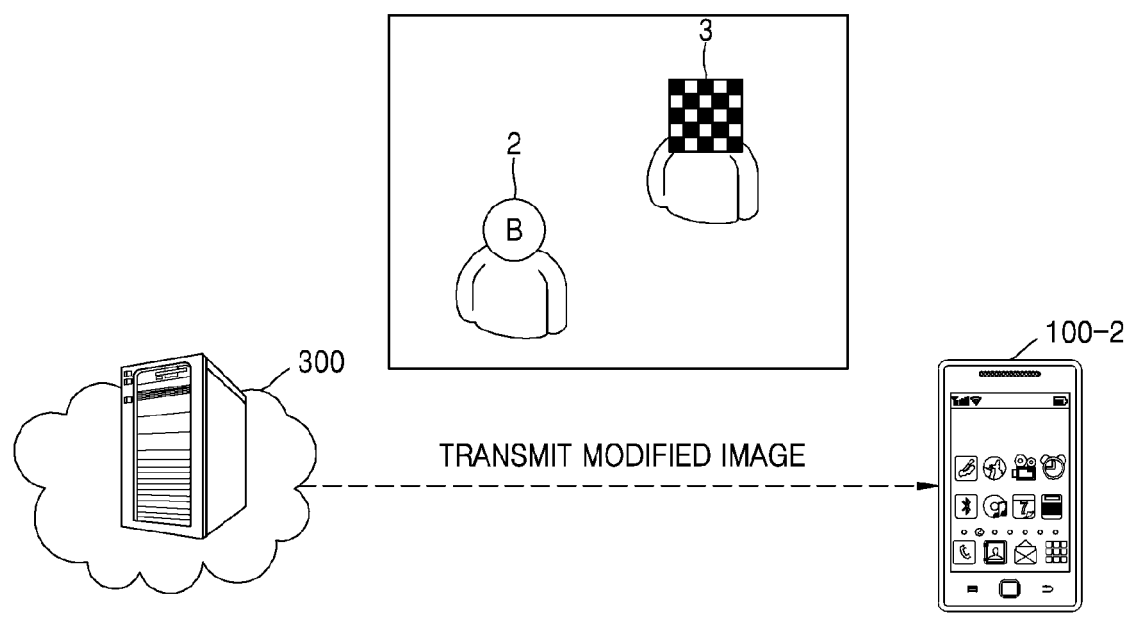

Then, the server 300 transmits a modified image to the smart phone 100-2 of User A as shown in FIG. 31.

Figure 32:
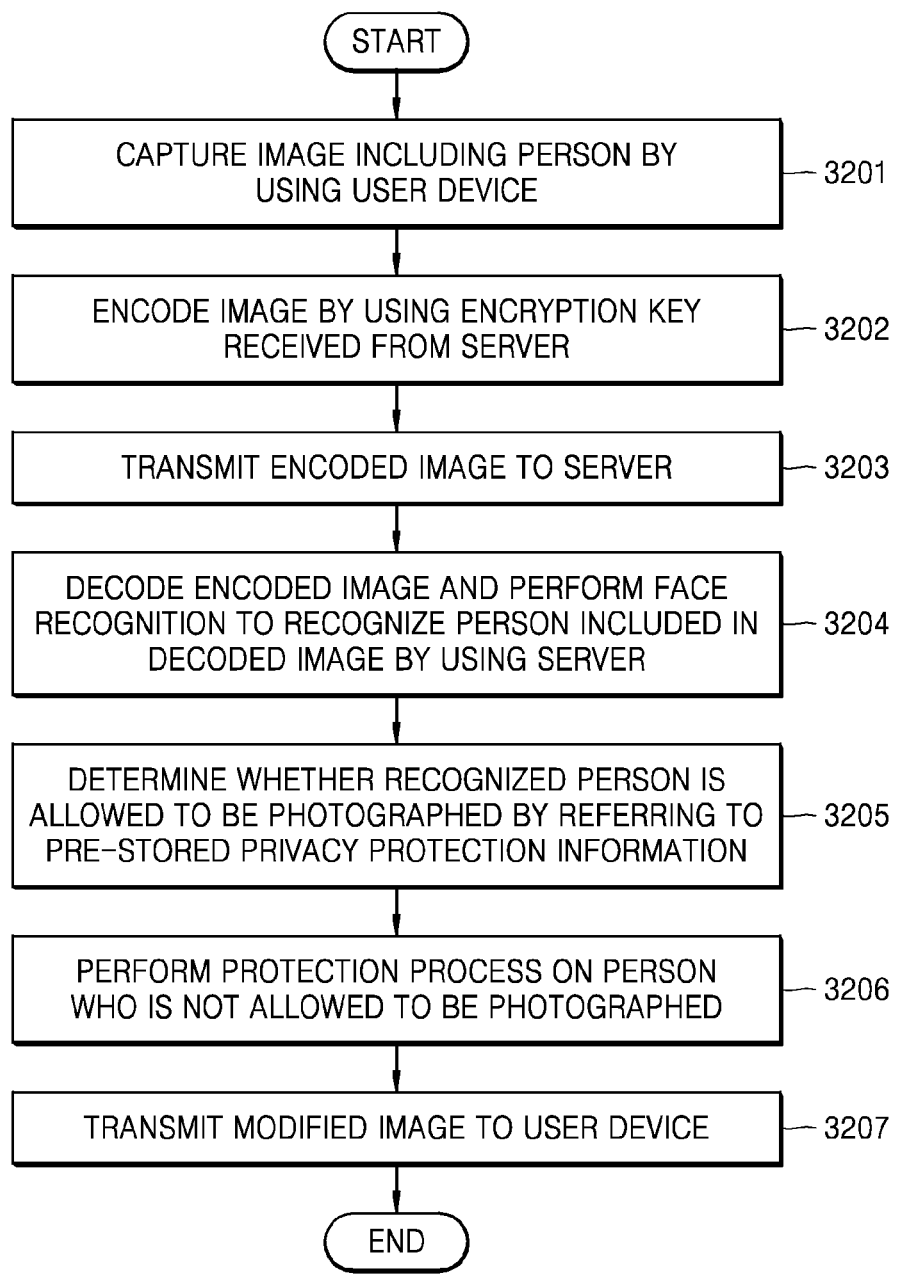
FIG. 32 is a flowchart of a method of modifying an image including a photographing restricted element by using a server, according to another exemplary embodiment.

FIG. 32 is a flowchart of a method of modifying an image including a photographing restricted element by using a server, according to another exemplary embodiment.

Referring to FIG. 32, a user device captures an image including a person, in operation 3201.

In operation 3202, the user device encodes the image by using an encryption key received from a server. Here, the encryption key is managed by the server.

In operation 3203, the user device transmits the encoded image to the server.

In operation 3204, the server decodes the encoded image received from the user device and performs face recognition to recognize the person included in the decoded image.

In operation 3205, the server determines whether the recognized person is allowed to be photographed by using privacy protection information pre-stored in the server. A method of determining photographing by referring to privacy protection information has been described above with reference to FIG. 26.

In operation 3206, the server performs a protection process on a person who is not allowed to be photographed. For example, the server may perform a mosaic process, a blur process, a composing process by a background image, or a composing process by an alternative image on the person who is not allowed to be photographed.

In operation 3207, the server transmits a modified image to the user device.

FIGS. 33 through 37 are diagrams for describing a method of modifying an image including a photographing restricted object, according to an exemplary embodiment.

Figure 33:
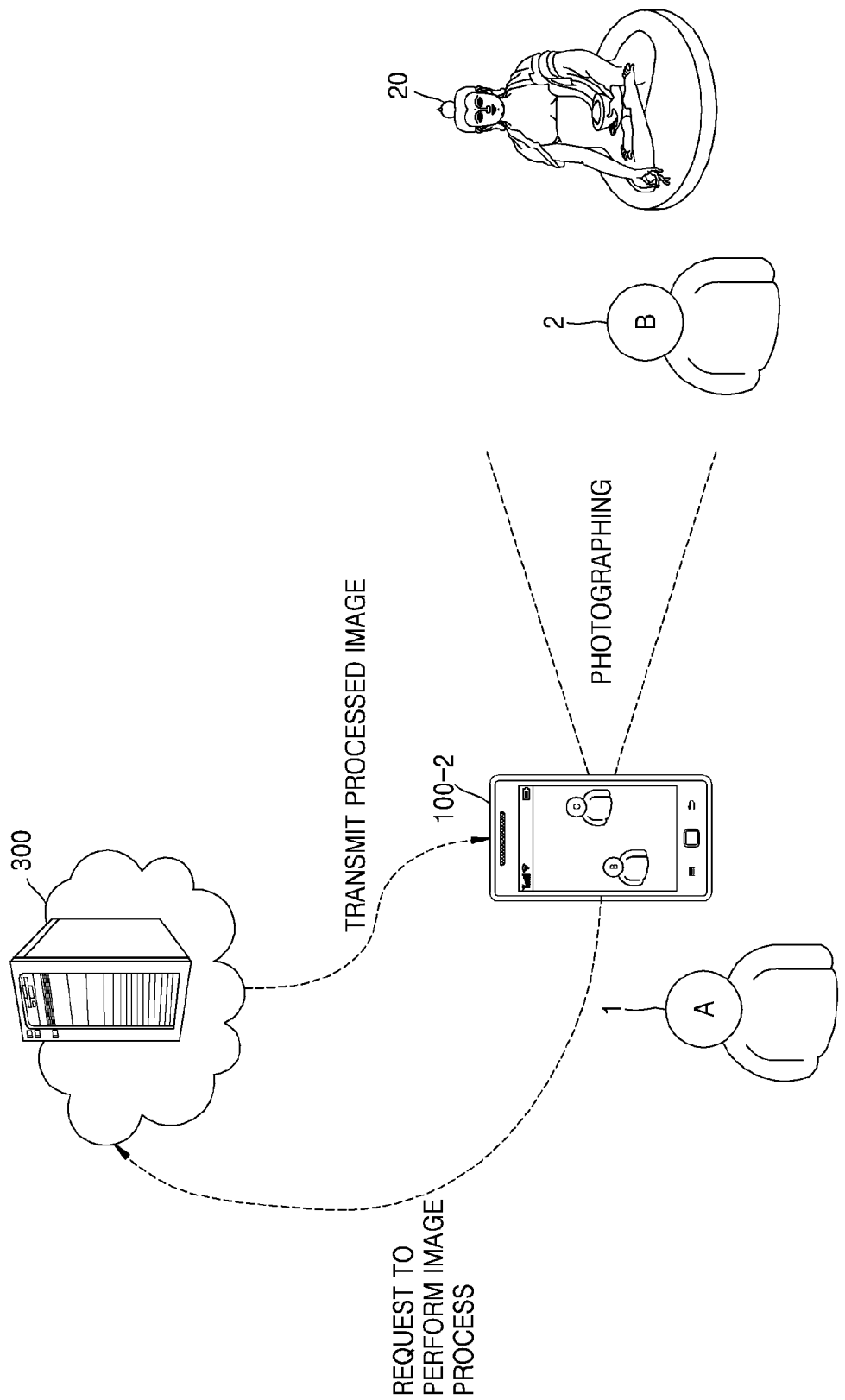
FIGS. 33 through 37 are diagrams for describing a method of modifying an image including a photographing restricted object, according to an exemplary embodiment.

Referring to FIG. 33, the smart phone 100-2 of User A captures an image including User B and the sculpture 20. The smart phone 100-2 of User A transmits the image to the server 300 to request the server 300 to perform an image process. The server 300 determines whether the image includes a photographing restricted element, and if the photographing restricted element is included, modifies the image and transmits the modified image to the smart phone 100-2 of User A. A method of determining, by the server 300, whether a photographing restricted element is included in an image and modifying the image will be described below with reference to FIGS. 34 through 37.

Figure 34:
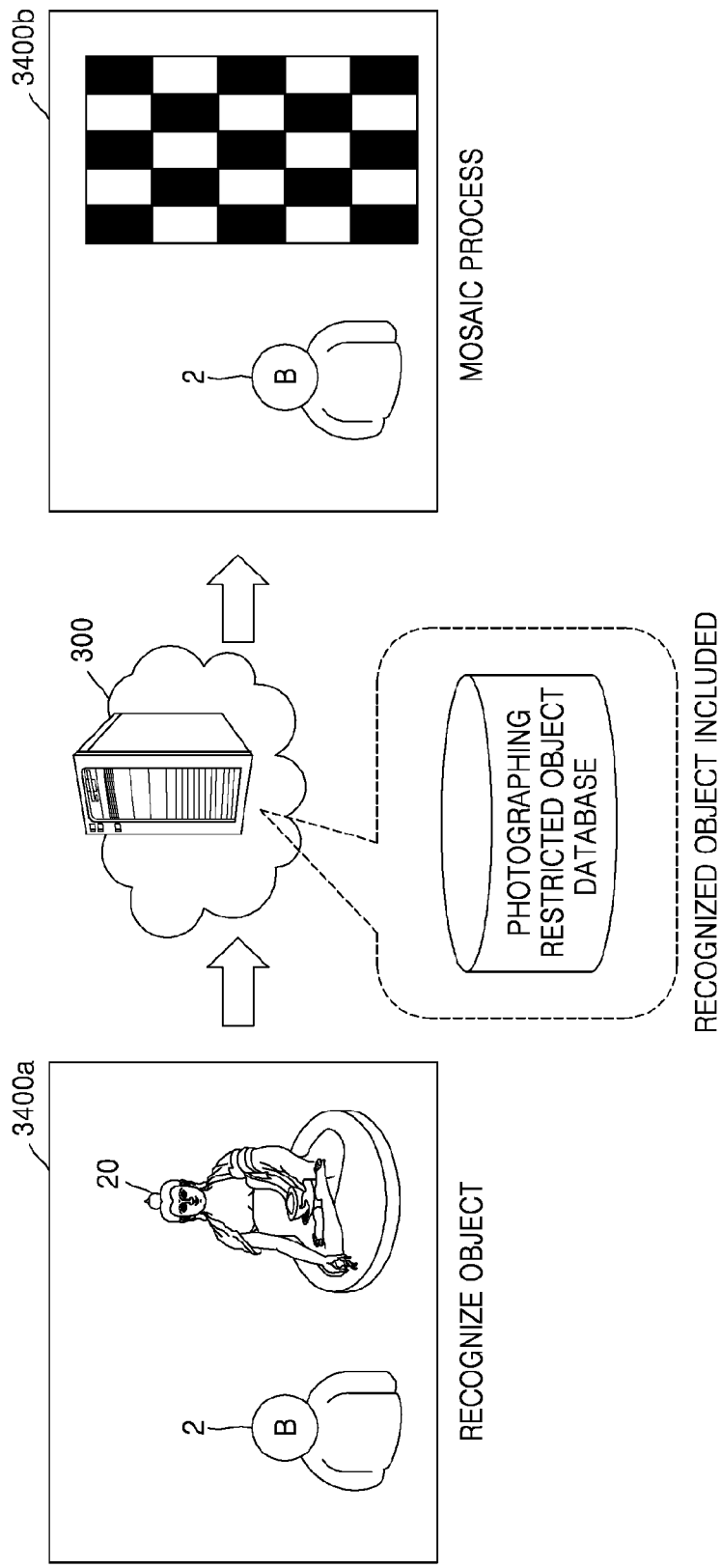

Referring to FIG. 34, the server 300 recognizes an object included in an original image 3400a. In other words, the sculpture 20 is recognized by extracting features, such as a shape and color, of the sculpture 20 included in the original image 3400a. The server 300 determines whether the sculpture 20 is in a photographing restricted object database stored in the server 300. The photographing restricted object database stores photos of photographing restricted objects.

If the sculpture 20 is in the photographing restricted object database, the server 300 determines that the sculpture 20 is a photographing restricted element. The server 300 performs a mosaic process on the sculpture 20 in the original image 3400a to generate a modified image 3400b, and transmits the modified image 3400b to the smart phone 100-2 of User A.

Figure 35:
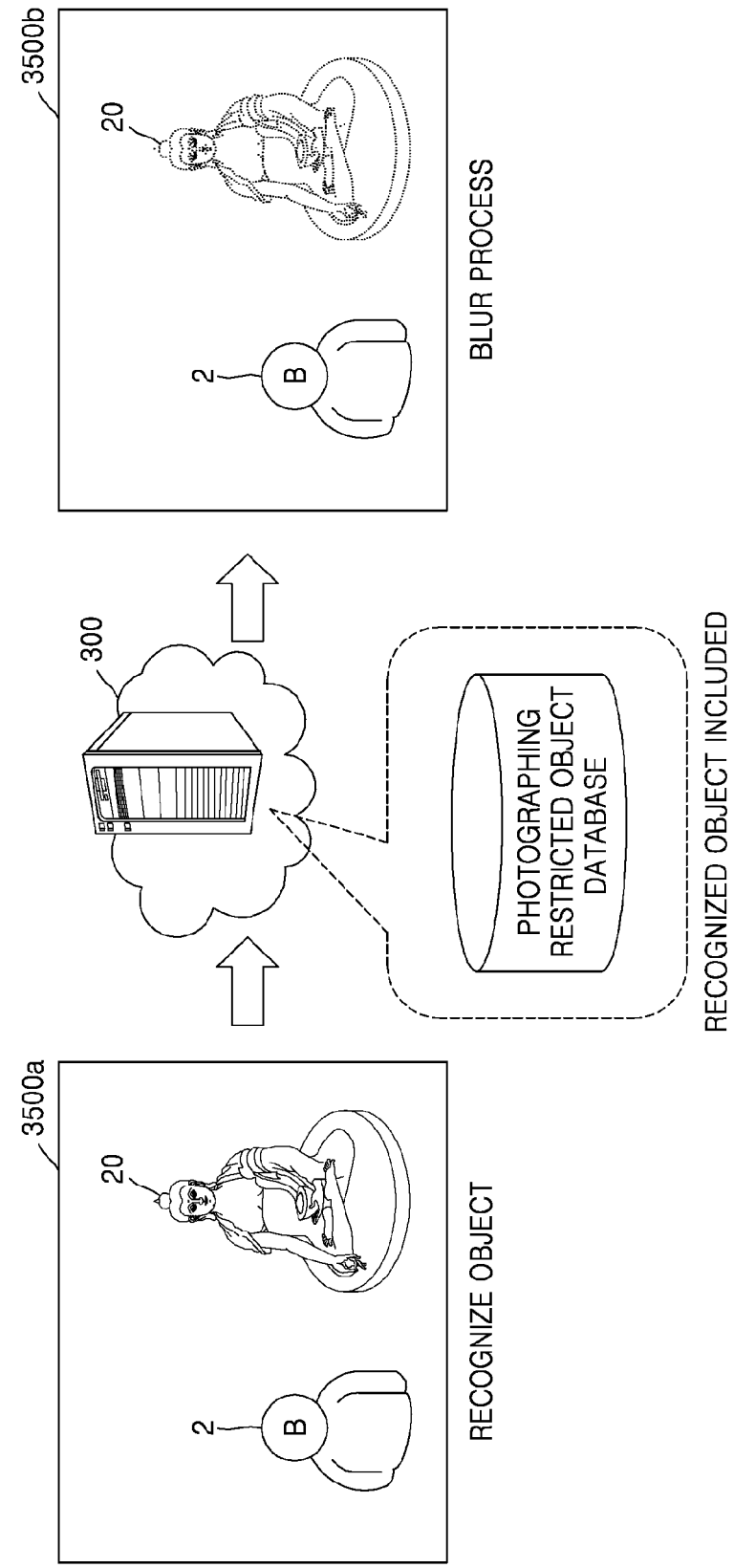
Figure 36:
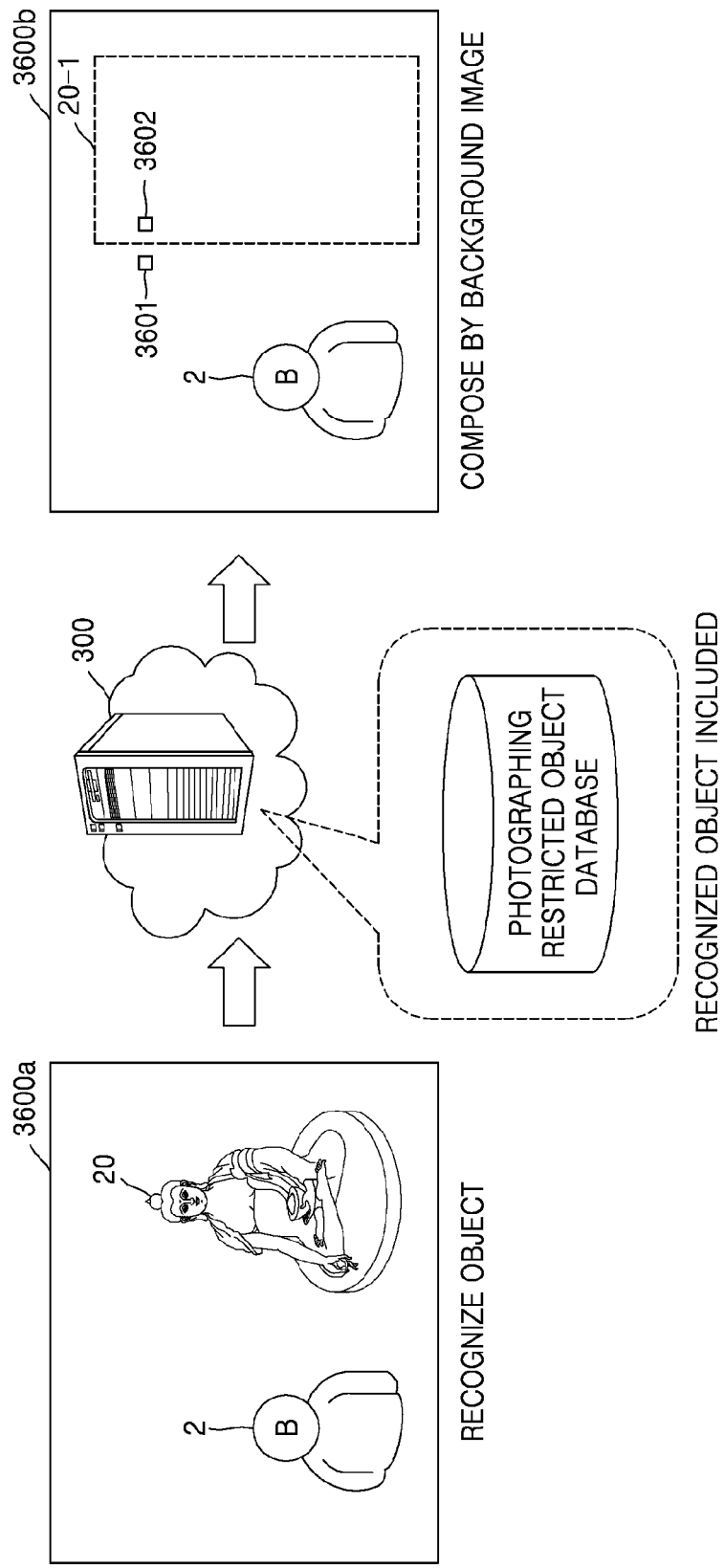
Figure 37:
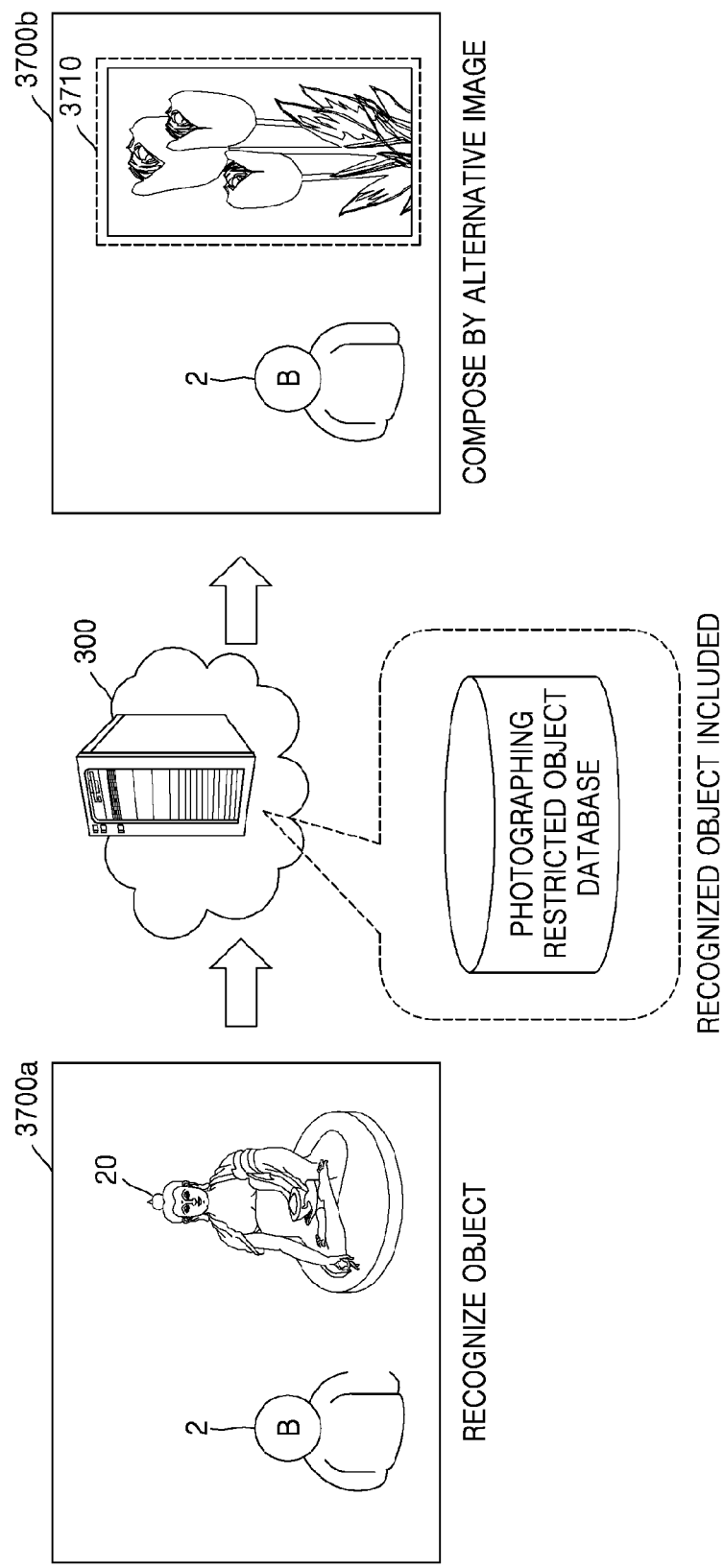

Meanwhile, in FIGS. 35 through 37, an image is modified by using different methods. A method of recognizing an object in an image and determining whether a photographing restricted element is included in the image by using a pre-stored photographing restricted object database, which is performed by the server 300, is the same as the method described with reference to FIG. 34. However, while modifying the image, a modified image 3500b is generated by performing a blur process in FIG. 35. In FIG. 36, a modified image 3600b is generated by performing a composing process by a background image as described above with reference to FIG. 8. In FIG. 37, a modified image 3700b is generated by composing an alternative image 3710.

Figure 38:
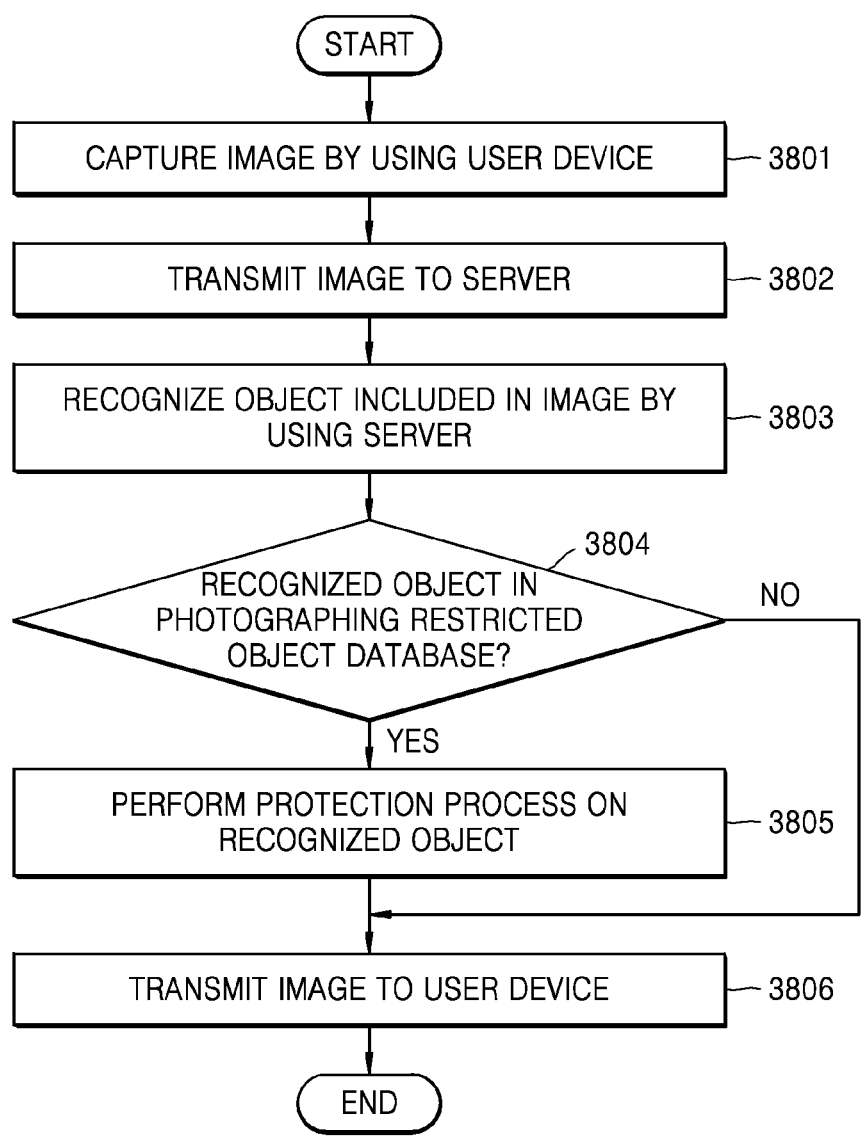
FIG. 38 is a flowchart of a method of modifying an image including a photographing restricted object, according to an exemplary embodiment.

FIG. 38 is a flowchart of a method of modifying an image including a photographing restricted object, according to an exemplary embodiment.

Referring to FIG. 38, a user device captures an image in operation 3801.

In operation 3802, the user device transmits the image to a server.

In operation 3803, the server recognizes an object included in the image. In detail, the object included in the image is detected and features, such as a shape and color, of the detected object are extracted.

In operation 3804, the server determines whether the recognized object is included in a photographing restricted object database pre-stored in the server. The photographing restricted object database stores a list of photographing restricted objects.

If it is determined that the recognized object is in the photographing restricted object database in operation 3804, the server modifies the image by performing a protection process on the recognized object in operation 3805, and transmits the modified image to the user device in operation 3806.

If it is determined that the recognized object is not in the photographing restricted object database in operation 3804, the server transmits the image to the user device without modification in operation 3806.

Figure 39:
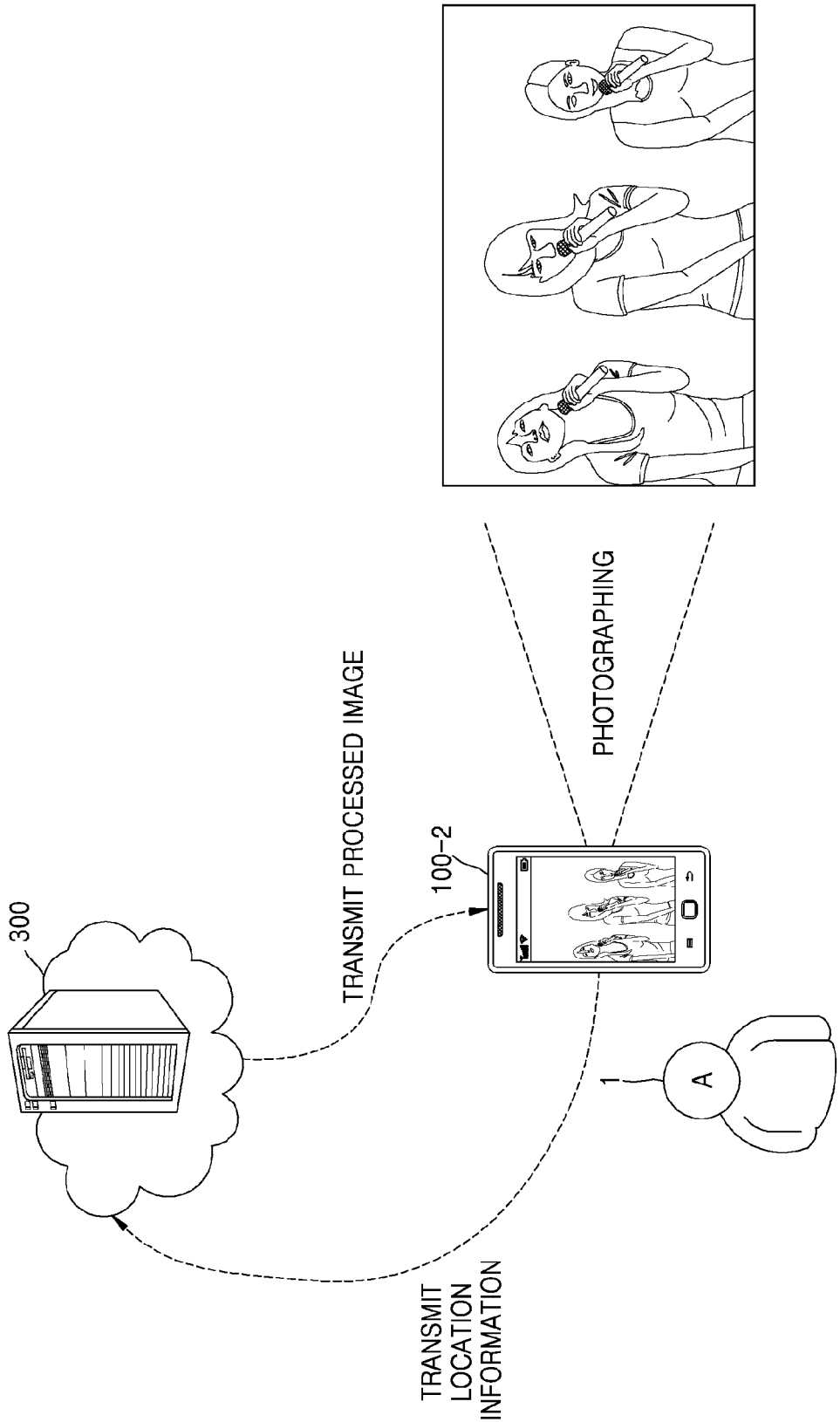
FIGS. 39 through 41 are diagrams for describing a method of modifying an image captured at a photographing restricted location, according to an exemplary embodiment.
Figure 40:
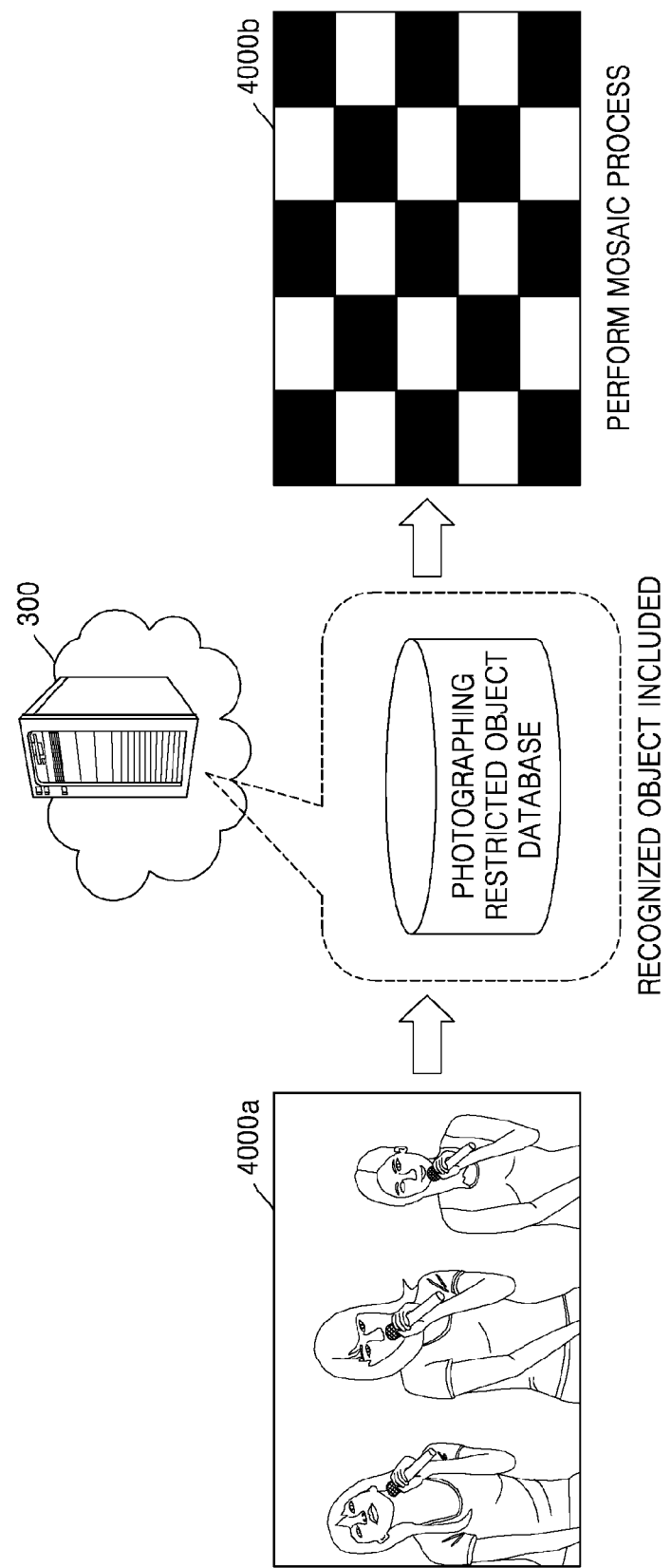
Figure 41:
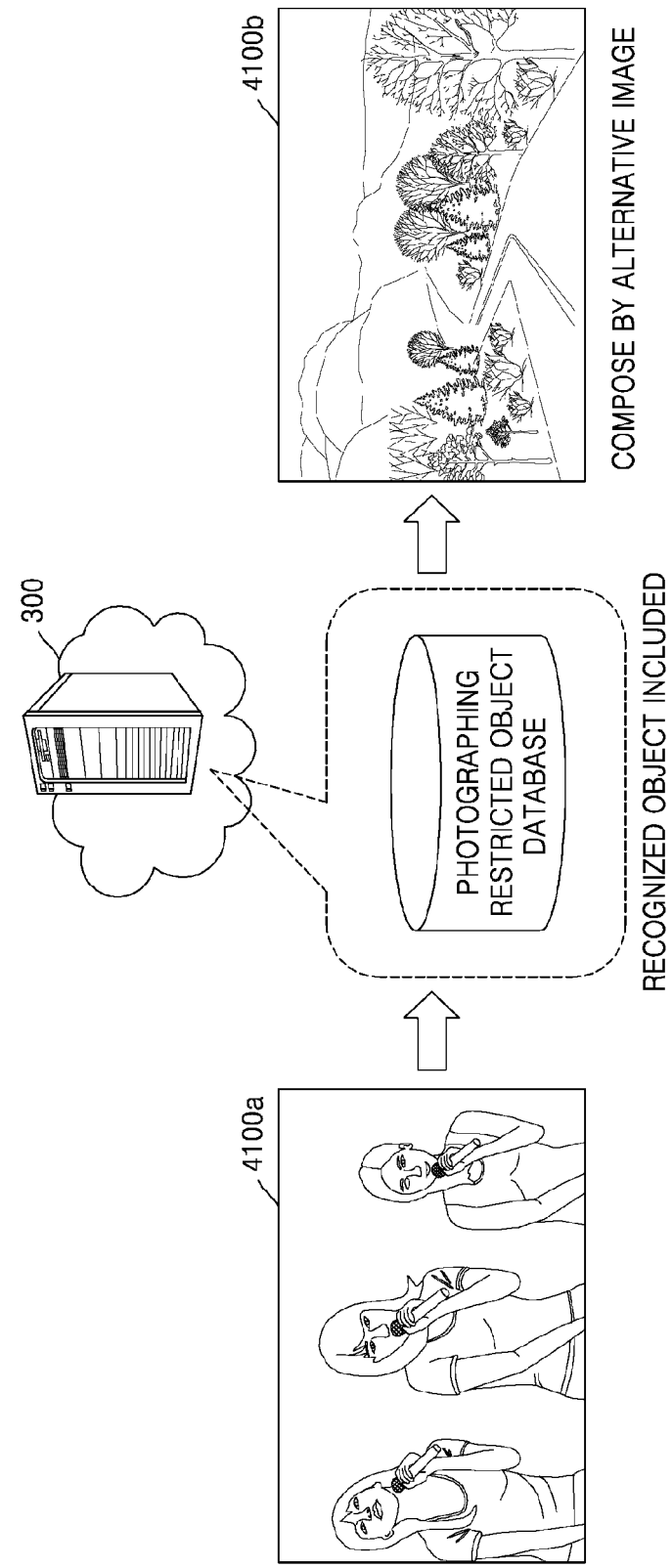

FIGS. 39 through 41 are diagrams for describing a method of modifying an image captured at a photographing restricted location, according to an exemplary embodiment.

Referring to FIG. 39, the smart phone 100-2 of User A captures an image of a venue that is restricted from being photographed, and transmits the image to the server 300 to request the server 300 to perform an image process. At this time, the smart phone 100-2 transmits location information together with the image to the server 300. The location information is information about a location where the image is captured by the smart phone 100-2, wherein the smart phone 100-2 determines the location by using a GPS embedded therein and transmits the determined location to the server 300. Alternatively, the smart phone 100-2 may generate the location information via any one of various methods, for example, by determining the location by using a base station or an access point (AP) connected to the smart phone 100-2.

The server 300 determines whether the image includes a photographing restricted element by using the location information. A method of determining, by the server 300, whether the image includes the photographing restricted element will be described in detail below with reference to FIGS. 40 and 41.

If it is determined that the image includes the photographing restricted element, the server 300 modifies the image and transmits the modified image to the smart phone 100-2.

Referring to FIG. 40, the server 300 determines the location where the image is captured by analyzing the location information received from the smart phone 100-2, and determines whether the determined location is a photographing restricted location. In other words, the server 300 determines whether the determined location is in a photographing restricted location database pre-stored in the server 300. Here, the photographing restricted location database may store information about locations restricted from being photographed by an unauthorized person, such as a concert venue, a museum, and a military security zone. When the server 300 determines whether the determined location is a location stored in the database, the server 300 may determine whether the database stores a name of a location that exactly matches the name of the determined location. Alternatively, the server 300 may rate a similarity between the determined location and locations stored in the database, and determine whether the determined location is in the database based on the degree of the similarity.

If it is determined that the determined location is in the photographing restricted location database, the server 300 determines that the image includes a photographing restricted element and modifies the image. In FIG. 40, the server 300 performs a mosaic process on an original image 4000a to generate a modified image 4000b.

Referring to FIG. 41, the server 300 determines the location by analyzing the location information received from the smart phone 100-2, and determines whether the location is a photographing restricted location. In other words, the server 300 determines whether the determined location is in a photographing restricted location database pre-stored in the server 300. Here, the photographing restricted location database may store information about locations restricted from being photographed by an unauthorized person, such as a concert venue, a museum, and a military security zone.

If it is determined that the determined location is in the photographing restricted location database, the server 300 determines that the image includes a photographing restricted element and modifies the image. In FIG. 41, the server 300 generates a modified image 4100b by composing an original image 4100a by an alternative image. Alternatively, the server 300 may modify the original image 4100a by performing a blur process on the original image 4100a.

Meanwhile, the server 300 modifies the image in FIGS. 39 through 41, but alternatively, the server 300 may only determine whether the determined location is a photographing restricted location by analyzing the location information received from the smart phone 100-2, and transmit a result of the determining to the smart phone 100-2. Then, the smart phone 100-2 may modify the image based on the received result.

Figure 42:
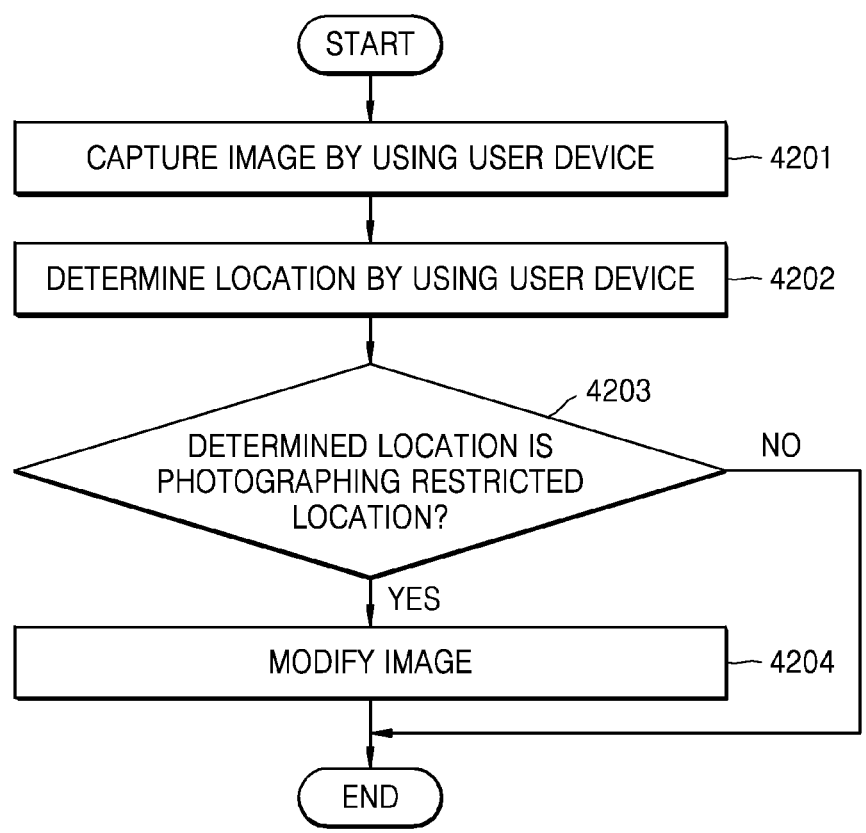
FIG. 42 is a flowchart of a method of modifying an image captured at a photographing restricted location, according to an exemplary embodiment.

FIG. 42 is a flowchart of a method of modifying an image captured at a photographing restricted location, according to an exemplary embodiment.

Referring to FIG. 42, a user device captures an image in operation 4201. Here, the user device may be a general photographing device, such as a camera or a camcorder, a wearable device, such as smart glasses or a smart watch, or a mobile device, such as a smart phone or a tablet PC, or may be any other device capable of photographing.

In operation 4202, the user device determines a location where the image is captured, and transmits location information to a server. Here, the user device may determine the location by using a GPS embedded therein. Alternatively, the user device may determine the location by using a location of a base station or AP connected to the user device.

In operation 4203, the server determines whether the determined location is a photographing restricted location. In detail, the server determines the location by analyzing the received location information and compares the determined location with a photographing restricted location database pre-stored in the server. Here, the photographing restricted location database may store information about locations restricted from being photographed by an unauthorized person, such as a concert venue, a museum, and a military security zone.

If the determined location is in the photographing restricted location database, the server determines that the image includes a photographing restricted element, and performs operation 4204. In operation 4204, the server modifies the image and transmits the modified image to the user device. In other words, the server generates the modified image by performing a mosaic process, a blur process, or a composing process by an alternative image on the image, and transmits the modified image to the user device.

Figure 43:
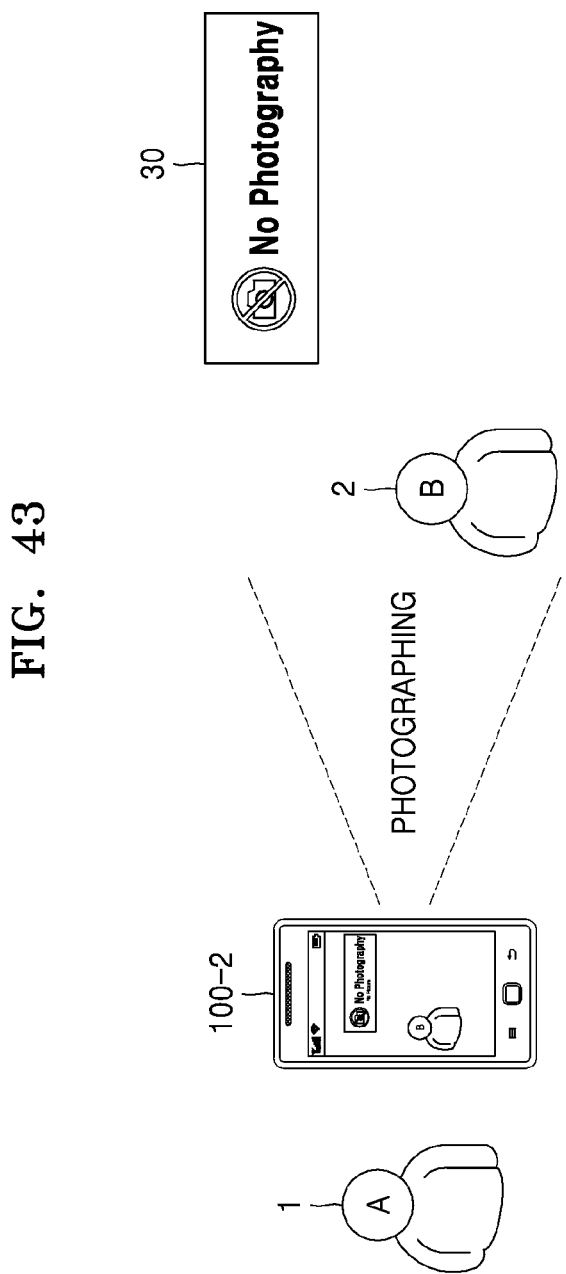
FIGS. 43 through 45 are diagrams for describing methods of modifying an image captured at a photographing restricted location, according to other exemplary embodiments.
Figure 44:
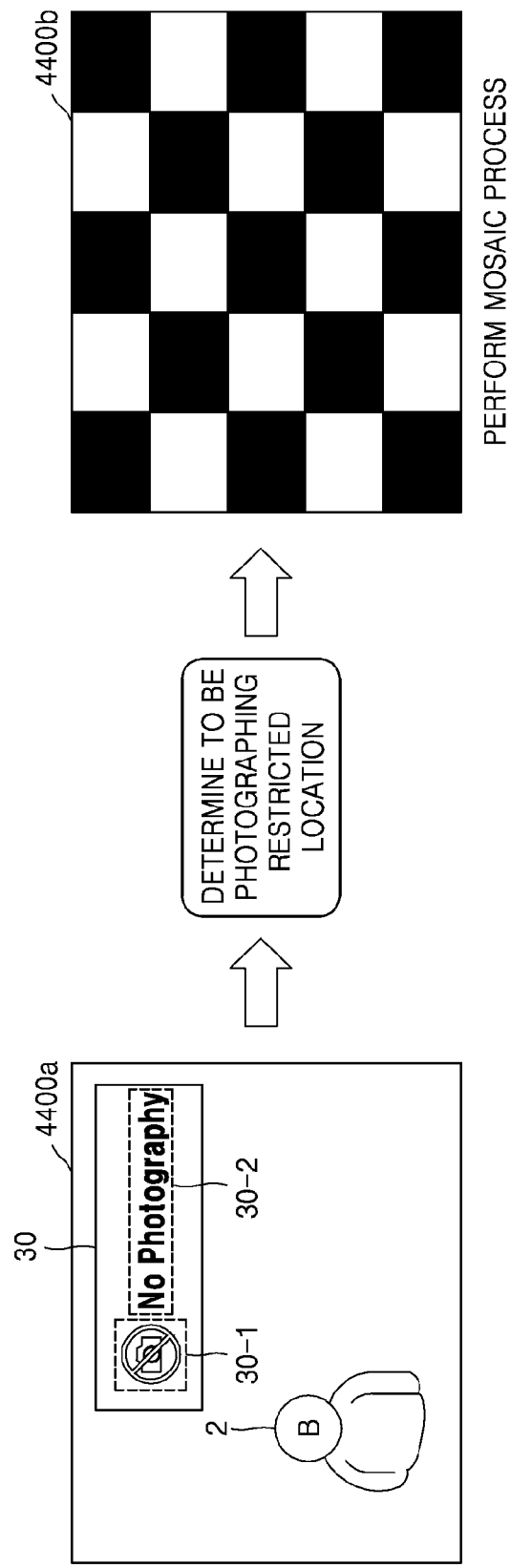
Figure 45:
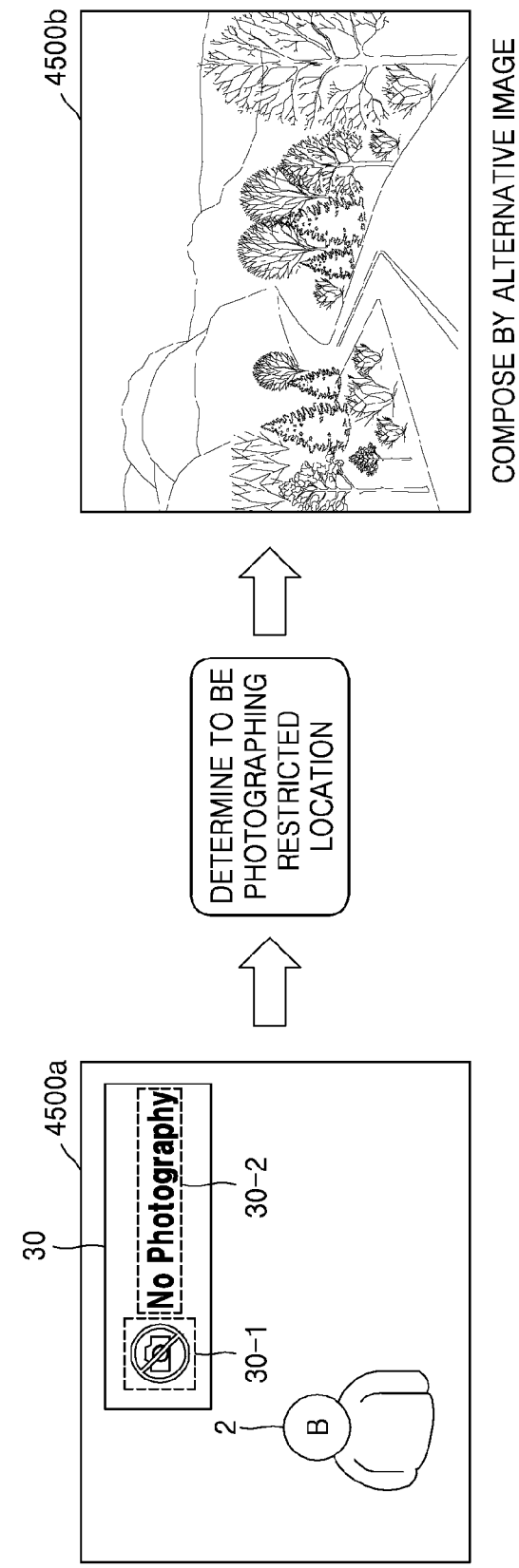

FIGS. 43 through 45 are diagrams for describing methods of modifying an image captured at a photographing restricted location, according to other exemplary embodiments. In detail, in FIGS. 43 through 45, a user device determines that a location where an image is captured is a photographing restricted location by recognizing a no photo sign.

Referring to FIG. 43, the smart phone 100-2 of User A captures an image including the no photography sign 30 and User B. Here, the no photography sign 30 may include a symbol and a phrase indicating no photography as shown in FIG. 43, or may be in any other form. For example, the no photography sign 30 may include a barcode, a quick response (QR) code, or a color code, which indicate no photography. When a photo includes a barcode, a QR code, or a color code, which a photographer may be unable to understand but indicates photography is prohibited, the smart phone 100-2 may prevent the photographer from inadvertently or intentionally capturing the photo.

Referring to FIG. 44, the smart phone 100-2 of User A recognizes the sign of no photography 30 included in an original image 4400*a*. In detail, the smart phone 100-2 recognizes at least one of a symbol 30-1 and a phrase 30-2 included in the no photography sign 30. Upon recognizing the no photography sign 30, the smart phone 100-2 determines that the image is captured at a photographing restricted location. In other words, the smart phone 100-2 determines that the image includes a photographing restricted element. Accordingly, the smart phone 100-2 performs a mosaic process on the original image 4400*a* to generate a modified image 4400*b*.

Referring to FIG. 45, the smart phone 100-2 of User A recognizes the no photography sign 30 included in an original image 4500*a*. In detail, the smart phone 100-2 recognizes at least one of the symbol 30-1 and the phrase 30-2 included in the no photography sign 30. Upon recognizing the no photography sign 30, the smart phone 100-2 determines that the image is captured at a photographing restricted location. In other words, the smart phone 100-2 determines that the image includes a photographing restricted element. Accordingly, the smart phone 100-2 generates a modified image 4500*b* by composing the original image 4500*a* by an alternative image.

Figure 46:
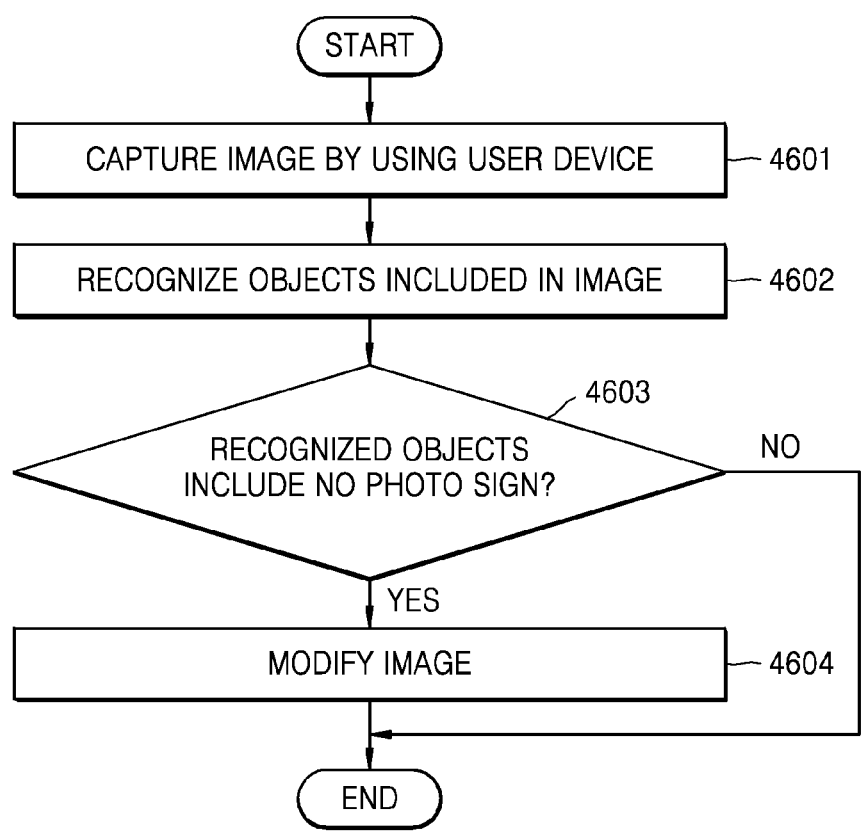
FIG. 46 is a flowchart of a method of modifying an image captured at a photographing restricted location, according to another exemplary embodiment.

FIG. 46 is a flowchart of a method of modifying an image captured at a photographing restricted location, according to another exemplary embodiment.

Referring to FIG. 46, a user device captures an image in operation 4601.

In operation 4602, the user device recognizes objects included in the image.

In operation 4603, the user device determines whether the recognized objects include a no photography sign. If it is determined that the recognized objects include the no photography sign, the user device modifies the image in operation 4604. Here, the user device may modify the image by performing a mosaic process, a blur process, or a composing process by an alternative image on the image.

Figure 47:
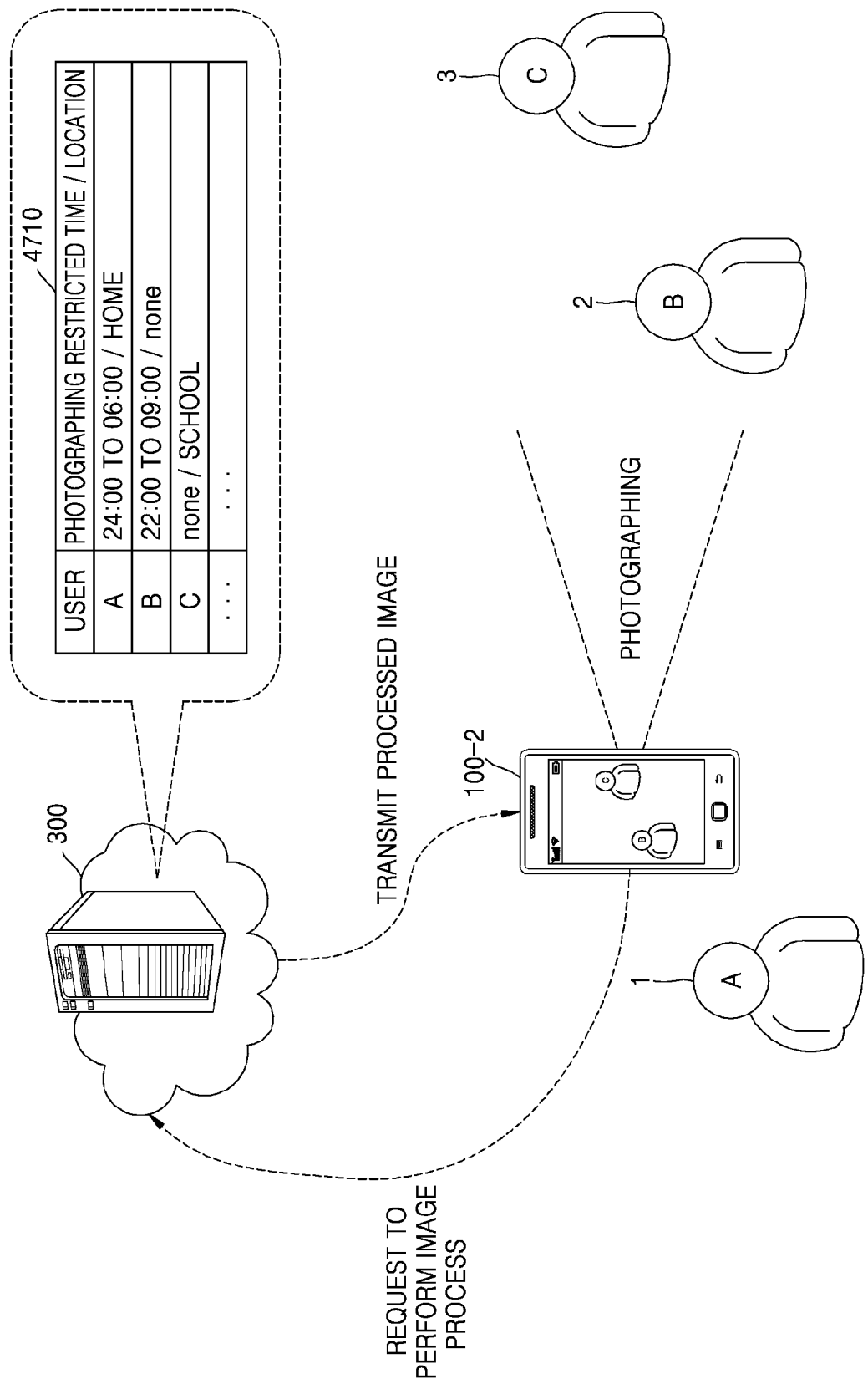
FIGS. 47 through 49 are diagrams for describing examples of restricting photographing of a person according to privacy protection information, according to exemplary embodiments.
Figure 48:
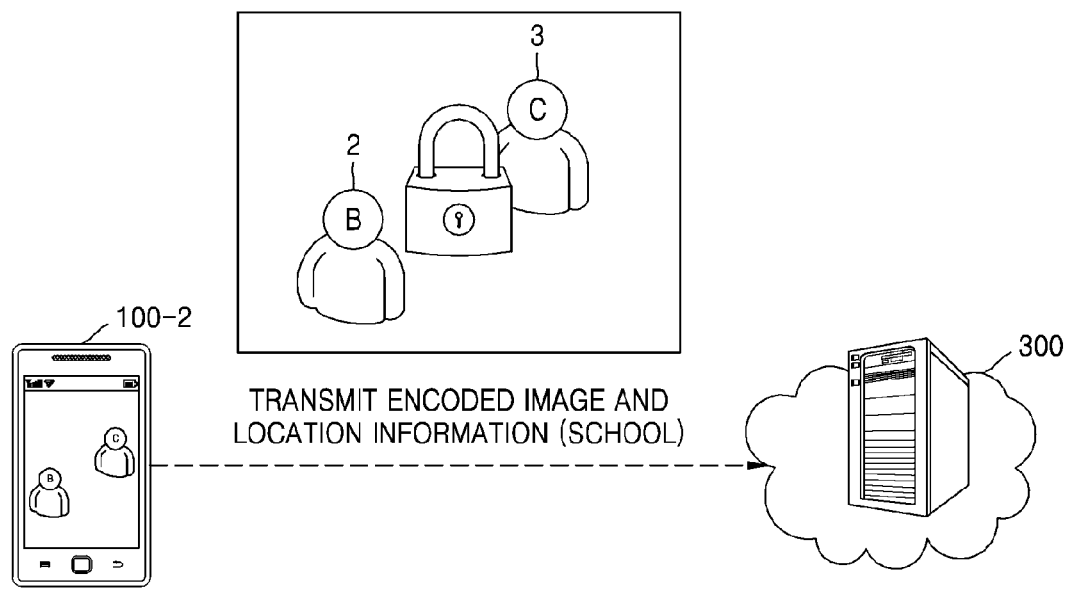
Figure 49:
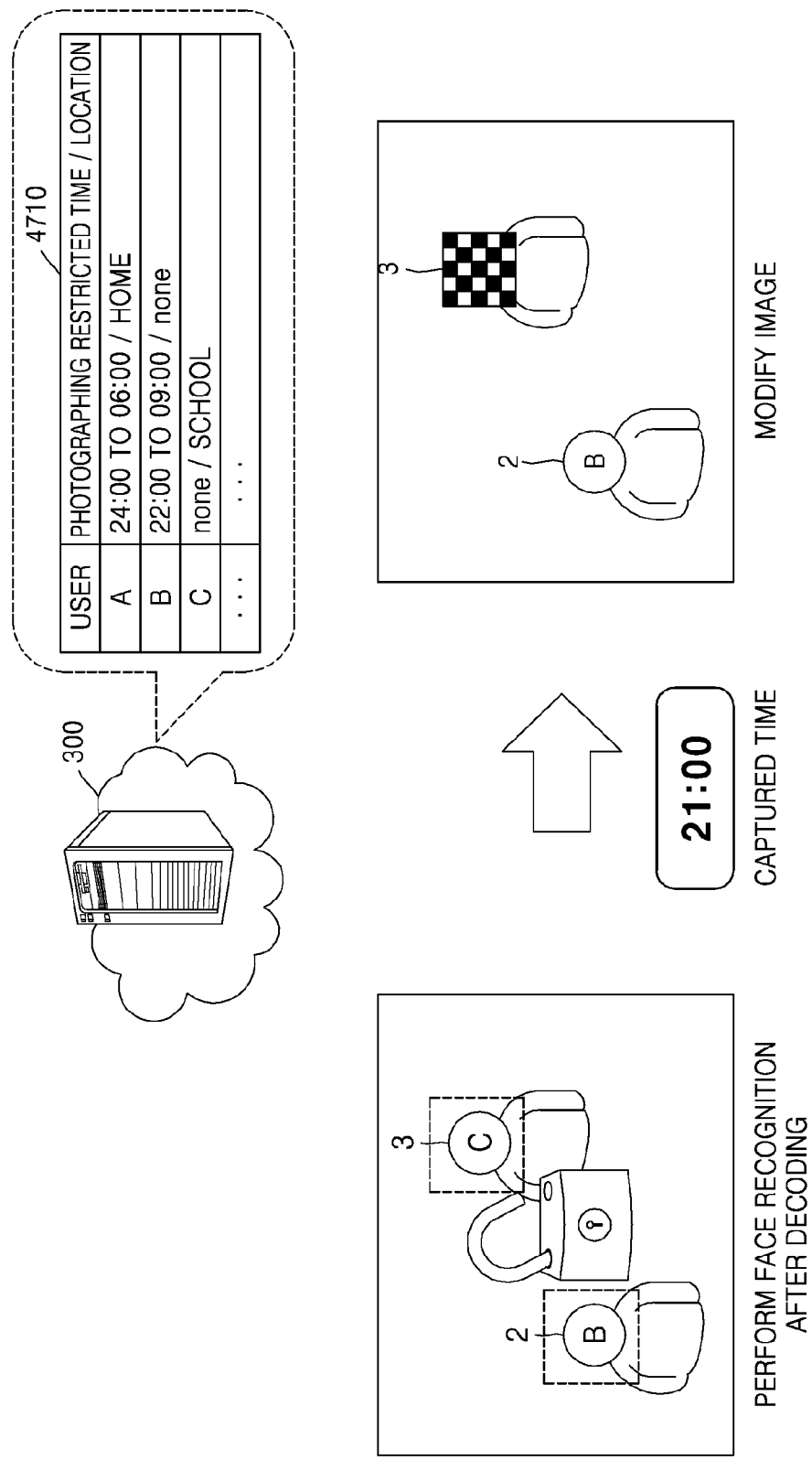

FIGS. 47 through 49 are diagrams for describing examples of restricting photographing of a person according to privacy protection information, according to exemplary embodiments.

Referring to FIG. 47, the smart phone 100-2 of User A captures an image including Users B and C. Then, the smart phone 100-2 transmits the image to the server 300 and requests the server 300 to perform an image process. At this time, the smart phone 100-2 may encode the image by using an encryption key received from the server 300 and transmit the encoded image to the server 300.

The server 300 determines whether the image includes a photographing restricted element by using privacy protection information 4710 pre-stored in the server 300. When the image is encoded, the server 300 decodes the encoded image by using the encryption key before determining whether a photographing restricted element is included in the image. Here, photographing restricted times and locations are mapped and stored according to users in the privacy protection information 4710.

A method of determining whether an image includes a photographing restricted element by using privacy protection information will be described in detail later with reference to FIGS. 48 and 49.

If it is determined that the image includes a photographing restricted element, the server 300 modifies the image and transmits the modified image to the smart phone 100-2.

Hereinafter, a method of determining whether the image includes a photographing restricted element by using the privacy protection information 4710 and modifying the image, which is performed by the server 300, will be described in detail with reference to FIGS. 48 and 49.

Referring to FIG. 48, the smart phone 100-2 transmits the encoded image to the server 300. Here, the smart phone 100-2 also transmits location information about a location where the image is captured, together with the encoded image, to the server 300. The smart phone 100-2 determines the location by using a GPS embedded therein or a location of a base station or AP connected thereto, and may transmit the location information to the server 300. In FIG. 48, the smart phone 100-2 transmits "School" as the location information to the server 300.

Referring to FIG. 49, the server 300 decodes the encoded image and performs face recognition on the decoded image to recognize faces of Users B and C. The server 300 determines photographing restricted times and locations of the recognized faces based on privacy protection information 4910. The privacy protection information 4910 stores at least one of photographing restricted times and locations according to users.

Based on the privacy protection information 4910 of FIG. 49, a user A does not allow photography from 24:00 to 06:00 and does not allow photography at home. A user B does not allow photography from 22:00 to 09:00 and does not set a photographing restricted location. A user C does not set a photographing location time and does not allow photography at school.

The server 300 determines whether the image includes a photographing restricted element based on the location information (school) and a captured time from the smart phone 100-2 of User A. Thus, the server 300 may receive the captured time when the image is captured while receiving the image from the smart phone 100-2.

In FIG. 49, the server 300 determines that a location and time the image is captured is "school" and "21:00" based on the location information and the captured time received from the smart phone 100-2.

The server 300 determines that photographing of User B is restricted from 22:00 to 09:00 but is not restricted regarding a location by referring to the privacy protection information 4910. Since the captured time "21:00" determined by the server 300 is not within a photographing restricted time of User B, it is determined that photographing of User B is not restricted. In other words, the server 300 determines that User B is not a photographing restricted element.

Meanwhile, the server 300 determines that photographing of User C is restricted at "school" but is not restricted regarding time by referring to the privacy protection information 4910. Since the location information ("school") determined by the server 300 is within a photographing restricted location of User C, it is determined that photographing of User C is restricted. In other words, the server 300 determines that User C is a photographing restricted element.

Accordingly, the server 300 modifies the image by performing a mosaic process only on User C.

Figure 50:
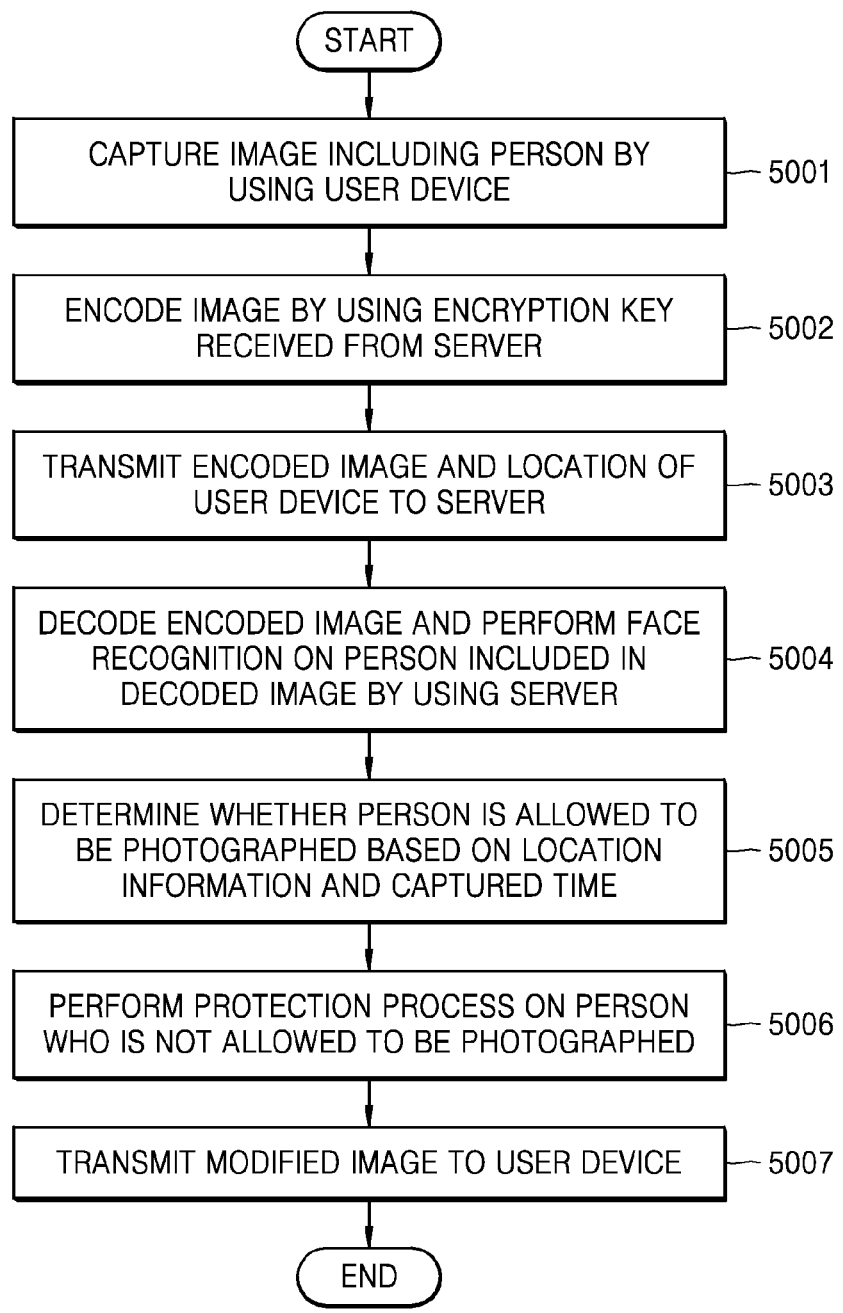
FIG. 50 is a flowchart of a method of restricting photographing of a person according to privacy protection information, according to exemplary embodiment.

FIG. 50 is a flowchart of a method of restricting photographing of a person according to privacy protection information, according to exemplary embodiment.

Referring to FIG. 50, a user device captures an image including a person in operation 5001. Here, the user device may be any one of a general photographing device, such as a camera or a camcorder, a wearable device, such as smart glasses or a smart watch, and a mobile device, such as a smart phone or a tablet PC, or may be any one of various devices capable of photographing.

In operation 5002, the user device encodes the image by using an encryption key received from a server. Here, the encryption key is managed by the server.

In operation 5003, the user device transmits the encoded image and location information of the user device to the server.

In operation 5004, the server decodes the encoded image and performs face recognition on the person included in the decoded image. In detail, the face recognition may be performed by detecting a face region from the decoded image and extracting features from the detected face region.

In operation 5005, the server determines whether the person is allowed to be photographed by using privacy protection information pre-stored in the server, based on the location information and a captured time when the image is captured, which are received from the user device.

In operation 5006, the server performs a protection process on a person who is not allowed to be photographed. In other words, the server may modify the decoded image by performing at least one of a mosaic process, a blur process, a composing process by a background image, and a composing process by an alternative image, such that the person who is not allowed to be photographed is not distinguishable or recognizable.

In operation 5007, the server transmits the modified image to the user device.

Figure 51:
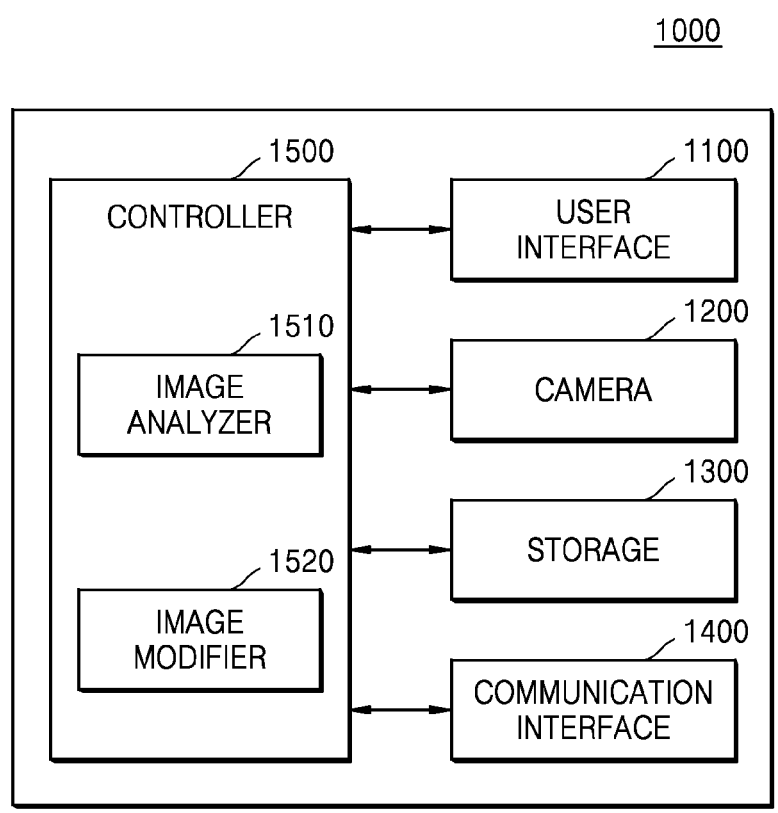
FIG. 51 is a block diagram of a user device according to an exemplary embodiment.

FIG. 51 is a block diagram of a user device 1000 according to an exemplary embodiment. Referring to FIG. 51, the user device 1000 according to an exemplary embodiment may include a user interface 1100, a camera 1200, a storage 1300, a communication interface 1400, and a controller 1500. Also, the controller 1500 may include an image analyzer 1510 and an image modifier 1520.

Meanwhile, as described above, the user device 1000 according to an exemplary embodiment may be any one of various devices capable of photographing, such as smart glasses, a smart watch, a smart phone, a tablet PC, a camera, or a camcorder.

The user interface 1100 receives an input from a user and displays a screen to the user, and may be variously configured according to a type of the user device 1000. For example, when the user device 1000 is a smart phone, the user interface 1100 may include a touch screen.

The camera 1200 may include a camera module embedded in smart glasses, a smart watch, a smart phone, or a tablet PC. The camera 1200 may capture an image, such as a still image or a moving image, and transmit the image to the controller 1500.

The storage 1300 may include a memory that stores the image or various pieces of data. For example, the storage 1300 may store an address book, a photo, a moving image, or a usage record of the user device 1000, or may store an image modified by the controller 1500.

The communication interface 1400 may perform data communication with an external device or a server via wires or wirelessly.

The controller 1500 controls operations of components included in the user device 1000. In detail, the controller 1500 determines whether the image includes a photographing restricted element by analyzing the image, and modifies the image if it is determined that the image includes a photographing restricted element.

The image analyzer 1510 may recognize a person included in the image, an object included in the image, or a location where the image is captured by analyzing the image, and determine whether the image needs to be modified based on at least one of a relation between a user of the user device 1000 and the recognized person, the recognized object, and the recognized location. In detail, the image analyzer 1510 may determine whether the user and the recognized person are related to each other by using data stored in the storage 1300, and determine that the image needs to be modified if it is determined that the user and the recognized person are not related to each other.

For example, the image analyzer 1510 may determine whether the recognized person is in an address book stored in the storage 1300, and if the recognized person is not in the address book, may determine that the user and the recognized person are not related to each other. The image analyzer 1510 may perform content-based image retrieval based on similarity of image content to determine whether the recognized person is in the address book.

Alternatively, the image analyzer 1510 may determine whether the recognized person is included in at least one photo stored in the storage 1300, and if the recognized person is not included in the at least one photo, may determine that the user and the recognized person are not related to each other.

Alternatively, the image analyzer 1510 may determine whether the user and the recognized person are related to each other by analyzing SNS usage records of the user by using data stored in the storage 1300.

Alternatively, the image analyzer 1510 may determine whether the recognized object or the recognized location is restricted from being photographed by accessing a database of an external server through the communication interface 1400, and if it is determined that the recognized object or the recognized location is restricted from being photographed, the image analyzer 1510 may determine that the image needs to be modified.

Alternatively, the image analyzer 1510 may determine that the image needs to be modified by determining that the recognized location is a photographing restricted location if a no photo sign is recognized in the image.

Meanwhile, the image modifier 1520 modifies the image when the image analyzer 1510 determines that the image needs to be modified. The image modifier 1520 may perform at least one of a mosaic process, a blur process, a composing process by a background image, and a composing process by an alternative image on the recognized person, the recognized object, or the image. A method of modifying, by the image modifier 1520, an image has been described above with reference to FIGS. 7 through 12.

Meanwhile, the controller 1500 may comprise a processor, and the image analyzer 1510 and the image modifier 1520 may be software components combined with the processor.

Meanwhile, the components of the user device 1000 may perform operations for executing the methods described above with reference to FIGS. 1 through 50 even if not described with reference to FIG. 51.

Meanwhile, a point of time when a captured image is modified may be variously set. For example, a captured image may be modified before being stored in a user device. Alternatively, a captured image may be stored in a user device and then modified when being transmitted to an external server or another user device. Alternatively, a captured image may not be stored in a user device that captured the captured image, but may be immediately modified and transmitted to an external server or another user device. Hereinafter, different points of time when a captured image is modified according to exemplary embodiments will be described.

Figure 52:
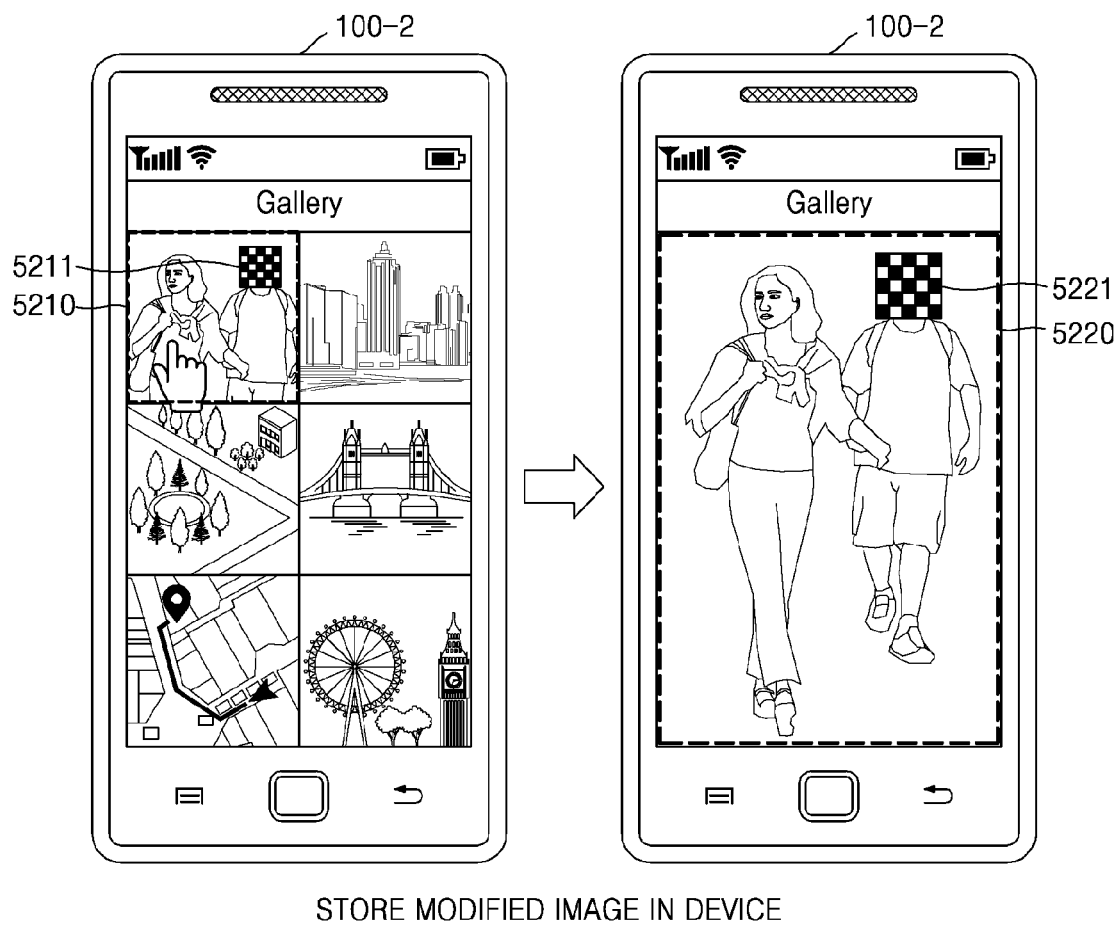
FIG. 52 is a diagram for describing an example of modifying a captured image before storing the captured image in a user device, with respect to a method of modifying a captured image, according to an exemplary embodiment.

FIG. 52 is a diagram for describing an example of modifying a captured image before storing the captured image in a user device, with respect to a method of modifying a captured image, according to an exemplary embodiment.

In FIG. 52, the smart phone 100-2 on the left displays a plurality of images on the screen as a gallery application is executed, and when a user touches and selects an image 5210 from among the plurality of images, the image 5210 is displayed as an enlarged image 5220 as shown in the smart phone 100-2 on the right.

The image 5210 selected from among the plurality of images includes a photographing restricted person, and thus a mosaic process is performed on a region 5211 corresponding to a face of the photographing restricted person. A mosaic process is also performed on a region 5221 of the enlarged image 5220, which corresponds to the face of the photographing restricted person.

An image is captured by the smart phone 100-2, and it is determined whether the captured image includes a photographing restricted element before the captured image is stored in the smart phone 100-2. When the captured image includes the photographing restricted element, the captured image is modified and then stored in the smart phone 100-2. In other words, an original image of the captured image is not stored in the smart phone 100-2, and thus only the modified captured image may be viewed through the smart phone 100-2. Thus, according to the current embodiment, even the user of the smart phone 100-2 is only able to access the modified captured image.

A method of determining whether an image includes a photographing restricted element and modifying the image has been described in detail.

Figure 53:
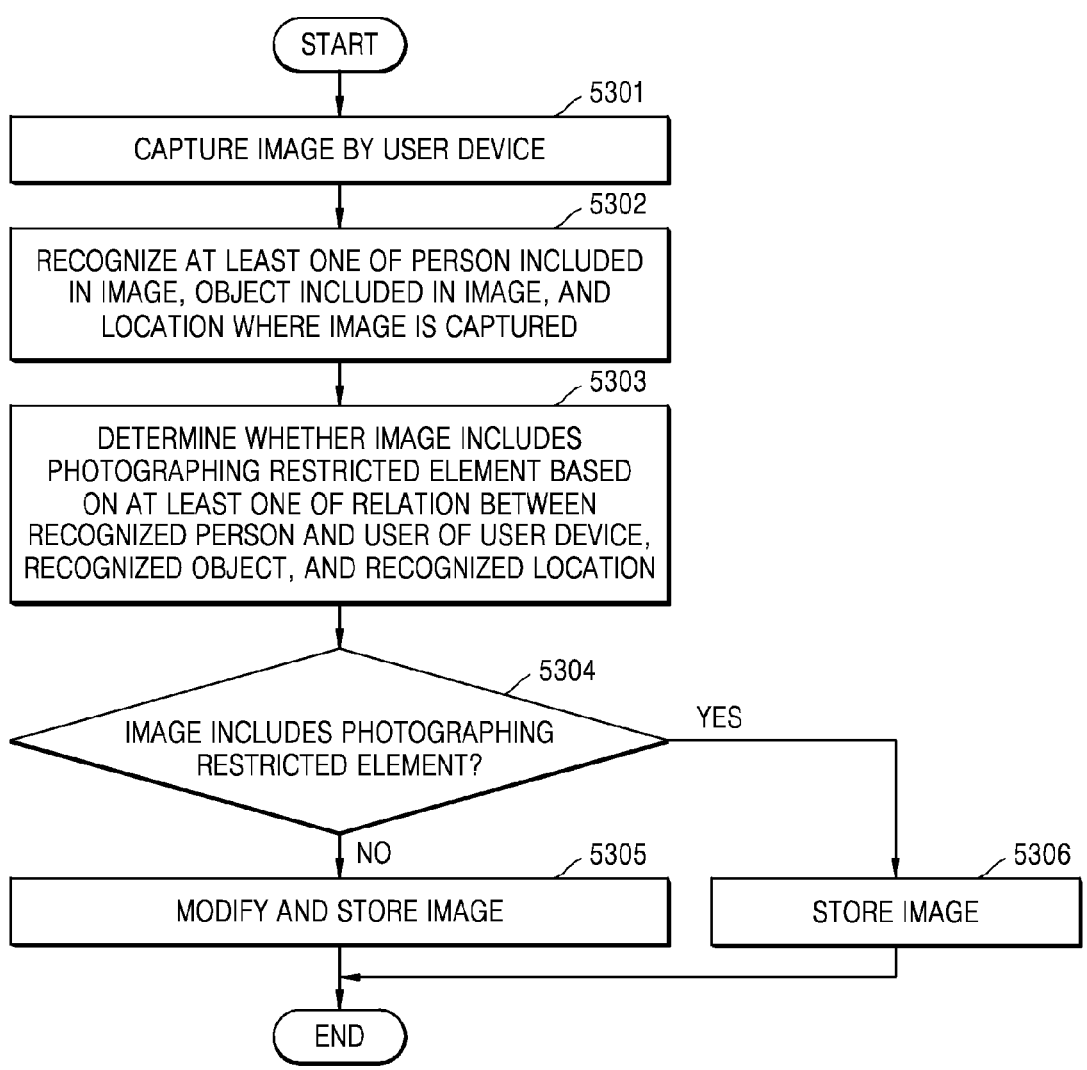
FIG. 53 is a flowchart for describing an example of modifying a captured image before storing the captured image in a user device, with respect to a method of modifying a captured image, according to an exemplary embodiment.

FIG. 53 is a flowchart for describing an example of modifying a captured image before storing the captured image in a user device, with respect to a method of modifying a captured image, according to an exemplary embodiment.

Referring to FIG. 53, a user device captures an image in operation 5301. Here, the user device may be any device capable of photographing, such as a smart phone, a camera, or a tablet PC.

In operation 5302, the user device recognizes at least one of a person included in the image, an object included in the image, and a location where the image is captured. A method of recognizing the person, the object, or the location has been described above with reference to FIG. 2.

In operation 5303, the user device determines whether the image includes a photographing restricted element based on at least one of a relation between the recognized person and a user of the user device, the recognized object, and the recognized location. A method of determining whether the image includes the photographing restricted element has been described above with reference to FIG. 2.

When it is determined that the image includes the photographing restricted element in operation 5304, the user device modifies the image and stores the modified image in operation 5305. When it is determined that the image does not include the photographing restricted element in operation 5304, the user device stores the image without modification in operation 5306.

According to another exemplary embodiment, operations 5302 and 5303 may be omitted in FIG. 53, and the user device may determine that the image includes the photographing restricted element in operation 5304 based on a user input for selecting a certain object included in the image. For example, when a user touches and holds a portion of the screen where the object is displayed, the user device may determine that the object is a photographing restricted element.

Figure 54:
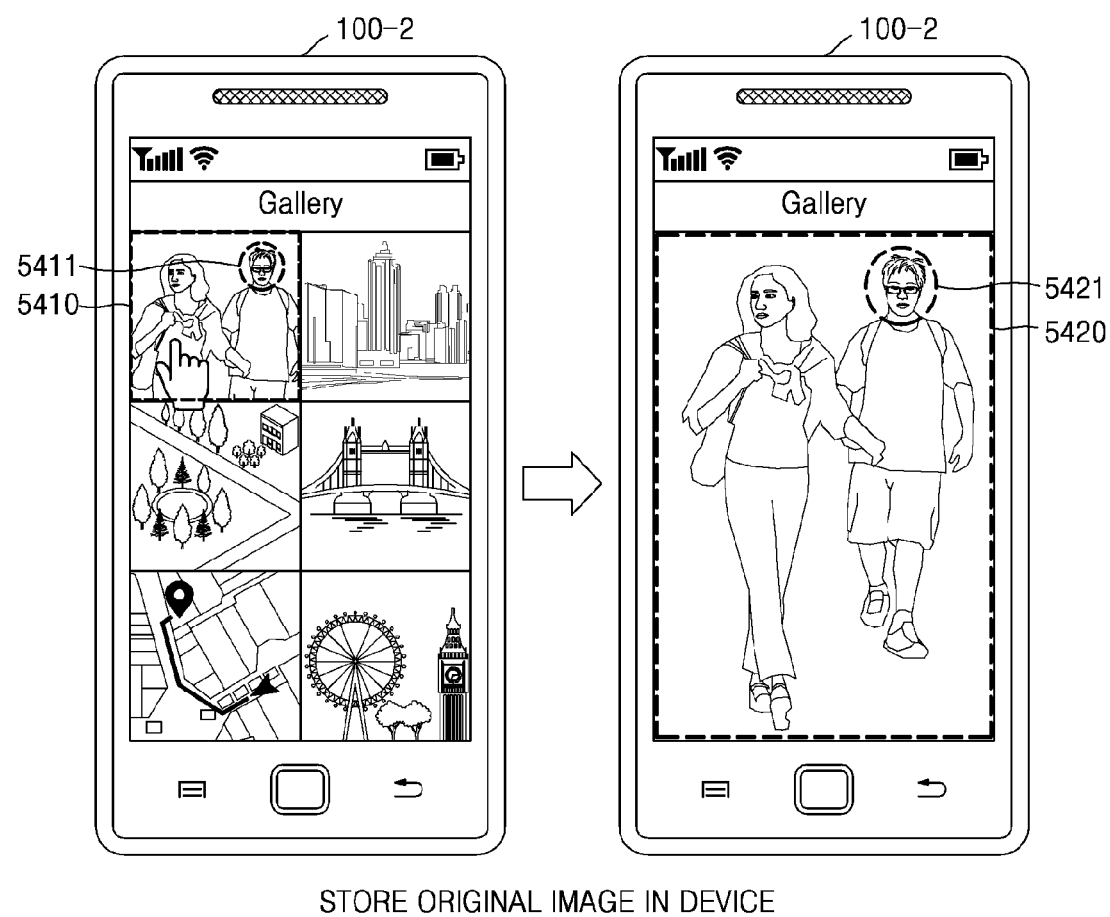
FIGS. 54 and 55 are diagrams for describing examples of modifying an image stored in a user device while externally transmitting the image, with respect to a method of modifying a captured image, according to exemplary embodiments.
Figure 55:
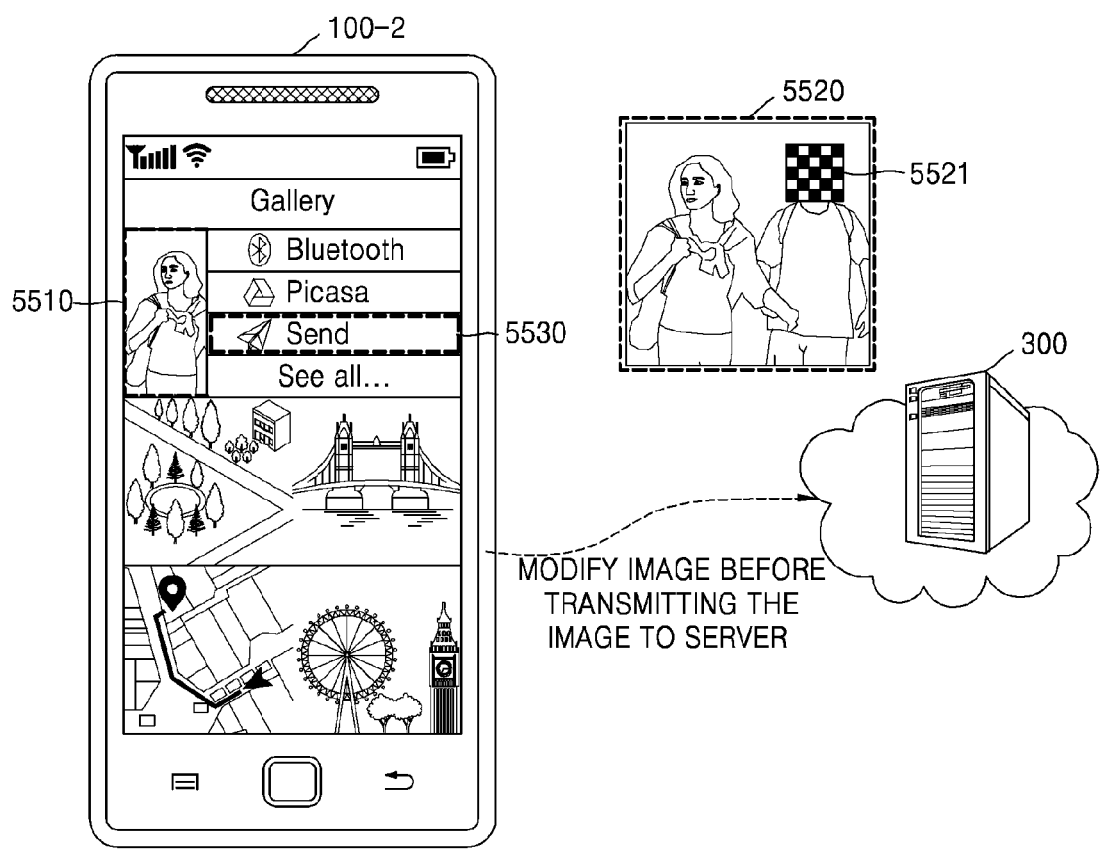

FIGS. 54 and 55 are diagrams for describing examples of modifying an image stored in a user device while externally transmitting the image, with respect to a method of modifying a captured image, according to exemplary embodiments.

In FIG. 54, a plurality of images are displayed on the screen of the smart phone 100-2 on the left as a gallery application is executed, and when an image 5410 is touched and selected from among the plurality of images, the image 5410 is displayed as an enlarged image 5420 on the smart phone 100-2 on the right.

Despite the image 5410 including a photographing restricted person, a mosaic process is not performed on a region 5411 corresponding to a face of the photographing restricted person. Also, a mosaic process is not performed on a region 5421 of the enlarged image 5420, which corresponds to the face of the photographing restricted person.

In the current embodiment, since the smart phone 100-2 stores an image without modifying the image, a user may access an original image through the gallery application of the smart phone 100-2.

However, in the current embodiment, if the image stored in the smart phone 100-2 is to be transmitted to an external server or another user device, it is determined whether the image includes a photographing restricted element, and when the image includes the photographing restricted element, the image is modified and then transmitted to the external server or the other user device.

Referring to FIG. 55, when the user selects an image 5510 from among a plurality of images displayed on the smart phone 100-2 through a gallery application, and selects a "Send" button 5530 to share the image 5510, the smart phone 100-2 determines whether the image 5510 includes a photographing restricted element, and when the image 5510 includes the photographing restricted element, modifies the image 5510 before sharing the image 5510.

In FIG. 55, the smart phone 100-2 transmits an image 5520 modified by performing a mosaic process on a region 5521 corresponding to a face of a photographing restricted person to the server 300 assigned as a destination.

Figure 56:
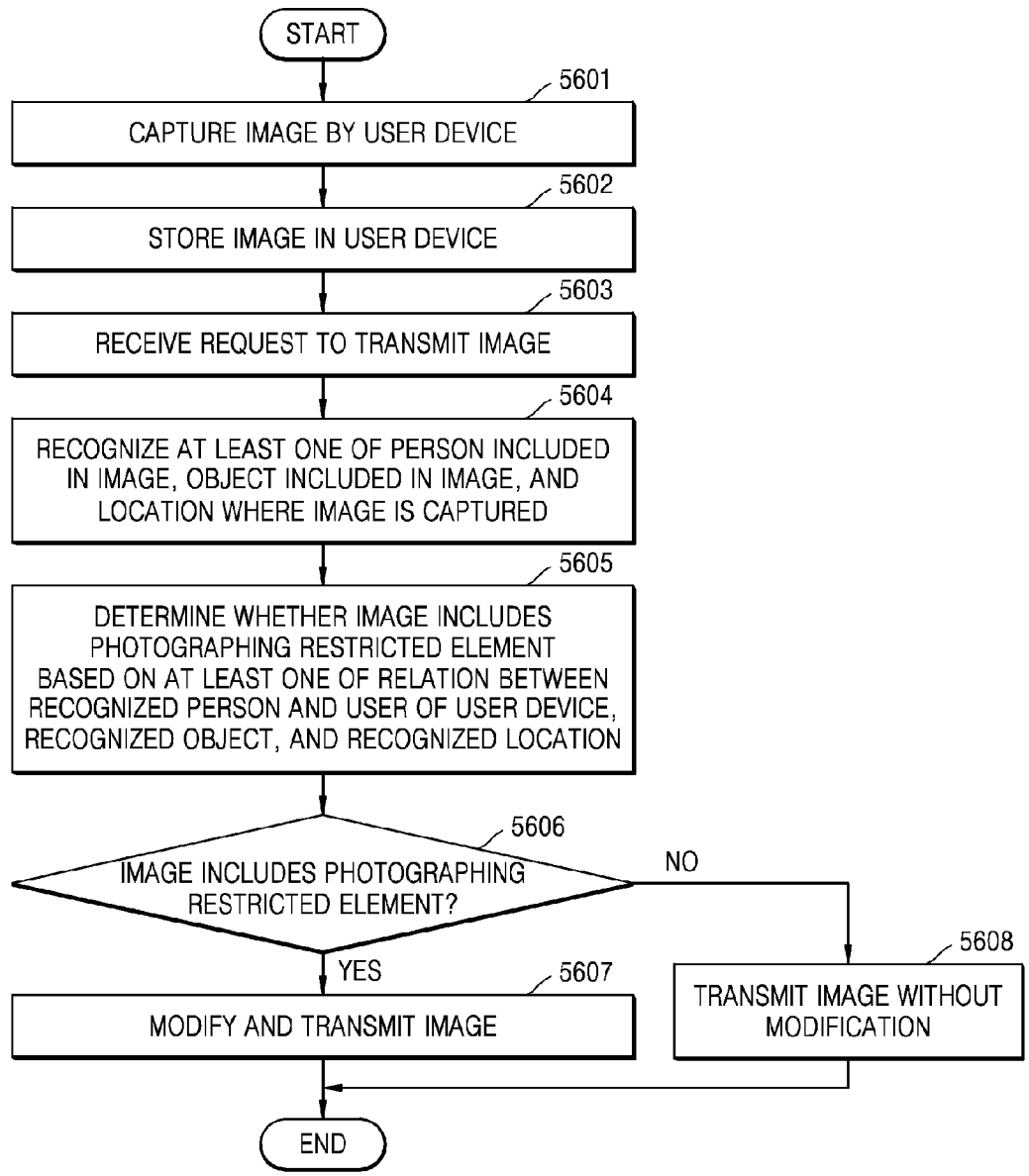
FIG. 56 is a flowchart for describing an example of modifying an image stored in a user device while externally transmitting the image, with respect to a method of modifying a captured image, according to an exemplary embodiment.

FIG. 56 is a flowchart for describing an example of modifying an image stored in a user device while externally transmitting the image, with respect to a method of modifying a captured image, according to an exemplary embodiment.

Referring to FIG. 56, in operation 5601, a user device captures an image. Here, the user device may be any device capable of photographing, such as a smart phone, a camera, or a tablet PC.

In operation 5602, the user device stores the image in a memory included in the user device.

In operation 5603, the user device receives a request to transmit the image to an external server or another user device from a user.

In operation 5604, the user device recognizes at least one of a person included in the image, an object included in the image, or a location where the image is captured. A method of recognizing the person, the object, or the location has been described above with reference to FIG. 2.

In operation 5605, the user device determines whether the image includes a photographing restricted element based on at least one of a relation between the recognized person and the user of the user device, the recognized object, and the recognized location. A method of determining whether the image includes the photographing restricted element has been described above with reference to FIG. 2.

When it is determined that the image includes the photographing restricted element in operation 5606, the user device modifies the image and transmits the modified image to the external server or the other user device in operation 5607. When it is determined that the image does not include the photographing restricted element in operation 5606, the user device transmits the image without modification in operation 5608.

Figure 57:
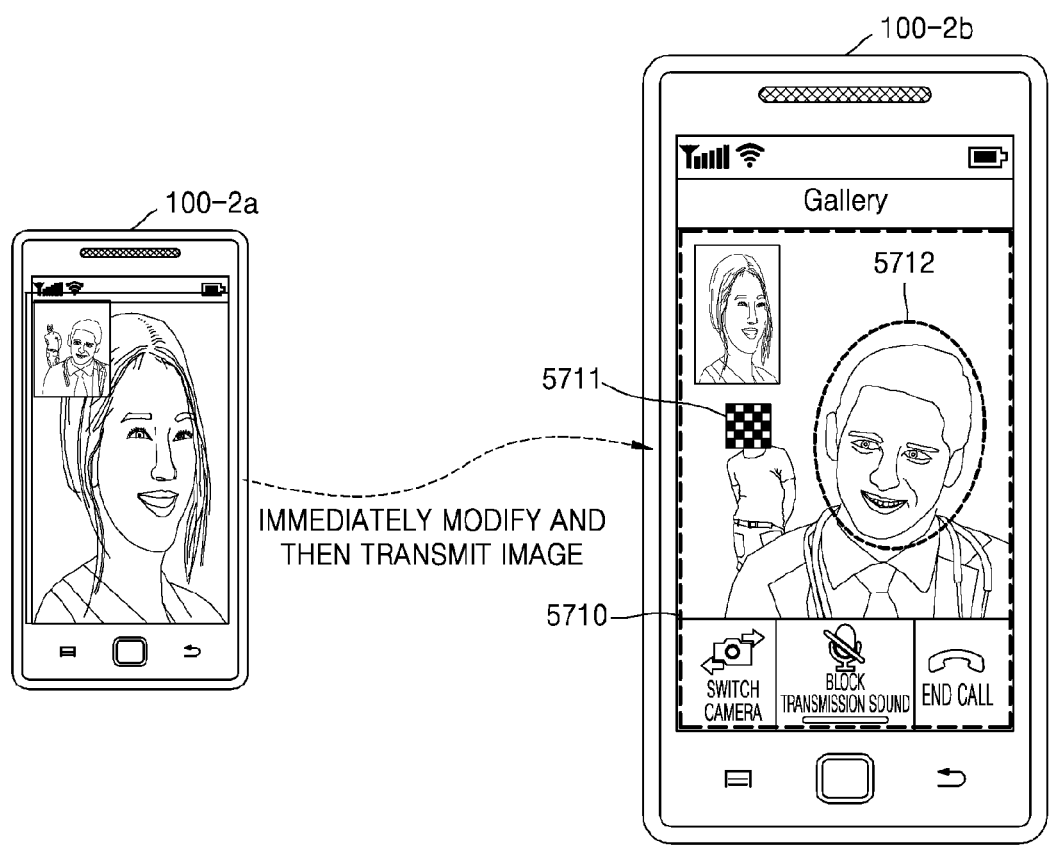
FIG. 57 is a diagram for describing an example of immediately modifying a captured image without storing the captured image in a user device and externally transmitting the modified captured image, with respect to a method of modifying a captured image, according to an exemplary embodiment.

FIG. 57 is a diagram for describing an example of immediately modifying a captured image without storing the captured image in a user device and externally transmitting the modified captured image, with respect to a method of modifying a captured image, according to an exemplary embodiment.

FIG. 57 illustrates video calling between two smart phones 100-2a and 100-2b.

Here, the smart phones 100-2a and 1002-b do not store a video call screen unless requested. However, since a photographing restricted element needs to be modified even during a video call, the smart phone 100-2a may immediately modify an image and transmit the modified image to the smart phone 100-2b without storing the image, according to the current embodiment. Referring to a video call screen 5710 displayed on the smart phone 100-2b, a face region 5712 of a person talking on the phone is not modified, but a mosaic process is performed on a face region 5711 of a photographing restricted person.

Figure 58:
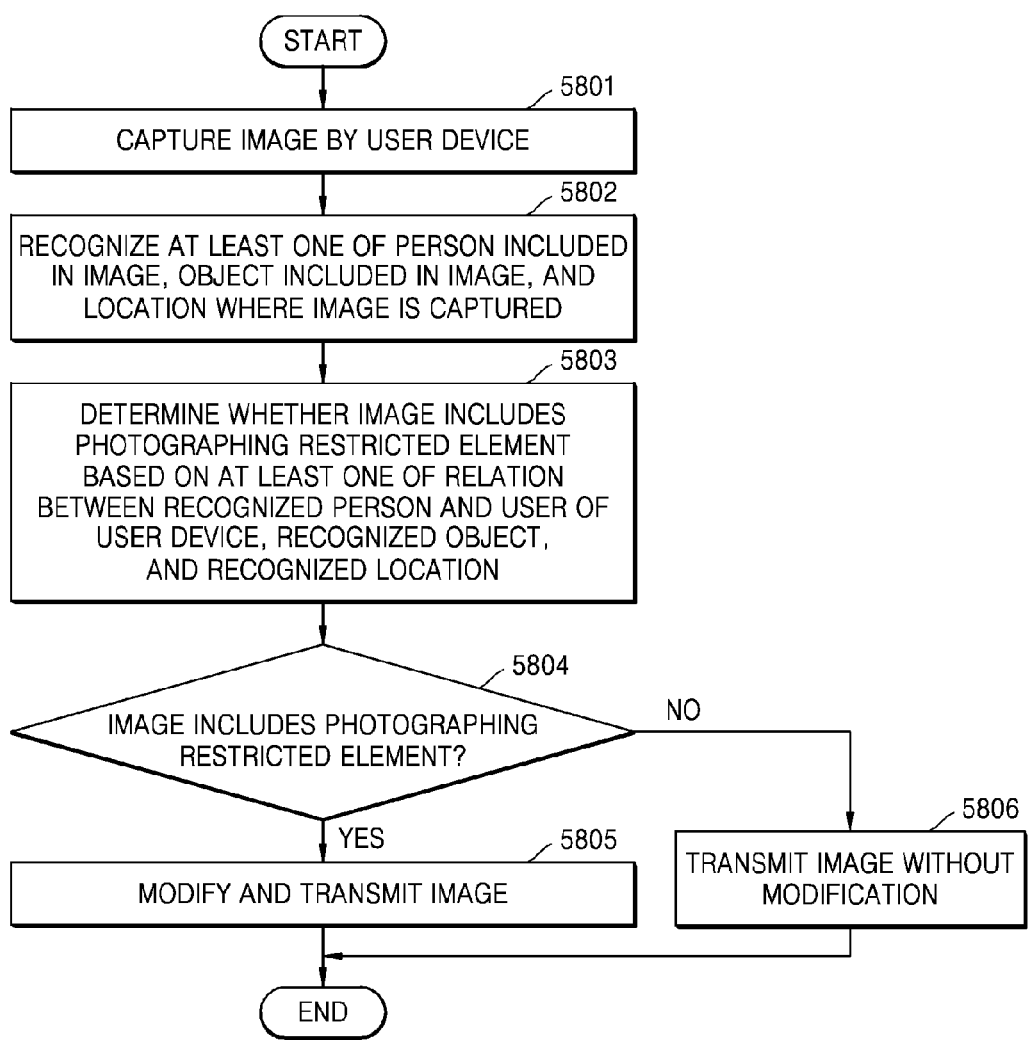
FIG. 58 is a flowchart for describing an example of immediately modifying a captured image without storing the captured image in a user device and externally transmitting the modified captured image, with respect to a method of modifying a captured image, according to an exemplary embodiment.

FIG. 58 is a flowchart for describing an example of immediately modifying a captured image without storing the captured image in a user device and externally transmitting the modified captured image, with respect to a method of modifying a captured image, according to an exemplary embodiment.

Referring to FIG. 58, a user device captures an image in operation 5801. Here, the user device may be any device capable of photographing, such as a smart phone, a camera, or a tablet PC.

In operation 5802, the user device recognizes at least one of a person included in the image, an object included in the image, and a location where the image is captured. A method of recognizing the person, the object, or the location has been described above with reference to FIG. 2.

In operation 5803, the user device determines whether the image includes a photographing restricted element based on at least one of a relation between the recognized person and a user of the user device, the recognized object, and the recognized location. A method of determining whether the image includes the photographing restricted element has been described above with reference to FIG. 2.

When it is determined that the user device includes the photographing restricted element in operation 5804, the image is modified and then transmitted to an external server or another user device in operation 5805. When it is determined that the user device does not include the photographing restricted element in operation 5804, the image is transmitted to the external server or the other user device without modification in operation 5806.

Figure 59:
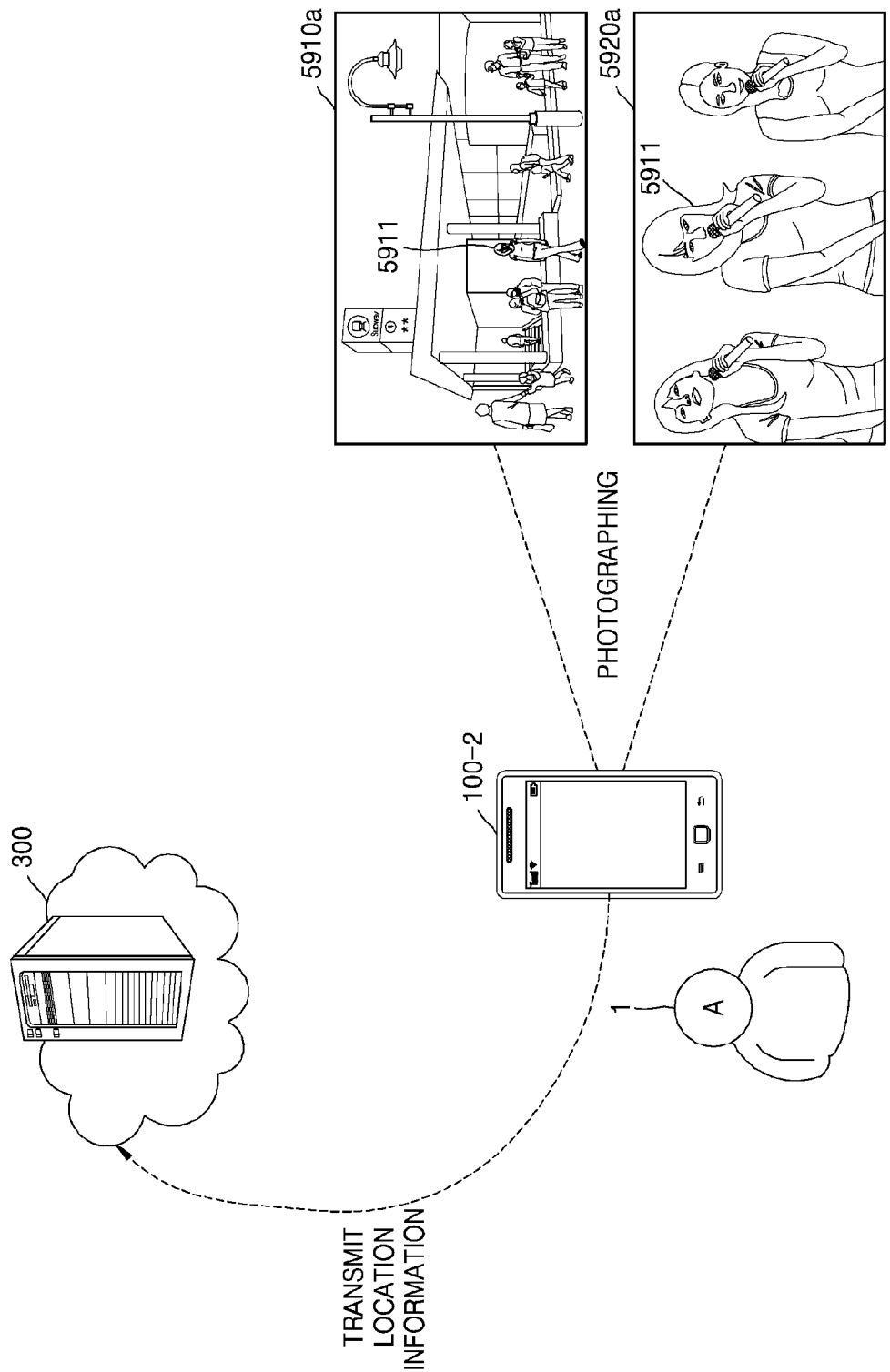
FIGS. 59 through 61 are diagrams for describing examples of modifying an image captured at a photographing restricted location, according to exemplary embodiments.
Figure 60:
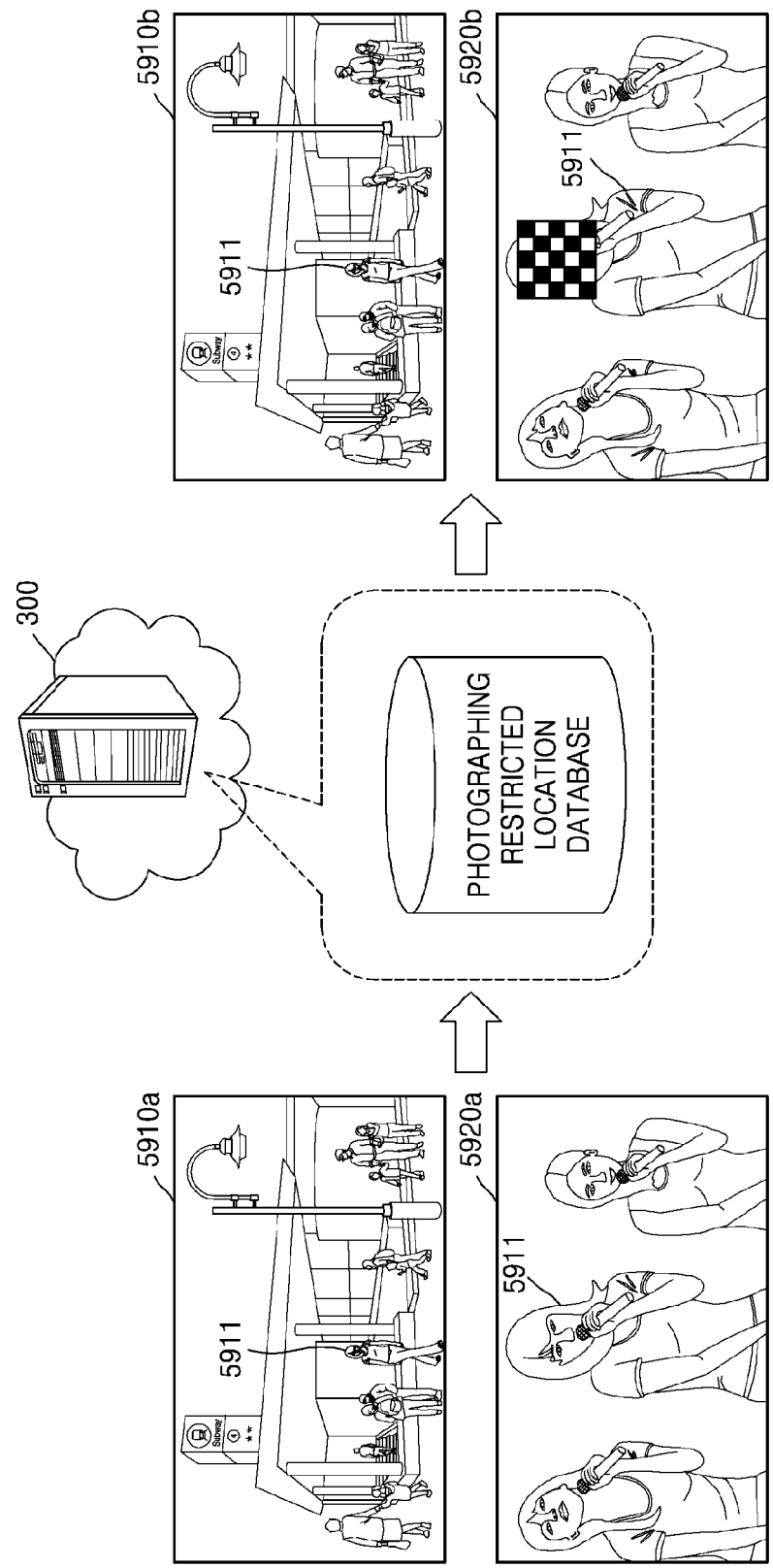
Figure 61:
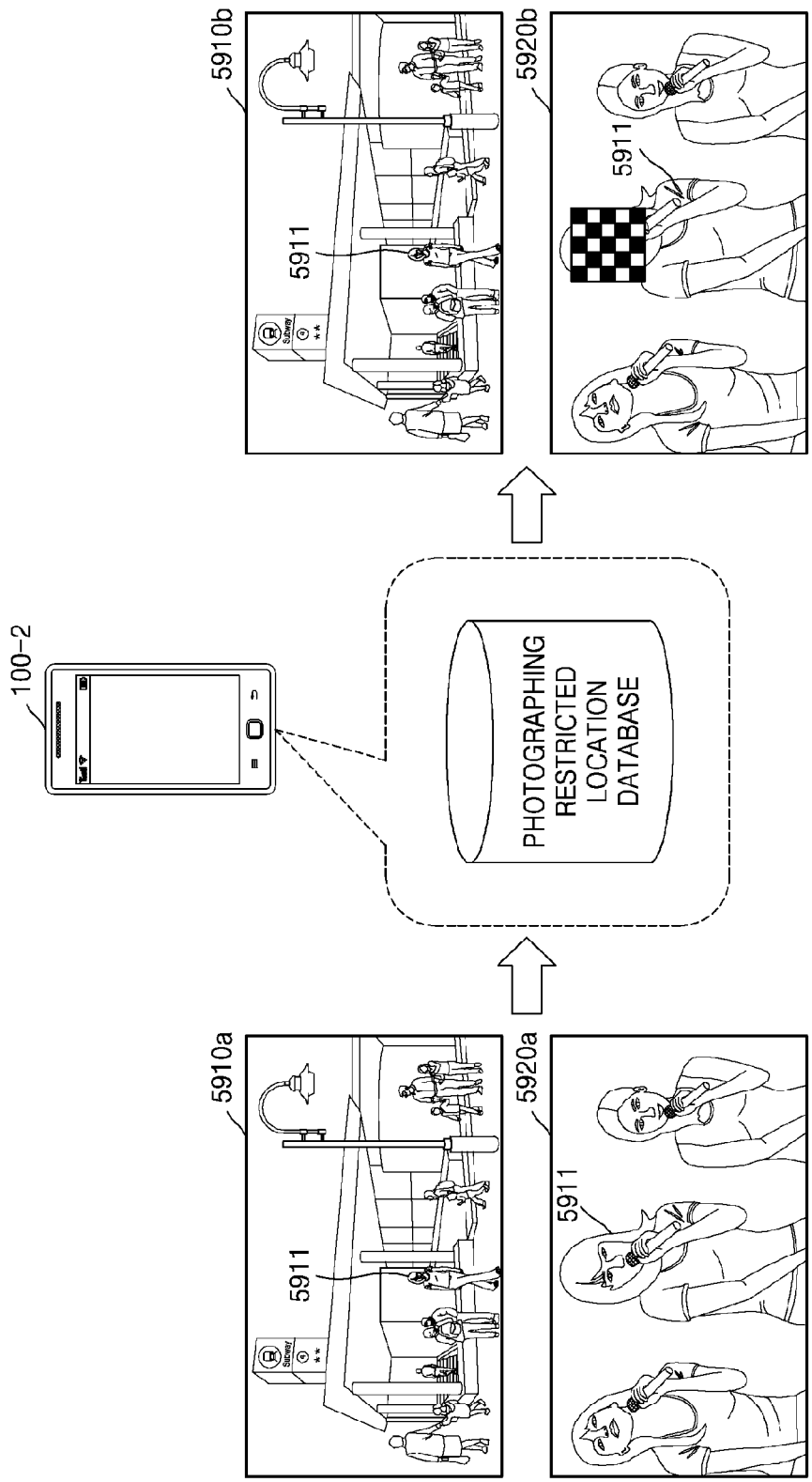

FIGS. 59 through 61 are diagrams for describing examples of modifying an image captured at a photographing restricted location, according to exemplary embodiments.

Referring to FIG. 59, the smart phone 100-2 of User A may capture an image 5910a of a person 5911 at a photographing allowed location, such as a street or a restaurant, or an image 5920a of the person 5911 at a photographing restricted location, such as a concert hall, a museum, or a military security zone. Photographing restriction of the person 5911 may vary based on a photographing location. For example, if the person 5911 is a celebrity, a photograph at a concert hall may be restricted due to copyright, but a photograph on a street may not be restricted. Thus, the smart phone 100-2 transmits the image to the server 300 for an image process. Here, the smart phone 100-2 transmits the image to the server 300, together with location information. The location information is information about a location where the image is captured. The smart phone 100-2 may determine the location by using a GPS included therein, and then transmit the location information to the server 300. Alternatively, the smart phone 100-2 generate the location information by using any one of various methods, for example, by determining the location using a location of a base station or an access point (AP) connected to the smart phone 100-2.

Referring to FIG. 60, the server 300 may determine the location where the image is captured by analyzing the location information received from the smart phone 100-2, and determine whether the location is a photographing restricted location. In other words, the server 300 determines whether the location is included in a pre-stored photographing restricted location database. Here, the pre-stored photographing restricted location database may store photographing restricted locations according to users, or photographing restricted locations that are restricted by ordinary people, such as concert halls, museums, and military security zones.

When the location where the image 5910a is captured is not determined to be the photographing restricted location, the server 300 may transmit an image 5910b that is not modified to the smart phone 100-2. Alternatively, the server 300 may transmit a message that the image 5910a is not required to be modified to the smart phone 100-2.

When the location where the image 5920a is captured is determined to be the photographing restricted location, the server 300 determines that the image 5920a includes a photographing restricted element. Accordingly, the server 300 may modify a part of the image 5920a, which corresponds to a photographing restricted person. In detail, the server 300 may generate and output a modified image 5920b by performing a mosaic process on a face region of the person 5911 in the image 5920a who is a photographing restricted person, performing an alternative image composing process on the face region, or performing a blur process on the face region.

In FIGS. 59 and 60, the server 300 modifies an image, but alternatively, the server 300 may only determine whether a location where the image is captured is a photographing restricted location by analyzing location information received from the smart phone 100-2 and transmit a result of the determination to the smart phone 100-2, and the smart phone 100-2 may modify the image.

Meanwhile, in FIGS. 59 and 60, a photographing restricted location differs based on a photographee, but alternatively, a photographing restricted location may be equally applied to all users. In other words, a photographing restricted location may be determined regardless of a person included in an image, and when it is determined that a location where the image is captured corresponds to the photographing restricted location, a part of the image, which corresponds to a person or object included in the image, may be modified.

Alternatively, as shown in FIG. 61, the smart phone 100-2 of User A may determine a location where an image is captured by analyzing location information, and determine whether the location corresponds to a photographing restricted location. In other words, the smart phone 100-2 determines whether the location is included in a photographing restricted location database stored in a storage of the smart phone 100-2.

When it is determined that the location where the image 5910a is captured is not a photographing restricted location of the person 5911, the smart phone 100-2 may store the image 5910b that is not modified.

When it is determined that the location where the image 5920a is captured is a photographing restricted location of the person 5911, the smart phone 100-2 determines that the image 5920a includes a photographing restricted element. Thus, the smart phone 100-2 may modify a part of the image 5920a, which corresponds to the person 5911 who is the photographing restricted person. In detail, the smart phone 100-2 may generate and output the modified image 5920b by performing a mosaic process on the face region of the person 5911 in the image 5920a, performing an alternative image composing process on the face region, or performing a blur process on the face region.

As such, when a person or an object is photographed, the person or the object may be restricted or not restricted based on a location where the person or the object is photographed.

Figure 62:
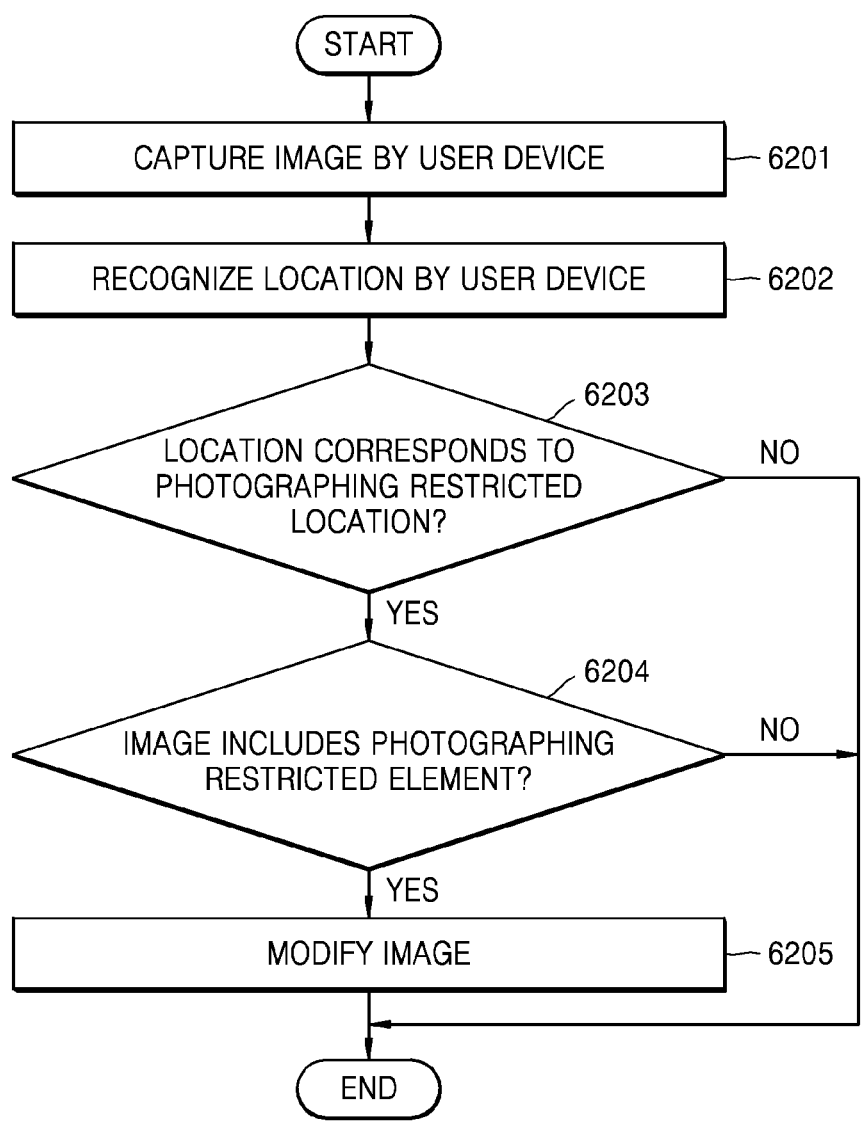
FIG. 62 is a flowchart illustrating a method of modifying an image captured at a photographing restricted location, according to an exemplary embodiment.

FIG. 62 is a flowchart illustrating a method of modifying an image captured at a photographing restricted location, according to an exemplary embodiment.

Referring to FIG. 62, a user device captures an image in operation 6201. Here, the user device may be a general photographing device such as a camera or a camcorder, a wearable device such as smart glasses or a smart watch, or a mobile device such as a smart phone or a tablet PC, or alternatively, the user device may be any one of various devices capable of photographing.

In operation 6202, the user device recognizes a location of the user device during the photographing. Here, the user device may determine the location by using a GPS included therein. Alternatively, the user device may determine the location by using a location of a base station or an AP connected to the user device.

In operation 6203, a server determines whether the location corresponds to a photographing restricted location. Alternatively, the user device may determine whether the location corresponds to a photographing restricted location. In detail, it is determined whether the location corresponds to a photographing restricted location of a person included in the image, or to a photographing restricted location regardless of a photographee. Accordingly, the server or the user device may analyze location information to determine the location where the image is captured, and compare the location with photographing restricted locations pre-stored in a photographing restricted location database. Here, the photographing restricted location database may store photographing restricted locations according to people or photographing restricted locations restricted by ordinary people, such as concert halls, museums, and military security zones.

When the location corresponds to the photographing restricted location, the server or the user device may determine whether the image includes a photographing restricted element in operation 6204. In other words, when the location corresponds to a photographing restricted location of a certain person, the server or the user device may determine whether the image includes the certain person, and when the location corresponds to a photographing restricted location of all people or objects, the server or the user device may determine whether the image includes at least one person or object. When the image includes the photographing restricted element, the server may modify the image and transmit the modified image to the user device in operation 6205. Alternatively, the user device may modify the image and store the modified image. For example, the server or the user device may generate the modified image by performing a mosaic process, a blur process, or an alternative image composing process on the image.

FIGS. 63 through 66 are diagrams for describing examples of modifying a captured image according to a user's selection, according to exemplary embodiments.

Figure 63:
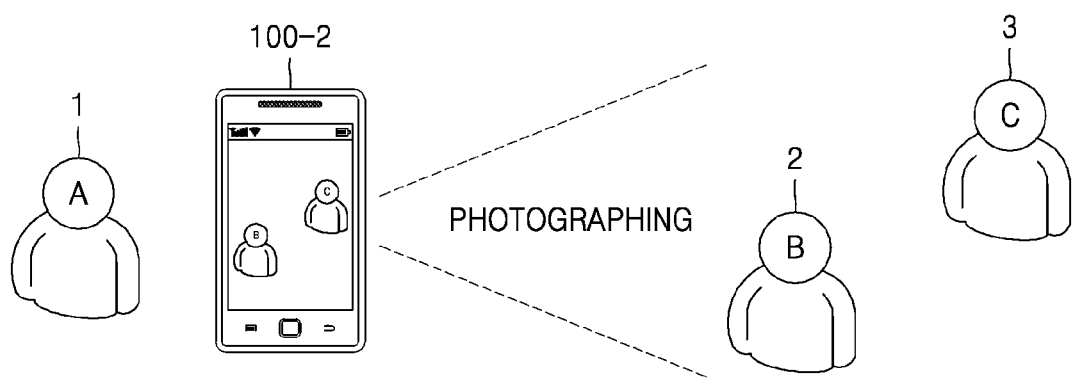

Referring to FIG. 63, the smart phone 100-2 of User A captures an image including User B and User C. Then, the smart phone 100-2 displays the image on the screen.

In FIGS. 64 and 65, when User A selects a person on which a protection process is to be performed from the image via different methods, a part of the image, which corresponds to the selected person, is modified. Here, User A may select the person while, for example, the image is provided on the smart phone 100-2 as a preview screen or a temporary screen before being stored in the storage of the smart phone 100-2 or shared with an external device.

Referring to FIG. 64A, the smart phone 100-2 recognizes faces of User B and User C by performing face recognition on an original image 6400a. Then, the smart phone 100-2 may provide results of the face recognition indicating that the faces of User B and User C are recognized. The results may be provided, for example, by highlighting (flickering or coloring) the faces or outlines of the faces of User B and User C, as visual feedback. Then, when User A selects one of User B and User C, for example, User C, the smart phone 100-2 may perform a protection process on User C. For example, the smart phone 100-2 may modify a part of the image, which corresponds to User C, such that User C is not distinguishable. In detail, as shown in FIG. 64B, the smart phone 100-2 may display a modified image 6400b generated by performing a mosaic process, an alternative image composing process, or a blur process on a face region of User C in the original image 6400a.

Figure 65A:
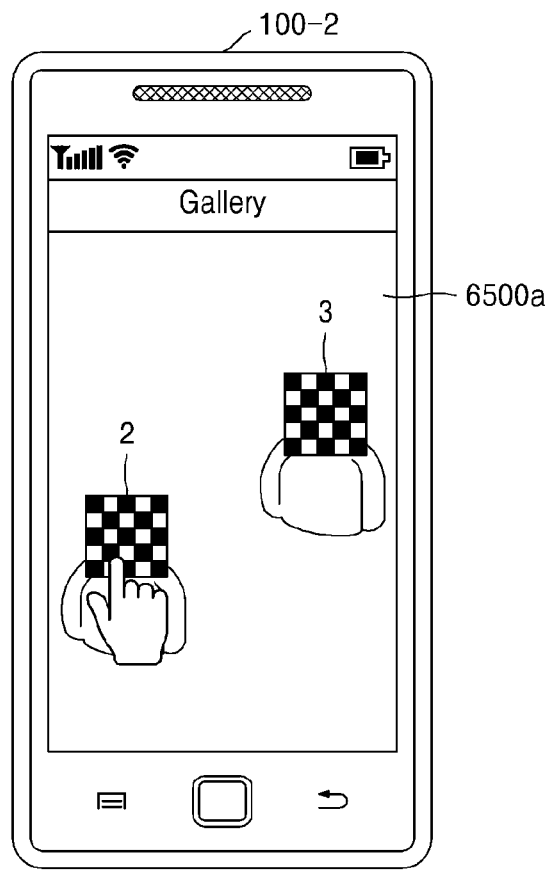
Figure 65B:
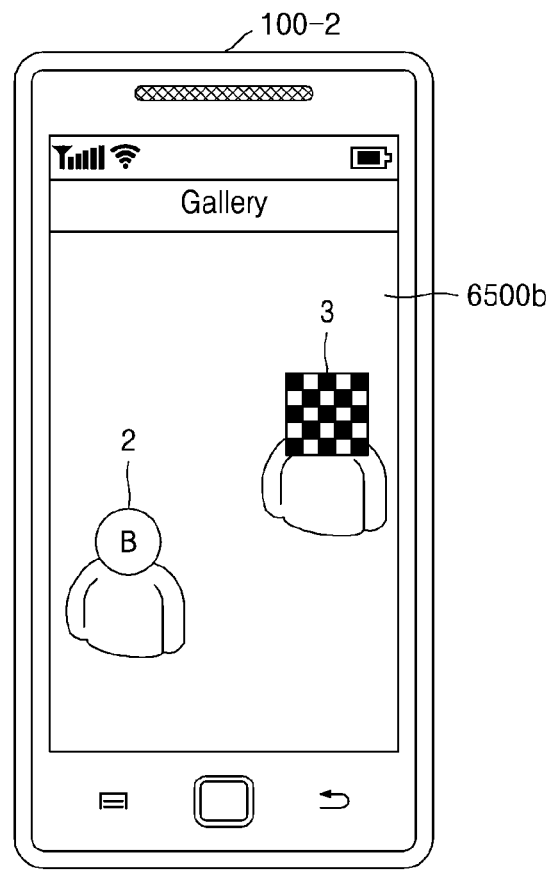

As another example, referring to FIG. 65A, the smart phone 100-2 may recognize the faces of User B and User C by performing face recognition on an original image. Then, the smart phone 100-2 may determine whether the faces correspond to a photographing restricted person. When it is determined that User B and User C correspond to photographing restricted people, the smart phone 100-2 may perform a protection process on User B and User C. For example, the smart phone 100-2 may modify parts of the original image, which correspond to User B and User C, such that User B and User C are not distinguishable. In detail, the smart phone 100-2 may display a modified image 6500a obtained by performing a mosaic process, an alternative image composing process, or a blur process on the face regions of User B and User C, who are photographing restricted people. Then, when User A selects one of User B and User C, for example, User B, the smart phone 100-2 may determine that User B is not to be protected. Thus, the smart phone 100-2 may modify a part of the modified image 6500a, which corresponds to User B, such that User B is distinguishable. In detail, as shown in FIG. 65B, the smart phone 100-2 may display a modified image 6500b obtained by releasing the mosaic process, the alternative image composing process, or the blur process performed on the face region of User B in the modified image 6500a.

As another example, referring to FIG. 66A, the smart phone 100-2 recognizes the faces of User B and User C by performing face recognition on an original image 6600a. Then, the smart phone 100-2 may provide a popup screen 6610 asking User A whether to perform a protection process on User C. When User A selects a button requesting the smart phone 100-2 to perform the protection process through the popup screen 6610, the smart phone 100-2 may perform the protection process on User C. Then, as shown in FIG. 66B, the smart phone 100-2 may display a modified image 6600b obtained by performing a mosaic process, an alternative image composing process, or a blur process on a face region of User C in the original image 6600a.

A screen for selecting a person on which a protection process is to be performed may be displayed before an image captured by the smart phone 100-2 is stored in the storage of the smart phone 100-2. Alternatively, the screen may be displayed before the smart phone 100-2 provides the image to an external device, such as an external server or a smart phone of a third party.

Meanwhile, when the person on which the protection process is to be performed is selected, information about the person may be stored in a database of the smart phone 100-2 or the server 300. For example, the person may be indicated in the information as a photographing restricted element. In this case, when the person is photographed in a future image, the smart phone 100-2 may automatically determine that the person is a photographing restricted person. Then, the smart phone 100-2 may perform a mosaic process, an alternative image composing process, or a blur process on a region of the future image, which corresponds to the person.

As such, a method of selecting, by a user, a photographing restricted person may be useful when the smart phone 100-2 or the server 300 does not have information about faces included in a captured image. In other words, when the smart phone 100-2 or the server 300 does not have the information about the faces included in the captured image, the smart phone 100-2 or the server 300 may not uniformly process the captured image, for example, protect or not protect the faces, but may determine whether to process the faces according to the user's selection, thereby increasing freedom of the user for processing the captured image.

Figure 67:
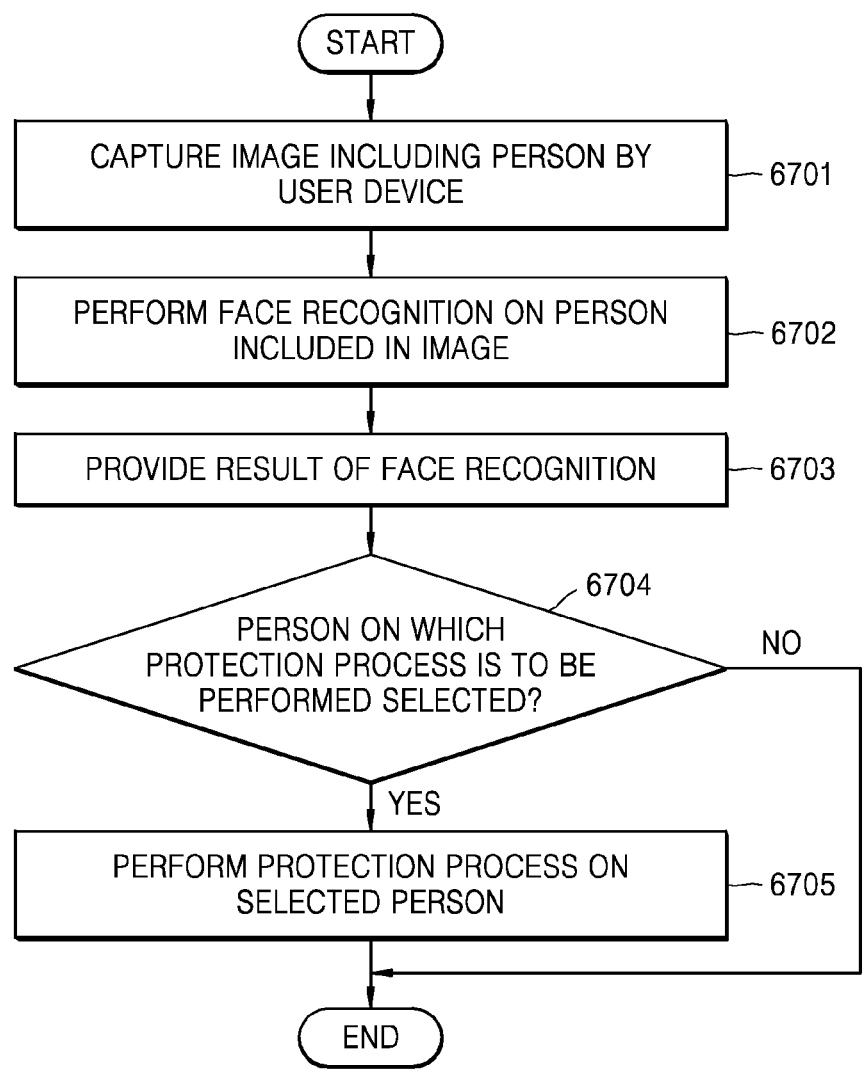
FIGS. 67 and 68 are flowcharts illustrating a method of modifying a captured image according to a user's selection, according to exemplary embodiments.
Figure 68:
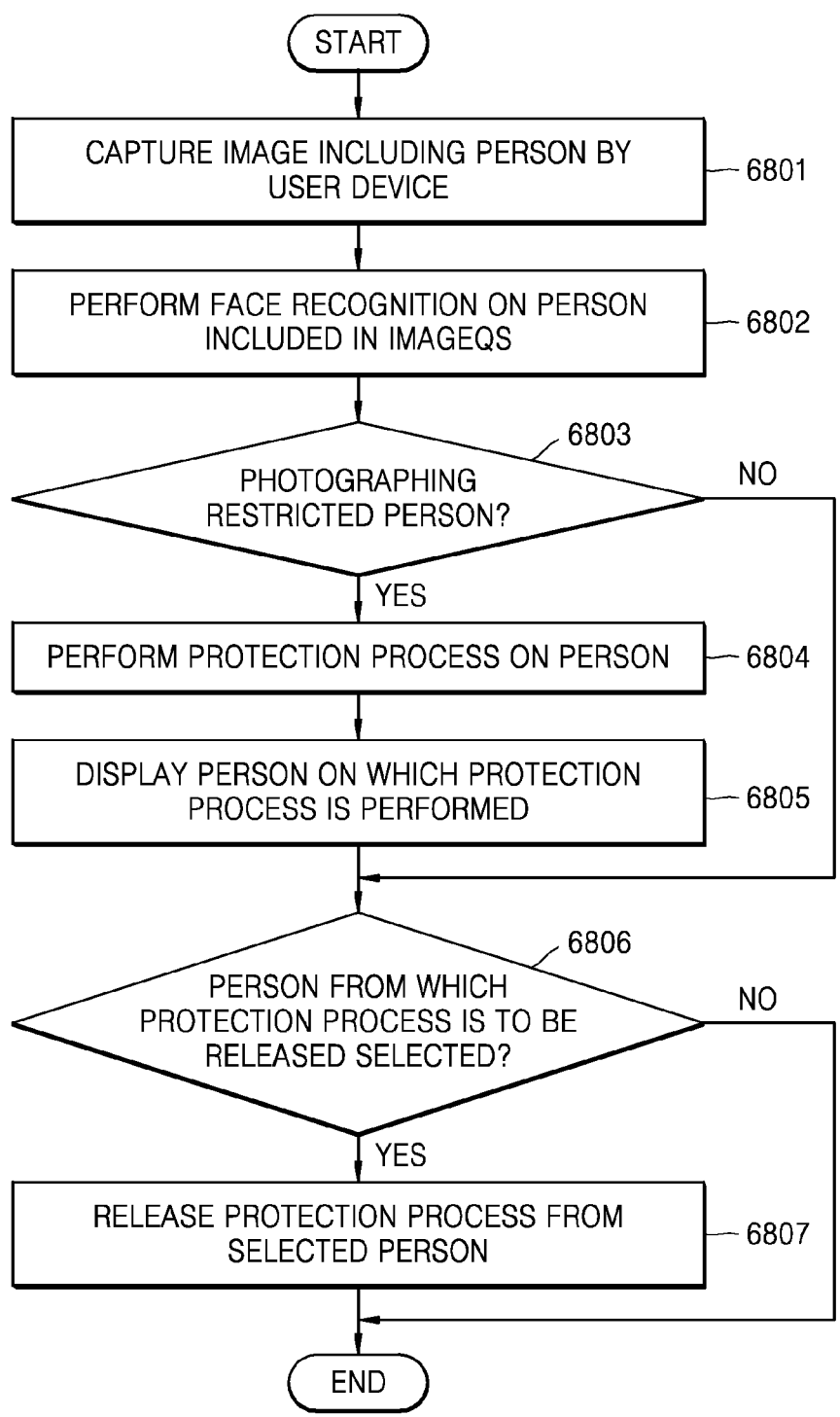

FIGS. 67 and 68 are flowcharts illustrating a method of modifying a captured image according to a user's selection, according to exemplary embodiments.

Referring to FIG. 67, in operation 6701, a user device captures an image including a person. Here, the user device may be any device capable of photographing, such as a smart phone, a camera, or a tablet PC.

In operation 6702, the user device performs face recognition on the person included in the image.

In operation 6703, the user device may provide a result of the face recognition. For example, the user device may display a screen wherein visual feedback is applied to the person.

In operation 6704, while the screen is displayed, a user of the user device may select a person on which a protection process is to be performed.

When the user selects the person on which the protection process is to be performed, the user device may perform the protection process on the selected person in operation 6705. For example, the user device may modify the image such that the selected person is not distinguishable.

As another example, referring to FIG. 68, a user device captures an image in operation 6801.

In operation 6802, the user device performs face recognition on a person included in the image.

In operation 6803, the user device may determine whether the person is a photographing restricted person. When the person is a photographing restricted person, the user device may perform a protection process on the person in operation 6804. When the person is not a photographing restricted person, the user device may not perform the protection process.

In operation 6805, the user device may display the person on which the protection process is performed. For example, the user device may perform a mosaic process, an alternative image composing process, or a blur process on a region of the image, which corresponds to the person.

In operation 6806, while the person on which the protection process is performed is displayed, the user may select a person who is to be released from the protection process.

When the person who is to be released from the protection process is selected, the user device may remove the protection process from the selected person in operation 6807. For example, the user device may undo the mosaic process, the alternative image composing process, or the blur process performed on the region of the image, which corresponds to the selected person.

As described above, according to one or more exemplary embodiments, when an image including a photographing restricted person, object, or location is captured by a user device, a part of all of the image may be modified such that the photographing restricted person, object, or location is not distinguishable, thereby protecting privacy of the photographing restricted person and preventing an individual from obtaining the image including the photographing restricted object or location for security or copyright reasons.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

The above described devices may be formed of a hardware component, a software component, and/or a combination of the hardware component and the software component. For example, the devices and the components according to the one or more of the above exemplary embodiments may be embodied by using one or more general-purpose computers or special-purpose computers, such as a processor, a controller, an arithmetic logic unit (ALU), a digital signal processor, a microcomputer, a field programmable array (FPA), a programmable logic unit (PLU), a microprocessor, or any other devices which may execute and respond to instructions.

The processing device may perform the operating system (OS) and one or more software applications performed in the OS. Also, the processing device may access, store, manipulate, process, and generate data, in response to execution of software.

For convenience of understanding, descriptions may have been made focusing on the case in which one processing device is used. However, one of ordinary skill in the art would have understood that the processing device may include a plurality of processing elements and/or a processing element in a multiple number. For example, the processing device may include a plurality of processors, or one processor and one controller. Also, other processing configurations, such as a parallel processor, are also possible.

Software may include a computer program, a code, an instruction, or a combination thereof, and may configure the processing device to operate as desired or may individually or collectively instruct the processing device.

Software and/or data may be permanently or temporarily embodied as a type of a device, a component, physical equipment, virtual equipment, a computer recording medium or device, or transferred signal waves. The software may be stored or executed in a distributed manner in a computer system connected in a network. The software and/or data may be recorded in one or more computer-readable recording media.

The method of the present inventive concept may be implemented as computer instructions which may be executed by various computer means, and recorded on a computer-readable recording medium. The computer-readable recording medium may include program commands, data files, data structures, or a combination thereof. The program commands recorded on the computer-readable recording medium may be specially designed and constructed for the inventive concept or may be known to and usable by one of ordinary skill in a field of computer software.

Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories).

Examples of the program commands include a high-level language code that may be executed by a computer using an interpreter as well as a machine language code made by a complier.

The above hardware devices may be configured to operate as one or more software modules to perform the operations of the exemplary embodiments, and vice versa.

As the invention allows for various changes and numerous embodiments, particular embodiments were illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A user device comprising:
a storage configured to store data; and
a processor configured to recognize a person included in an image captured by the user device or received by the user device from an external source, determine a degree of closeness in a relationship between the recognized person and a user who is registered as an owner of the user device based on whether at least one picture of the recognized person is stored on the storage, determine that the degree of closeness is lower than a predetermined level in response to any picture of the recognized person not being stored on the storage, determine that a location where the image is captured is a photographing restricted location in response to the image comprising a sign indicating that photography is prohibited, change a part of the image corresponding to the recognized person to be unrecognizable in response to the degree of closeness being lower than the predetermined level, and replace the image with another image in response to the location being determined as the photographing restricted location.

2. The user device of claim 1, further comprising a camera configured to capture the image.

3. The user device of claim 1, wherein the processor is further configured to determine whether a location where the image is captured is a photographing restricted location, and change the part of the image corresponding to the recognized person to be unrecognizable when the location is the photographing restricted location.

4. The user device of claim 1, wherein the data stored in the storage is an address book, and the processor is further configured to determine that the degree of closeness is lower than the predetermined level in response to the recognized person not being included in the address book.

5. The user device of claim 1, wherein the data stored in the storage is social networking service (SNS) usage records of the user, and the processor determines the degree of closeness by analyzing the SNS usage records.

6. The user device of claim 1, wherein the processor determines whether a location where the image is captured is a photographing restricted location by accessing a database of an external server, and modifies the image when the location is the photographing restricted location.

7. The user device of claim 1, wherein the processor is further configured to recognize a photographing restricted object from the image, and determine that a location where the image is captured is a photographing restricted location in response to the photographing restricted object being recognized from the image.

8. The user device of claim 1, wherein the processor performs at least one of a mosaic process, a blur process, a background image composing process, and an alternative image composing process on the part of the image to change the part of the image to be unrecognizable.

9. The user device of claim 1, wherein the processor determines whether the recognized person is registered as a friend of the owner of the user device on a social networking service system, and determines the degree of closeness is lower than the predetermined level in response to the recognized person not being registered as a friend of the owner of the user device.

10. A system for modifying an image, the system comprising:
a server configured to perform an image processing; and
a user device configured to request the image processing while transmitting an image to a server,
wherein the server is further configured to recognize a person included in the image received from the user device, determine a degree of closeness in a relationship between the recognized person and a user who is registered as an owner of the user device based on whether at least one picture of the recognized person is stored on the user device, determine the degree of closeness is lower than a predetermined level in response to any picture of the recognized person not being stored on the user device, determine that a location where the image is captured is a photographing restricted location in response to the image comprising a sign indicating that photography is prohibited, change a part of the image corresponding to the recognized person to be unrecognizable in response to the degree of closeness being lower than the predetermined level, and replace the image with another image in response to the location being determined as the photographing restricted location.

11. The system of claim 10, wherein the server determines whether the location where the image is captured is the photographing restricted location by using stored data.

12. The system of claim 10, wherein the server receives a time when the image is captured and the location where the image is captured from the user device, and determines whether photographing of the recognized person is restricted at the received time and the received location by using stored data.

13. The system of claim 10, wherein the user device encodes the image by using an encryption key received from the server and transmits the encoded image to the server in response to the degree of closeness being lower than the predetermined level, and
the server decodes the encoded image and changes the part of the decoded image corresponding to the recognized person.

14. A method of modifying an image by a user device, the method comprising:
recognizing a person included in the image;
determining a degree of closeness in a relationship between the recognized person and a user who is registered as an owner of the user device based on whether at least one picture of the recognized person is stored on the user device;
determining that the degree of closeness is lower than a predetermined level in response to any picture of the recognized person not being stored on the user device;
determining that a location where the image is captured is a photographing restricted location in response to the image comprising a sign indicating that photography is prohibited;
changing a part of the image corresponding to the recognized person to be unrecognizable in response to the degree of closeness being lower than the predetermined level; and
replacing the image with another image in response to the location being determined as the photographing restricted location.

15. The method of claim 14, wherein the determining comprises determining that the degree of closeness is lower than the predetermined level in response to the recognized person not being included in an address book stored in the user device.

16. The method of claim 14, wherein the determining comprises determining whether the degree of closeness is lower than the predetermined level by analyzing a social networking service (SNS) usage record of the user based on data stored in the user device.

17. The method of claim 14, wherein the changing comprises performing at least one of a mosaic process, a blur process, a background image composing process, and an alternative image composing process on the part of the image to change the part of the image unrecognizable.

* * * * *